United States Patent [19]

Nagai et al.

[11] 4,301,704

[45] Nov. 24, 1981

[54] ELECTRONIC MUSICAL INSTRUMENT

[75] Inventors: Yohei Nagai; Tetsuo Nishimoto; Shimaji Okamoto, all of Hamamatsu, Japan

[73] Assignee: Nippon Gakki Seizo Kabushiki Kaisha, Japan

[21] Appl. No.: 901,798

[22] Filed: May 1, 1978

[30] Foreign Application Priority Data

May 12, 1977 [JP] Japan .................................. 52-53679
May 12, 1977 [JP] Japan .................................. 52-53680

[51] Int. Cl.[3] ........................ G10H 1/057; G01H 1/14

[52] U.S. Cl. ........................................ 84/1.22; 84/1.1; 84/1.11; 84/1.19; 84/1.27

[58] Field of Search ...................... 84/1.01, 1.24, 1.03, 84/1.1, 1.11, 1.12, 1.19, 1.21, 1.22, 1.23, 1.27

[56] References Cited

U.S. PATENT DOCUMENTS 4,018,121 4/1977 Chowning ............................ 84/1.01
4,135,422 1/1979 Chibana ............................... 84/1.01

*Primary Examiner*—Stanley J. Witkowski

*Attorney, Agent, or Firm*—Robert E. Burns; Emmanuel J. Lobato; Bruce L. Adams

[57] ABSTRACT

An electronic musical instrument generates musical tone signals by digitally executing the calculations of equations representing frequency modulation. The instrument comprises a keyboard information generating circuit for generating key information concerning depressed key numbers and key touch information concerning key operation, a plurality of system parameter generating circuits for providing parameter information in response to the outputs of a tone color selecting switch section, a plurality of system musical tone signal forming sections each for producing musical tone signals through the digital calculation of the FM equation in accordance with the abovementioned informations, and a musical tone generating section for producing musical tones by combining the musical tone signals provided by the musical tone signal forming sections, the musical tone signal forming sections calculating the FM equation by using different parameters provided by the parameter generating circuits. The produced musical tone signals contain partials of inharmonic relations and are rich in partials, to realize naturalness.

2 Claims, 25 Drawing Figures

ELECTRONIC MUSICAL INSTRUMENT

BACKGROUND OF THE INVENTION

This invention relates to electronic musical instruments, and more particularly to an electronic musical instrument of a type wherein musical tones are produced by executing in a digital mode the calculation of an equation representing frequency modulation signals.

An electronic musical instrument of this type is based on a principle that musical tones are produced by calculating the following Equation (1) known as an equation representing frequency modulation signals, and is disclosed by, for instance, U.S. Pat. No. 4,018,121.

$$e = A \cdot \sin(\omega_c t + I(t) \cdot \sin \omega_m t) \quad (1)$$

The spectrum distribution of musical tones produced by the conventional electronic musical instrument of this system is determined by relationships between the angular velocity $\omega_c$ of the carrier waver term $\omega_c t$ and the angular velocity $\omega_m$ of the modulation wave term $\sin \omega_m t$ of Equation (1). However, depending on the relationships between the two angular velocities $\omega_c$ and $\omega_m$, there may happen a case wherein all the frequency components necessary for a certain tone color of a musical tone to be produced are not included. Accordingly, the tone color of a musical tone which can be produced by the conventional electronic musical instrument is limited.

The levels of the frequency components of the musical tone thus produced are, in general, determined by the selection of the value I(t) in Equation (1). In this connection, if one of the frequency components is selected to a suitable value, the values of the remaining frequency components become necessarily undesirable ones; thatt is, it is very difficult to set the levels of all the frequency components of a musical tone to be formed (which is, in general, made to be similar to one produced by a natural musical instrument) to optimum values.

For instance, natural musical instruments are characteristically different from one another in frequency spectrum aand frequency component level in accordance with the tone colors thereof. For instance, the piano includes both of harmonic tones and non-harmonic tones in its spectrum. Furthermore, natural musical instruments of a reed type include only frequency components of odd-number harmonics.

Accordingly, in order to form musical tones which are similar to those formed by the natural musical instruments, it is necessary to obtain spectrum distribution satisfying the characteristics of various tone colors and to be able to set the levels of various frequency components included in the musical tones to specific values.

However, heretofore it is considerably difficult for some of the conventional electronic musical instruments to simultaneously effect the selection of the angular velocities $\omega_c$ and $\omega_m$ and the selection of the value I(t).

On the other hand, in the conventional electronic musical instrument, as shown in FIG. 17, the pitch of a musical tone to be formed is specified by applying the output of a key switch circuit KS to a musical tone signal forming circuit TGR, while parameters set and stored in advance are successively read to be applied to the musical tone signal forming circuit TGR by means of a parameter circuit PRM, and the calculation of the fundamental equation is carried out according to these pieces of information in the musical tone signal forming circuit TGR, the calculation result being applied, as a musical tone signal, to a sound system SUD.

However, such a digital type electronic musical instrument cannot give a desired tone color and a desired envelope to a musical tone produced by depressing a key or keys. Accordingly, musical tones formed by the conventional digital type electronic musical instrument is much different from those formed by the natural musical instruments.

In other words, a musical tone produced by a natural musical instrument has variations in tone color and envelope depending on the tone ranges. For instance, musical tones produced by the piano are short in envelope and small in tone volume in the high tone (treble) range, but are long in envelope and large in tone volume in the low tone (bass) range. Furthermore, in the bass region, the musical tones produced by the piano have a large percentage of partial tone contents and have a greater inharmonicity.

Accordingly, in the case where it is intended to form piano tones with the electronic musical instrument, it is effective for the purpose of making musical tones formed by the electronic musical instrument similar to those formed by the natural musical instrument as much as possible that the electronic musical instrument is so designed that the tone colors and envelopes of musical tones produced thereby can be varied according to the tone ranges assigned to the keys or according to the key positions so as to conform the characteristics of the musical tones formed by the natural musical instrument.

SUMMARY OF THE INVENTION

Accordingly, an object of this invention is to eliminate the above-described difficulties accompanying an conventional electronic musical instrument.

More specifically, a first object of the invention is to provide an electronic musical instrument in which all the frequency components necessary for the tone color of a musical tone to be produced are included thereby to ease the limitation to musical tone which can be produced thereby.

A second object of the invention is to provide an electronic musical instrument in which the tone colors and envelopes of produced musical tones can be varied according to the tone ranges assigned to the keys or the key positions in such a manner as to conform the characteristics of musical tones formed by natural musical instruments.

The foregoing objects and other objects as well as the characteristic features of the invention will become more apparent from the following detailed description and the appended claims when read in conjunction with the accompanying drawings, in which like part are designated like reference numerals or characters.

BRIEF DESCRIPTION OF THE DRAWINGS

In the accompanying drawings:

FIG. 17 is a block diagram illustrating a conventional electronic musical instrument, which has been already referred to.

DETAILED DESCRIPTION OF THE INVENTION

This invention will be described with respect to its one preferred embodiment where the technical concept of the invention is applied to an electronic musical instrument having a manual keyboard consisting of eighty-eight keys.

The embodiment, or the electronic musical instrument, is to compose musical tone signals in plural($n=1$ to $n=s$) systems according to the following equation (2) obtained developing the aforementioned equation (1):

$$e = \sum_{n=1}^{s} K_n \cdot T_{na}(t) \cdot A_n(t) \sin[B_n \cdot \omega t + T_{ni}(t) \cdot I_n(t) \cdot \sin(D_n \cdot \omega t)] \quad (2)$$

In this equation, $K_n$ ($K_1$ to $K_s$) is the general tone volume constant of each system, by which the mixing ratio of each system is determined. Accordingly, the tone volume and tone color of a musical tone can be changed by selectively changing this mixing ratio.

$T_{na}(t)$ [each being $T_{1a}(t)-T_{sa}(t)$] is the tone volume selecting variable for controlling the tone volume by a method of key depression. This variable is determined according to an initial constant $\beta_i$ adapted to give weight to depression speed information in key depression, and an after constant $\beta_a$ adapted to give weight to depression pressure information in key depression.

Figure 16:
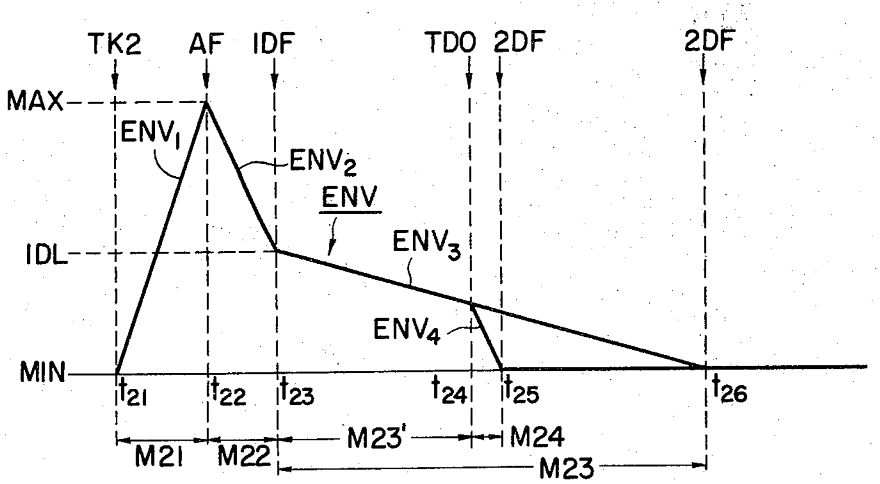
FIG. 16 is a waveform diagram illustrating the output of the tone volume function generating circuit.
Figure 17:
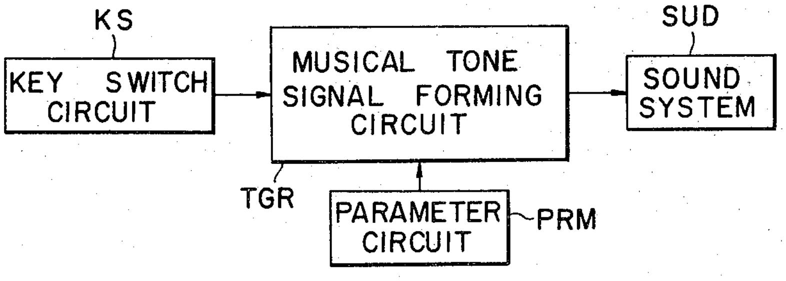
F I G. 17 PRIOR ART

An(t) [each being $A_1(t)-A_s(t)$] is a variable to provide an amplitude level or an envelope. The variable is determined according to the following data selected when an amplitude waveform ENV as shown in FIG. 16 is obtained; attack speed constants $AR_{A1}$-$AR_{As}$ selected to determine the attack speed of an attack waveform part $ENV_1$, first decay speed constants $1DR_{A1}$-$1DR_{As}$ selected to determine the decay speed of a first decay waveform part $ENV_2$, second decay speed constants $2DR_{A1}$-$2DR_{As}$ selected to determine the decay speed of a second decay waveform part $ENV_3$m decay transition level constants $1DL_{A1}$-$1DL_{As}$ selected to determine a level $1DL_A$ in transition of from the first decay waveform part $ENV_2$ to the second decay waveform part $ENV_3$, and decay speed constants $DR_{A1}$-$DR_{As}$ which when a decay waveform part $ENV_4$ is formed upon release of a key at the time instant $t_{24}$ during the formation of the second decay waveform $ENV_3$, are selected to determine the decay speed.

The variables $K_n.T_{na}(t).An(t)$ having the above-described contents correspond to the amplitude constant A in equation (1).

In equation (2), $B_n$ (each being $B_1 \sim B_s$) is the tone pitch constant selected to determine a musical tone frequency, namely, a tone pitch. This constant represents an amount of variation of the frequency of a musical tone in each system. The variable $B_n.\omega$ having the above-described contents correspond to the carrier wave angular velocity $\omega_c$ in equation (1).

$T_{ni}$ [each being $T_{1i}(t) \sim T_{si}(t)$] is the tone color selecting variable for controlling a tone color by way of key depression. This variable is determined according to an initial constant $\alpha_i$ for weighting depression speed information in key depression, and an after constant $\alpha_a$ for weighting depression pressure information in key depression.

$I_n(t)$ [each being $I_1(t) \sim I_s(t)$] is the tone color variable for determining the variation in time of a tone color. This variable is determined according to initial tone color constants $I_{L1}$-$I_{Ls}$ selected to determine the initial tone color of a musical tone, tone color variation constants $DR_{I1}$-$DR_{Is}$ selected to determine variation speed as to variation in time of a tone color, and tone color variation suspension level constants $SL_{I1}$-$SL_{Is}$ selected to determine a tone color variation suspension level $SL_I$ which is a tone color variation finish level.

The variables $T_{ni}(t).I_n(t)$ having the above-described contents correspond to the modulation index I(t) in equation (1).

$D_n$ (each being $D_1 \sim D_s$) is the partial tone constant selected to determine a modulating wave frequency. By changing this constant, the partial tone component (consisting harmonic components and non-harmonic components) included in a musical tone signal is changed in constitution.

The variable $D_n\omega$ in equation (2) corresponds to the modulating wave angular velocity $\omega_m$ in equation (1).

Equation (2) is a general equation. However, in the embodiment described below, basing on the following equation (where $s=2$) musical tone signals for two systems are obtained, and are mixed to provide a musical tone:

$$e = K1 \cdot T_{1a}(t) \cdot A_1(t) \sin[B_1 \cdot \omega t + T_{1i}(t) \cdot I_1(t) \cdot \sin D_1 \cdot \omega t] + K_2 \cdot T_{2a}(t) \cdot A_2(t) \sin[B_2 \cdot \omega t + T_{2i}(t) \cdot \sin D_2 \cdot \omega t] \quad (3)$$

Figure 1:
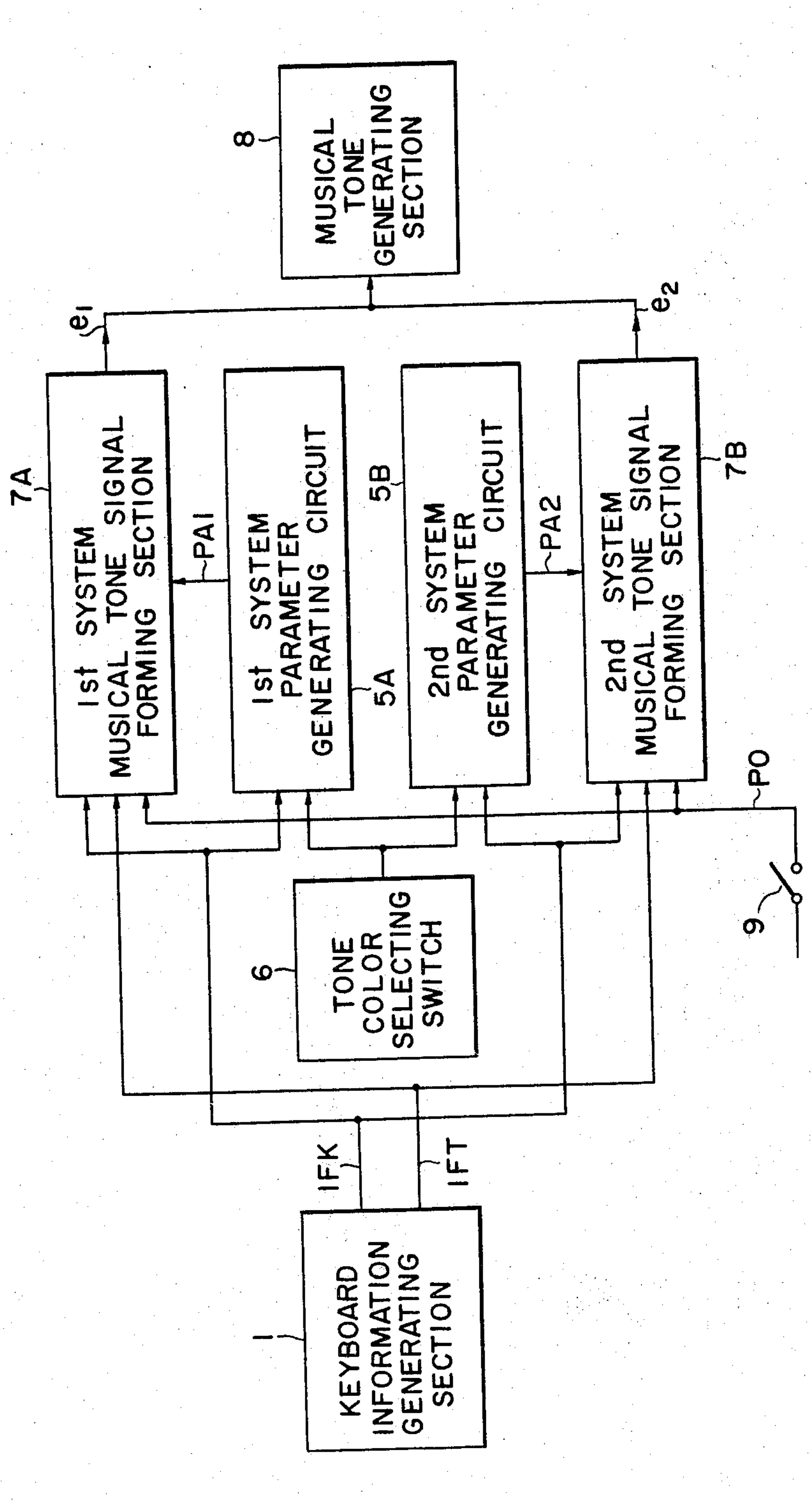
FIG. 1 is a block diagram showing one example of an electronic musical instrument according to this invention.

The electronic musical instrument according to this invention, as shown in FIG. 1, comprises: a keyboard information generating section 1, first system parameter generating circuit 5A, a second system parameter generating circuit 5B, first and second system musical tone forming sections 7A and 7B, and a musical tone generating section 8.

The keyboard information generating section 1 operates to provide, as key information relating to a key operating in the keyboard, key information IFK whose content is a depressed key number, and touch information IFT whose content is pressure and speed in depressing a key.

The first and second system parameter generating circuits 5A and 5B operate to provide parameter outputs PA1 and PA2 concerning a musical tone waveform in response to the output of a tone color selecting switch 6 operated by the performer. The parameter information generated by these circuits 5A and 5B is to provide information concerning a tone color other than the touch information IFT provided by the keyboard information generating section 1.

The first and second system musical tone signal forming sections 7A and 7B operate to receive the key information IFK and the touch information IFT from the keyboard information generating section 1 and the parameter information PA1 and PA2 from the parameter generating circuits 5A and 5B, and generate two system musical tone signals $e_1$ and $e_2$ represented by the first term and the second term in equation (3), respectively.

The musical tone generating section 8 is made up of a sound system comprising an amplifier and a loudspeaker. In this section 8, the outputs $e_1$ and $e_2$ of the first and second system musical tone signal forming sections 7A and 7B are composed to produce a musical tone through the loudspeaker, which musical tone corresponds to a musical tone e represented by equation (3).

In the electronic musical instrument thus organized, a musical tone provided by the musical tone generating section 8 has a tone pitch corresponding to the key information IFK from the keyboard information generating section 1 and a tone color selected by the tone color selecting switch 6, and it is subjected to touch control or after control according to the touch information IFT from the keyboard information generating section 1. The musical tone waveform is formed according to equation (3) based on the frequency modulation equation.

In addition, this musical tone is controlled by application of a damper pedal signal PO, as a control signal, to the musical tone signal forming sections 7A and 7B, which signal PO is produced by a damper pedal 9.

The above-described components of the musical instrument will be described in more detail.

(1) Keyboard Information Generating Section

Figure 2:
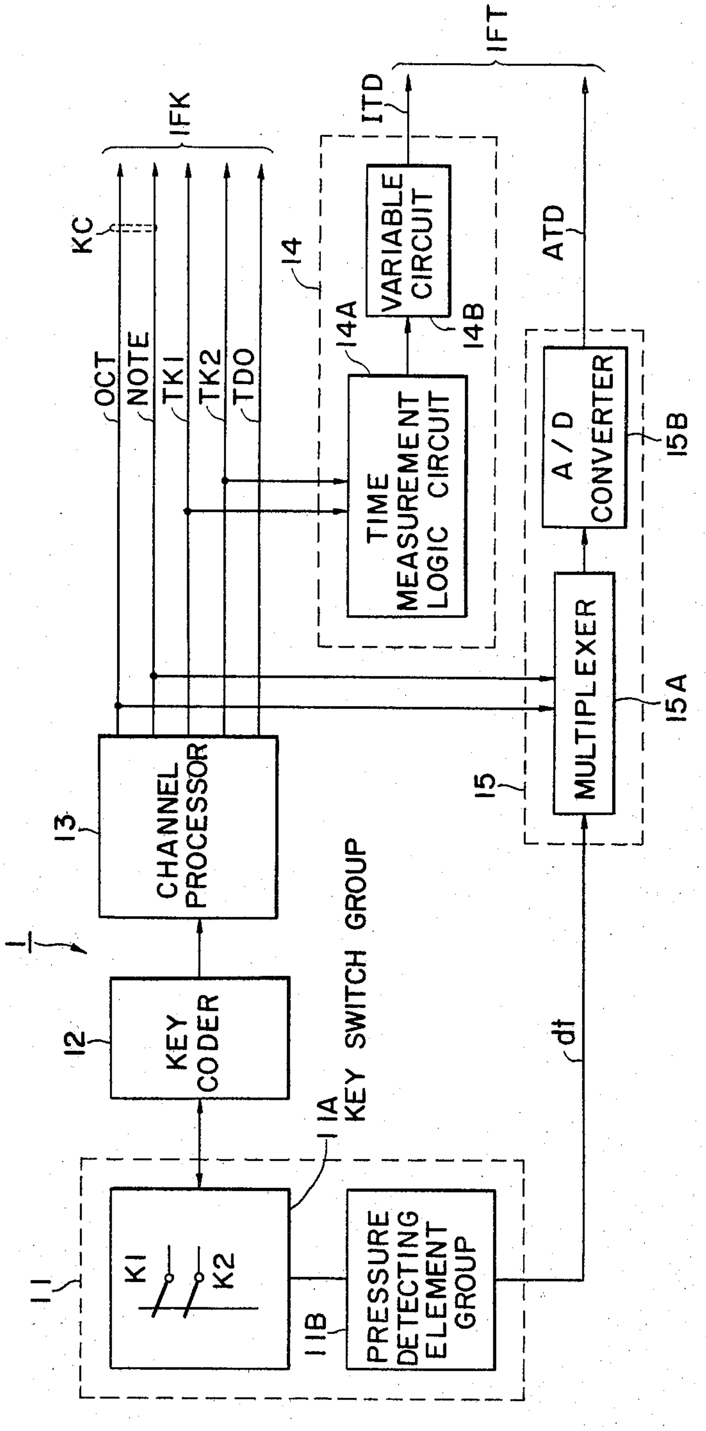
FIG. 2 is a block diagram illustrating a keyboard information generating section shown in FIG. 1.

The keyboard information generating section 1 in FIG. 2, as shown in FIG. 2: a key operation detecting circuit 11 for detecting the operating condition of each key in the keyboard; a key coder 12 in which in response to the output of the key operation detecting circuit 11 the number of a key depressed is discriminated, and a key code signal KC consisting of a binary coded signal corresponding to the key number is outputted; a channel processor 13 which operates to assign the output signal of the key coder 12 to one of a given number of tone production channels thereby to deliver the key information IFK; an initial touch control circuit 14 which operates to discriminate the key depression speed according to the output of the channel processor 13 and to deliver the key depression speed thus discriminated as an initial touch data ITD consisting of a binary coded signal; and an after touch control circuit 15 which operates to discriminate the key depression strength according to the output of the key operation detecting circuit 11 and to deliver the key depression strength thus discriminated as an after touch data ATD consisting of a binary coded signal.

(1-1) Key Operation Detecting

Figures 3A, 3B, 3C:
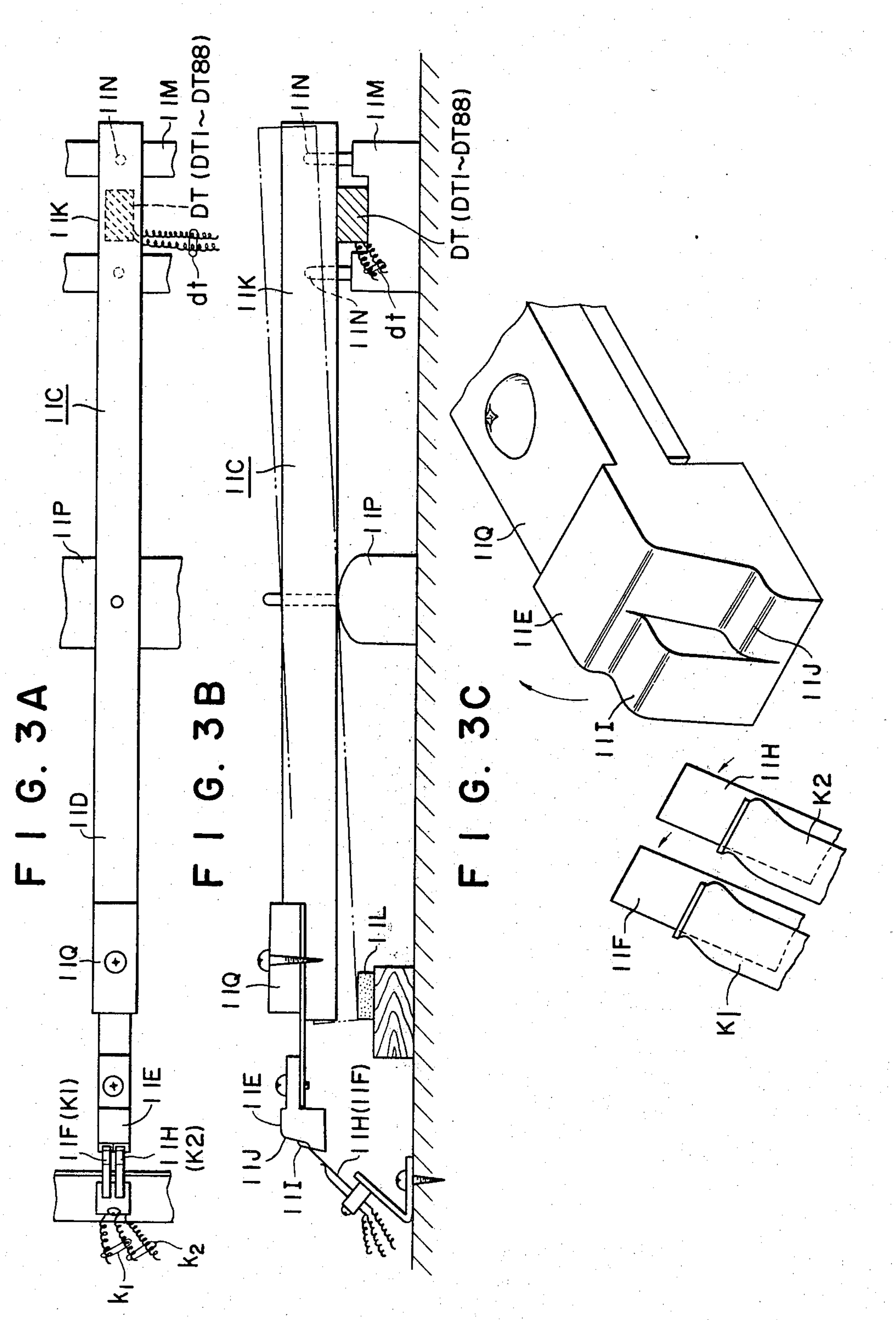
FIGS. 3A through 3C are a plan view, a side view and a partial enlarged view, respectively, showing the operating mechanism of a key switch to which a key operation detecting circuit shown in FIG. 2 can be applied.

The key operation detecting circuit 11 comprises a group 11A of key switch assemblies, each having two key switches K1 and K2, which are provided respectively for the keys (88 keys in this embodiment) in the keyboard, and a group 11B of depression pressure detecting elements DT provided respectively for the keys. The key switches K1 and K2 are, as shown in FIGS. 3A and 3B, juxtaposed at the rear end portion 11D of a key 11C in such a manner as to be opposed to each other. When the key 11C is depressed, an engaging piece 11E provided at the rear end portion 11D is allowed to engage with movable contacts 11F and 11H, whereby the two switches K1 and K2 are closed. The engaging piece 11E is provided, as shown in FIG. 3C, with steps 11I and 11J different in length where the engaging piece 11E engages the key switch movable contacts 11F and 11H. As the engaging piece 11E is moved upward by operating the key 11C, firstly the first key switch K1 engages the long step 11I as a result of which the first key switch K1 is closed, and secondly the second key switch K2 engages the short step 11J as a result of which the second key switch K2 is closed. That is, when the key C11 is operated, the first switch K1 is first closed, and then the second key switch K2 is closed.

The depression pressure detecting element DT is provided below the operating end portion 11K of the key 11C in such a manner that after the second key switch K2 has been closed by the operation of the key 11C, the lower surface of the operating end portion 11K of the key 11C is abutted against the detecting element DT whereby a detection output dt corresponding to the depression pressure is provided.

The contact outputs $k_1$ and $k_2$ of the first and second second key switches K1 and K2 thus provided by the key operation detecting circuit 11 are applied, as 88 pairs of key operation detecting outputs containing the operated key numbers and operation speeds, to the key coder 12. The detection outputs dt of the depression pressure detecting elements DT are applied to the after touch control circuit 15 as 88 key operation detection outputs including depression pressure information.

In FIGS. 3A and 3B, reference character 11L designates an upper limit stopper felt, 11M a plate for receiving the pressure detecting elements DT, 11N guides, 11P a fulcrum member, and 11Q a weight.

(1-2) Key Coder

Figure 4A:
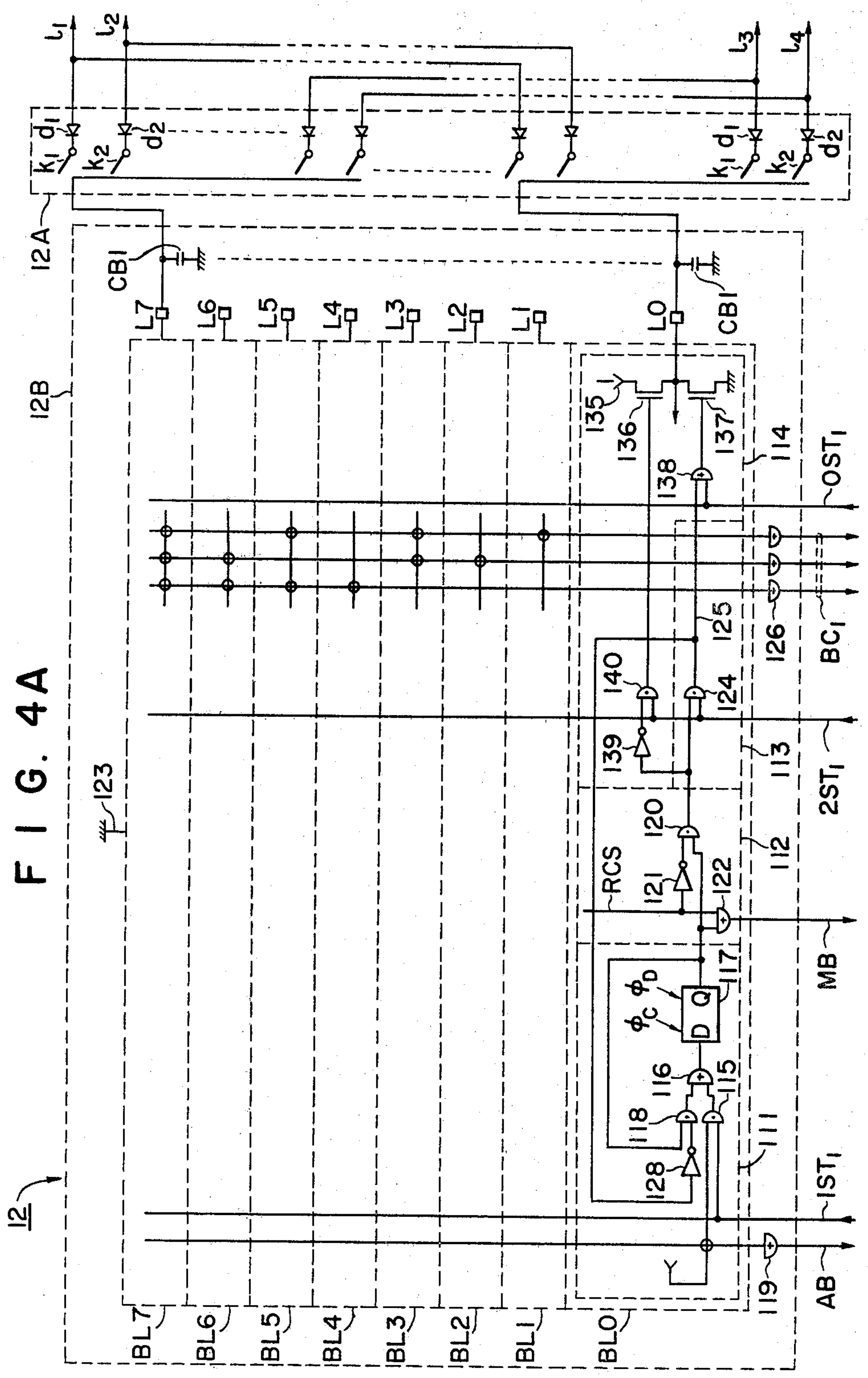
FIGS. 4A through 4C are three parts of a connection diagram showing a key coder shown in FIG. 2.
Figure 4B:
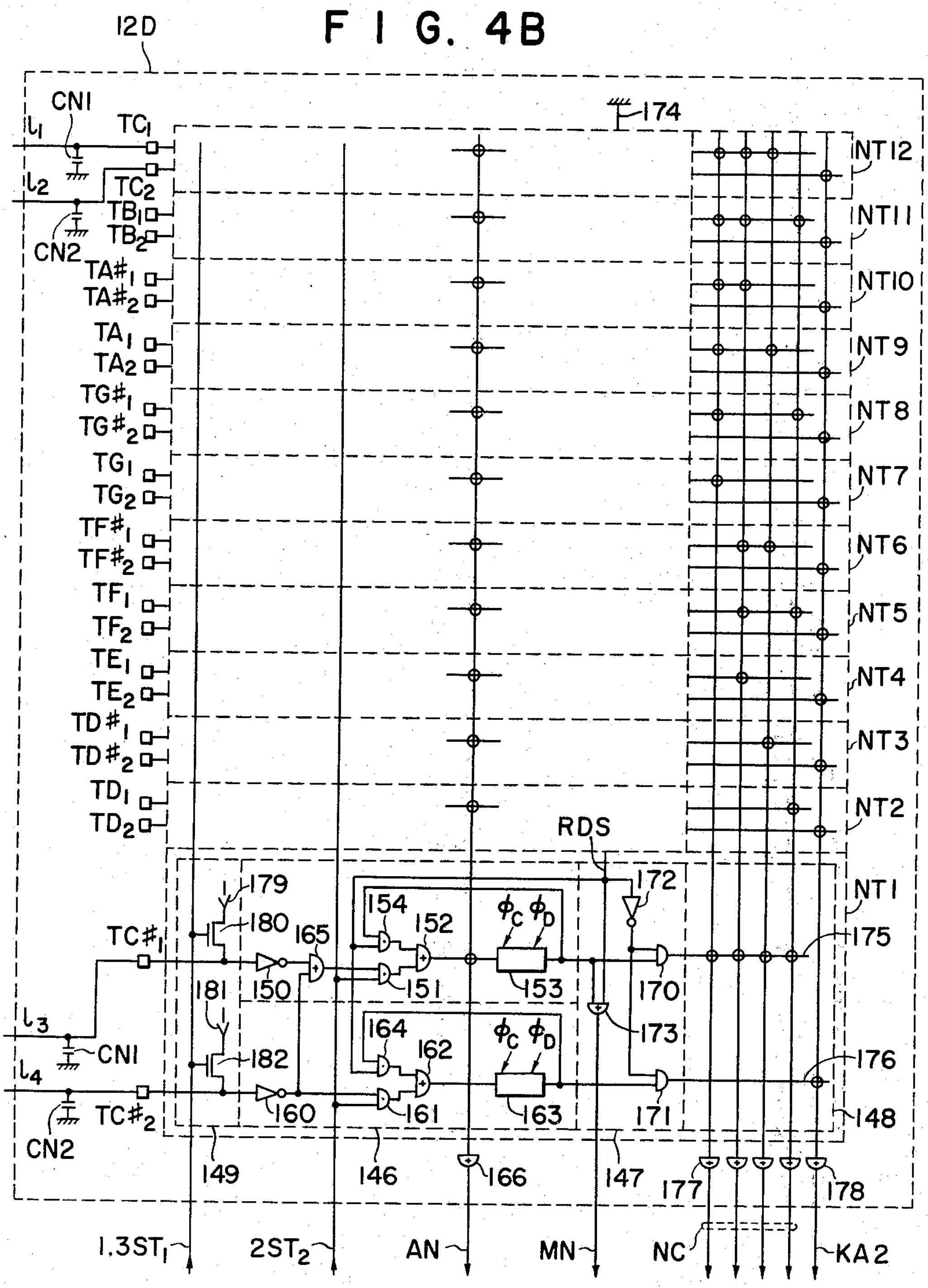
Figure 4C:
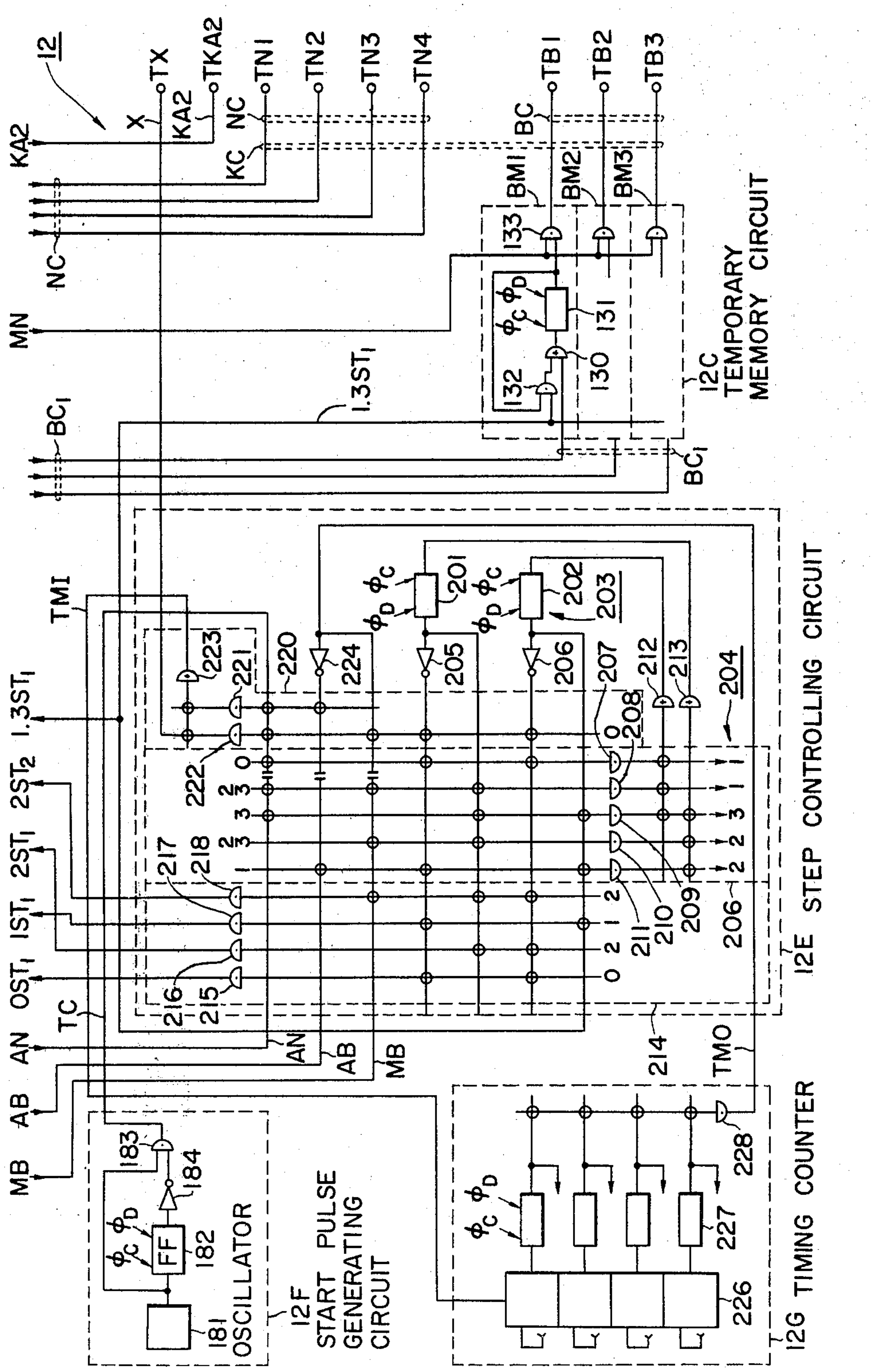

The key coder 12, as shown in FIGS. 4A through 4C, comprises: a key switch circuit 12A having the key switches K1 and K2; a block detection circuit 12B and its temporary memory circuit 12A; a note detection circuit 12D, and a step control circuit 12E.

In the block detection circuit 12B, the keys in the keyboard (consisting of 88 keys in this embodiment) are divided into a plurality of blocks each consisting of keys in one octave for instance, and blocks to which operated keys belong are stored therein (when plural keys are simultaneously operated, sometimes a plurality of blocks are stored), and furthermore the block number of the block thus stored is stored, as a 3-bit binary coded signal, in the temporary memory circuit 12C. The block detection circuit 12B introduces its memory state to the note detection circuit 12D through a key switch operated in the keyboard.

In this example, 88 keys are divided into eight blocks: the zero-th block to the seventh block, as indicated in Table 1 below.

TABLE 1

| Block No. | Notes | Block No. | Notes |
|---|---|---|---|
| 0 | $A_0$-$C_1$ | 4 | $C\#_4$-$C_5$ |
| 1 | $C\#_1$-$C_2$ | 5 | $C\#_5$-$C_6$ |
| 2 | $C\#_2$-$C_3$ | 6 | $C\#_6$-$C_7$ |
| 3 | $C\#_3$-$C_4$ | 7 | $C\#_7$-$C_8$ |

On the other hand, the note detection circuit 12D operates to detect and store the note number of the operated key from a signal which is applied thereto through the key switch in the keyboard by the block detection circuit 12B (in this case also, when a plurality of keys belonging to one and the same block are operated simultaneously, a plurality of notes are sometimes stored), and to output, as a 4-bit binary coded signal, the note number representing the stored note.

In the case when plurality of blocks are stored in the block detection circuit 12B, the blocks are read out in a predetermined priority order, and whenever the block is read out, the note of the operated key included in that block is stored in the note detection circuit.

The notes stored in the note detection circuit 12D are also read out in a predetermined priority order.

The block number coded signal BC thus stored in the temporary memory circuit 12C and the note number coded signal NC thus stored in the note detection circuit 12D are combined so as to be delivered as a 7-bit key code signal KC.

The block detection circuit 12B and the note detection circuit 12D will be described in more detail.

The block detection circiit 12B comprises eight detection circuit means, that is, the 0-th to 7th block detection circuit means BL0 through Bl7 corresponding to the 0-th to 7th octaves, and their signal input-output terminals $L_0$ through $L_7$ are connected in common to the stationary contacts of the pairs of key switches $K_1$ and $K_2$ (FIGS. 3A and 3C) which belong to the respective blocks (octaves).

The block detection circuit means BL0 through BL7 are similar in construction to one another except for their reading circuits, each of which means comprising a memory circuit 111, a priority gate circuit 112, and a reading circuit 113, and a signal input-output circuit 114.

Therefore, as a typical one of the block detection circuit means, the 0-th block detection circuit means BLO with the input terminal $L_0$ will be described. When a logic "1" signal is applied to the input terminal $L_0$, in the memory circuit 111, this signal is received by a delay flip-flop circuit 117 through an input AND gate 115 which employs as its open control signal a "1" state signal $IST_1$ applied thereto from a step control circuit 12E, and through an OR gate 116. This "1" signal is written in the flip-flop circuit 117 with the aid of a writing clock pulse $\phi_C$ and is read out of the circuit 117 with the aid of a reading clock pulse $\phi_D$. The "1" signal thus read out is fed to the input terminal through a feedback AND gate 118 and through the OR gate 116, and is read out with the aid of the next clock pulses $\phi_C$ and $\phi_D$. Thus, in the flip-flop circuit 117 data is stored and renewed whenever the clock pulses $\phi_C$ and $\phi_D$ are applied thereto. By writing and reading with the aid of clock pulses $\phi_C$ and $\phi_D$ the output "0" of the feedback AND gate 118 which is provided when the latter 118 is closed, the data stored in the flip-flop circuit 117 is reset.

Thus, in the block detection circuit means BL0 through BL7, when the "1" signal is applied to the memory circuit 111, the "1" signal is applied, as an any block signal AB (representing that a key included one of the blocks is operated), to the step control circuit 12E.

The output of the flip-flop circuit 117 in the memory circuit 111 is applied to an AND gate 120 in the priority gate circuit 112. A reading condition signal RCS provided by a block detection circuit means (BL1 in this case) covering a tone range higher by one octave is applied, as a open control signal, to the AND gate 120 through an inverter 121. This reading condition signal RCS from the preceding stage and the output of the output of the flip-flop circuit 117 are delivered, as a reading condition signal RCS for the following stage, out of an OR circuit 122. In this description, as the 0th block BLO is of the final stage, the reading condition signal RCS is delivered outside.

An input from a line 123 connected to a "0" level (the ground level in this case) is employed as the reading condition signal RCS applied from the preceding stage to the block detection circuit means BL7 covering an octave corresponding to the highest tone range, and the reading condition signal RCS delivered to the following stage by the block detection circuit means BLO covering an octave corresponding to the lowest tone range is introduced, as a memory block signal MB (representing the presence of storage in one of the blocks), to the step control circuit 12E.

Thus, the priority gate circuit 112 is so designed that when a storage is in a block covering a higher tone range octave, reading the storage out of the block can be effected with priority, and that as long as a storage is present in one of the block detection circuit means, the memory block signal MB is continuously outputted.

The storage output of the memory circuit 111 passed through the priority gate circuit 112 is applied to an AND gate 124 in the reading circuit 113. A "2" state signal $2ST_1$ from the step control circuit 12E is applied, as an open control signal, to the AND gate 124. When the AND gate 124 receives the storage output from the priority gate circuit 112, the storage output is applied to an output line 125 with the timing of the "2" state signal $2ST_1$.

The output lines 125 of the block detection circuit means BL0 through BL7 are connected, in a predetermined combination, to the input terminals of three code converting OR gates 126. Therefore, when a storage is in the block detecting circuit means BL0 through BL7, the storage block number is applied, as a binary code signal $BC_1$, to the temporary memory circuit 12C with the timing of the "2" state signal $2ST_1$.

The temporary memory circuit 12C has memory circuits BM1 through BM3 which receive, in a parallel mode, the bits of the block number code signal $BC_1$ from the block detection circuit 12B. Each of the memory circuits BM1 through BM3 has a delay flip-flop circuit 131 for receiving the respective bit through an input OR gate 130, a feedback AND gate 132 for dynamically maintaining the storage in the delay flip-flop circuit 131, and an output AND gate 133.

The feedback AND gate 132 receives a "1" "3" state signal $1.3ST_1$ which arrives from the step control circuit 12E at the time of "1" or "3" state, maintains the content of the delay flip-flop circuit 131 for the period of "1" "3" state, and cancels the storage in the delay flip-flop circuit 131 so as to cause the latter 131 to newly store the block number code signal $BC_1$ which is outputted by the block detection circuit 12B at the time of "2" state. The output AND gates 133 receive a memory note signal MN which is applied thereto by the note detection circuit 12D when a note storage is present in the circuit 12D as described later, and deliver in a parallel mode, as a key code signal KC, the block number code signal BC which has been stored temporarily simultaneously when the note code signal NC has been outputted by the note detection circuit 12D.

The signal input-output circuit 112 in the block detection circuit 12B operates to apply information to the note detection circuit 12D according to the information concerning an operated key which the key switch circuit 12A has taken into the block detection circuit 12B. The signal input-output circuit 114 comprises charge-discharge capacitors CB1 connected to the signal input-output terminals L0 through L7 of the detection circuit means BL0 through BL7, a charging transistor 136 connected between the input-output terminals L0 through L7 and a logic "1" level power source 135, and a discharging transistor 137 connected between the input-output terminals L0 through L7 and the ground (whose logic level is 37 0").

When the storage in the memory circuit 111 is read out of the AND gate 124 in the reading circuit 112, which gate 124 is opened by the "2" state signal $2ST_1$ of the step control circuit 12E, the discharging transistor 137 receives the storage thus read out, as a result of which the capacitors CB1 are discharged and the levels of the terminals L0 through L7 are reset to the "0" levels. Similarly, the discharging transistor 137 receives the "0" state signal $OST_1$ from the step control circuit 12E through an OR gate 138, as a result of which the transistor 137 is rendered conductive to discharge the capacitor CB1.

On the other hand, the charging transistor 136 receives the output of the AND circuit 120 in the priority circuit 112 through an inverter 139 and through an AND gate 140 which receives the "2" state signal $2ST_1$ as its open control signal, as a result of which, when the memory circuit 111 is not in its storage state, the transistor 136 is rendered conductive to charge the capacitor CB1 to the logic "1" level. Thus, the input-output terminals L0 through L7 are maintained at the level "1".

In practice, the wiring capacitances of the wires connected to the input-output terminals L0 through L7 can be utilized as the charge-discharge capacitors CB1.

The signal input-output circuit 114 thus organized operates to receive signals from and to give signals to the signal input-output circuit 149 in the note detection circuit 12D through the key switch circuit 12A according to the state signal of the step control circuit 12E.

Now, the note detection circuit 12D will be described in more detail.

The note detection circuit 12D has twelve note detection circuit means NT1 through Nt12 corresponding to the notes (C, B, A#, . . . C#) included in one octave. Pairs of input-output terminals $TC\#_1$ and $TC\#_2$ through $TC_1$ and $TC_2$ thereof are connected through diodes $d_1$ and $d_2$ to the movable contacts of pairs of key switches $K_1$ and $K_2$ which are provided for the keys with the notes, respectively.

The note detection circuit means NT1 through NT12 are similar in construction to one another except for memory circuits thereof. Each note detection circuit means comprises a first memory circuit 145 corresponding to the first key switch $K_1$, a second memory circuit 146 corresponding to the second key switch $K_2$, a reading circuit 148, a priority gate circuit 147, and a signal input-output circuit 149.

For instance, the note detection circuit means NT1 for note "C#" having the input-output terminals $TC\#_1$ and $TC\#_2$ will be described. In the first memory circuit 145, when a "0" level signal is provided on the input-output terminal $TC\#_1$ (that is, when the key switch $K_1$ is closed) the signal is inverted into a "1" level signal by means of an inverter 150, and the "1" level signal thus obtained is received by a delay flip-flop circuit 153 through an input AND gate 151 which employs as its open control signal the "2" state signal $2ST_2$ applied thereto from the stop control circuit 12E and through an OR gate 152. In this flip-flop circuit 153, similarly as in the case of the memory circuit 111 in the block detection circuit 12B, the received "1" signal is written with the aid of the writing clock $\phi_C$, and the thereafter it is read out with the aid of the reading clock $\phi_D$. The signal thus read out is fed back to its input terminal through a feedback AND gate 154 and through an OR gate 152, and is subjected to angylar writing and reading with the aid of the following clocks $\phi_C$ and $\phi_D$. Thus, the signal is dynamically stored.

This memory state is maintained as long as a "1" reading condition signal RDS is applied to the feedback AND gate 154; however, it is reset by writing and reading with the aid of the clock pulses $\phi_C$ and $\phi_D$ the "0" output of the gate 154 when application of the reading condition signals RDS is suspended (that is, at the time of applying the "0" level signal).

On the other hand, the memory circuit 146 is similar in construction to the memory circuit 145 with the exception that it performs storage operation when a "0" level signal is applied to its input-output terminal $TC\#_2$ (that is, when the key switch $K_2$ is closed).

In this embodiment, an OR gate 165 is connected between the inverter 150 and the input AND gate 151 in the first memory circuit 145. Through this OR gate 165 the output of the inveter 160 of the second memory circuit 146 is applied to the flip-flop circuit 153 of the first memory circuit 145. Thus, in the case when no storage is made in the first memory circuit 145 due to some reason or other when the first key switch $K_1$ is operated, this erroneous operation is backed up by utilizing the signal of the second key switch $K_2$.

In the first memory circuit 145 of each of the circuit means NT1 through NT12, the input terminal of the flip-flop circuit 153 is connected to the OR gate 166. Therefore, if at least one memory circuit 153 has dynamically stored the "1" signal through the feedback gate 154, an any note signal AN (representing that any one of the circuit means NT1 through NT12 has a note storage) is outputted.

On the other hand, the outputs of the flip-flop circuits 153 and 163 in the memory circuits 145 and 146 are applied to AND gates 170 and 171 in the priority gate circuit 147, respectively. The reading condition signal RDS from the note detection circuit means NT12 through NT2 which are provided respectively for notes higher according to the arrangement of notes in one octave is applied, as an open control signal, through an inverter 172 to the AND gate 170 and 171. This reading condition signal RDS from the preceding stage is employed as the open control signal of the feedback AND gates 154 and 164 in the first and second memory circuits 145 and 146, and is delivered out, as a reading condition signal for the following stage, through an OR circuit 173 together with the output of the flip-flop circuit 153 in the first memory circuit 145.

An input signal from a line 174 connected to the "0" level (the ground level, in this case) is employed, as the reading condition signal RDS from the preceding stage, for the note detection circuit means NT12 for the highest note C. Thus, this note detection circuit means NT12 for the highest note C operates to read the stored data with the first priority.

The reading condition signal RDS for the following state from the note detection circuit means NT1 for the lowest note C# is applied, as a memory note signal MN, to the output gate 133 of the temporary memory circuit 12C, whereby when any one of the circuit means NT1 through NT12 in the note detection circuit 12D has data to be read out, the block number data stored in the temporary memory circuit 12C is outputted.

The storage outputs passed through the AND gates 170 and 171 are introduced to output lines 175 and 176. Outputs lines 175 of the note memory circuit means NT1 through NT12 are connected, in a predetermined combination, to the input terminals of four code converting OR gates 177, whereby when the storages in the circuit means NT1 through NT12 are read out, the memory note number thereof is outputted, as a 4-bit binary code signal, i.e., a note code signal NC, to the note number output terminals TN1 through TN4.

On the other hands, other output lines 176 of the memory circuit means NT1 through NT12 are connected to the input terminal of an OR gate 178, whereby a second key switch operation signal $KA_2$ representing the closure of the key switch $K_2$ and its timing delayed from the key switch $K_1$.

The signal input-output circuit 149 is to take the information which is applied thereto through the key switch circuit 12A from the signal input-output circuit 114 in the block detection circuit 12B. The circuit 149 comprises charge-discharge capacitors CN1 and CN2 which are connected respectively to the signal input-output terminals $TC\#_1$ and $TC\#_2$ through $TC_1$ and $TC_2$, a first charging transistor 180 connected between the first terminal $TC\#_1$ ($-TC_1$) and a first logic level "1" power source 179, and a second charging transistor 182 connected between the second terminal $TC\#_2$ ($-TC_2$) and a second logic level "1" power source 181.

In this embodiment, similarly as in the case of the capacitor CB1, the capacitors CN2 are obtained by utilizing the wiring capacitances between the note detection circuit 12D and the key switch circuit 12A.

These transistors 180 and 182 are rendered conductive by the "1""3" state signal $1.3ST_1$ provided by the step control circuit 12E, thereby to charge the capacitors CN1 and CN2 to the logic "1" level.

One example of the block detection circuit 12B and the note detection circuit 12D is as described above. These circuits operates in synchronization with the state signal of the step control circuit 12E as follows: It is assumed that the keys of notes $C_1$, $C_2$ and $E_2$ are operated simultaneously. In this case, the key of note $C_1$ belongs to the 0-th block, and the keys of notes $C_2$ and $E_2$ belong to the first block.

The "0" state is the stand-by state. The "0" state signal $OST_1$ operates to render conductive the discharging transistor 137 of the signal input-output circuit 114 in each of the detection circuit means BL0 through BL7 in the block detection circuit 12B. Accordingly, all the input-output terminals L0 through L7 have the "0" level.

In this operation, as the key switches of the note $C_1$ are closed, the terminal L0 of the block detection circuit 12B for the 0-th block is connected through the key switches K1 and K2 to the terminals $TC_1$ and $TC_2$ of the "C" note detection circuit means MT12 of the note detection circuit 12D, and similarly the terminal L1 of the block detection circuit for the first block is connected to the terminals $TC_1$ and $TC_2$ of the "C" note detection circuit means NT12 and to the terminals $TE_1$ and $TE_2$ of the "E" note detection circuit means $NT_4$. Therefore, the capacitors CN1 and CN2 connected to the terminals $TC_1$ and $TC_2$ and $TE_1$ and $TE_2$ are discharged through the diodes d1 and d2 and the key switches K1 and K2 by the transistor 137, and the capacitors will have the "0" level.

When this state is changed to the "1" state, the "1" state signal $1ST_1$ and the "1""3" state signal $1.3ST_1$ are outputted by the step control circuit 12E.

This signal $1.3ST_1$ is applied to the "C#" note detection circuit NT1 through the "C" note detection circuit NT12 in the note detection circuit 12D, and the transistors 180 and 192 thereof are rendered conductive. Therefore, through these transistors the capacitors CN1 and CN2 are charged. Simultaneously, the capacitors CB1 connected to the terminals L0 and L1 of the block detection circuit 12B are charged through the diodes $d_1$ and $d_2$ and through the key switches K1 and K2 of the operated "$C_1$", "$C_2$" and "$E_2$" keys. However, as the key switches K1 and K2 provided for the keys which are not operated are not closed, the capacitors CB1 thereof are not charged.

Thus, the logic "1" input is applied to the input-output terminals L0 and L1 of the blocks to which the operated keys belong (that is, the 0-th block including the "$C_1$" key and the first block including the "$E_2$" key). Therefore, the "any block" signal AB is applied from the block detection circuit 12B to the step control circuit 12E.

On the other hand, the "1" state signal $1ST_1$ is applied to the block detection circuit means BL0 through BL12 of the block detection circuit 12B, and the input gates 115 of the memory circuits 111 thereof are opened. Accordingly, the memory circuits 111 of the first block detection circuit means BL1 and the 0-th block detection circuit means BL0 to which the "1" input signal is applied are made to be in the storage state, that is, the block numbers (in this case the zeroth and first blocks) to which the operated keys belong are stored in the block detection circuit 12B.

When this state is changed to the "2" state, the step control circuit 12E outputs the "2" state signal $2ST_1$.

This "2" state signal $2ST_1$ is applied to the block detection circuit means BL0 through BL7 in the block detection circuit 12B; that is, it is applied, as an open control signal, to the output gates 124 of the reading circuits 113. In this case, as only the zeroth and first block detection circuit means BL0 and BL1 are in the storage state, the reading condition signal RCS is applied only to the AND gate 120 of the priority gate circuit 112 in the first block detection circuit means BL1 which is higher in priority. Therefore, the storage content of the memory circuit 111 in the first block detection circuit means BL1, that is, the binary code signal "0 0 1" is outputted, as a block number code signal $BC_1$, through the priority gate circuit 112 and the reading circuit 113. This 3-bit block number code signal $BC_1$ is applied to the temporary memory circuit 12C, and are stored therein through the input OR gates 130 of the bit memory circuits BM1 through BM3 provided respectively for the three bits of the signal.

When the data stored in the first block detection circuit means BL1 is read out whereby the output of the output gate 124 of the reading circuit 113 is raised to the level "1", this output is applied through the inverter 128 to the feedback gate 118 to close the latter. Therefore, the flip-flop circuit 117 writes and reads the signal "0" with the aid of the clock pulses $\phi_C$ and $\phi_D$ of the next period, as a result of which the first block memory circuit BL1 is reset. In this case, the level of the reading condition signal RCS for the following stage is lowered to the "0" level, whereby the reading conditions of the block (the zeroth block in the case) which is next in a decreasing priority order are provided.

On the other hand, the first block number storage output at the logic "1" read out of the priority gate 112 is applied to the discharging transistor 137 of the block detection circuit means BL1 thereof to render the transistor 137 conductive. Accordingly, the capacitor CB1 in the first block is discharged through the transistor 137. In addition, the capacitors CN1 and CN2 of the circuit means (in this case, the "C" and "E" note detection circuit means NT12 and NT4) corresponding the notes of the keys operated presently which belong to the first block out of the circuit means of the note detection circuit 12D are discharged through the transistor 137 of the block detection circuit means BL1. Thus, the logic "1" input signal is applied to the "C" and "E" note detection circuit means NT12 and NT4 corresponding to the operated keys' notes.

On the other hand, the second "2" state signal $2ST_2$ is applied to the note detection circuit means NT1 through NT12 by the step control circuit 12E so that the input gates 151 and 161 of the first and second memory circuits 145 and 146, as a result of which the memory circuits 145 and 146 of the "C" and "E" note detection circuit means NT12 and NT4 to which the "1" input has been applied are placed in storage state. Thus, the notes of the keys which belong to the first block out of the keys operated (the note "C" and "E" in this case) are stored in the note detection circuit 12D.

In this case, the reading condition signal RDS at the logic "0" is applied to the priority gate circuit 147 of the "C" detection circuit means NT12 which is higher in priority out of the "C" and "E" note detection circuit means NT12 and NT4, and the storages in the first and second memory circuits 145 and 146 are read out. As a result, the binary code signal "0 1 1 1" is delivered, as a note code signal NC, to the output terminals TN1 through TN4 through the gate 177 of the reading circuit 148 by the first memory circuit 145, while the second key switch operation signal "1" representing the operation of the second key switch K2 is applied to the output terminal $TKA_2$ through the gate 178 of the reading circuit 148 by the second memory circuit 146.

In practice, the second key switch K2 is operated after the first key switch K1 has been operated as was described with reference to FIGS. 3A and 3C. The difference in operation time between the two switches corresponds to the speed of the key operation. The period of the clock pulses $\phi_C$ and $\phi_D$ is so selected that the operation time difference is much longer than the period of the clock pulses $\phi_C$ and $\phi_D$. Therefore, the storing and reading operations of the first and second memory circuits 145 and 146 of the note detection circuit means NT1 through NT12 are not effected at the same time, that is, they are carried out with a time difference.

In this connection, as the storages have been provided in the "C" and "E" note detection circuit means NT12 and NT4, the output gate 133 of the temporary memory circuit 12C is opened by the memory note signal MN delivered by the note detection circuit means NT1 having the lowest priority, and the block number code signal BC1 "1 0 0" stored in the temporary memory circuit is delivered to the output terminals TB1 through TB3.

Accordingly, the 7-bit key code signal "0 1 1 1 1 0 0" whose content is the key number of the key (which is the "$C_2$" key in this case) which belongs to the highest tone range octave (which is the first octave in this case) and which has the highest note out of the keys operated is outputted, as a key code signal KC, to the output terminal TN1 through TN4 and TB1 through TB3.

Thus, when one memory circuit 145 or more in the note detection circuit means NT1 through NT12 carry out the storing operation, the any note signal AN is delivered to the step control circuit 12E. Under this condition, the "3" state follows the "2" state, and the step control circuit 12E outputs the "1""3" state signal $1.3ST_1$ again.

This signal $1.3ST_1$ renders the charging transistors 180 and 182 of the note detection circuit means NT1 through NT12 conductive again, so as to charge the capacitors CN1 and CN2 again.

On the other hand, the "1""3" state signal $1.3ST_1$ is applied to the feedback gate 132 of the temporary memory circuit 12C, and the output of the flip-flop circuit 131 is fed back to the input terminal again upon application of the first clock pulses $\phi_C$ and $\phi_D$. Therefore, the temporary memory circuit 12C stores the same block number code signal $BC_1$ again.

In the "C" note detection circuit means NT12, the storage in the memory circuit 145 is reset by the first clock pulses $\phi_C$ and $\phi_D$ (because the feedback gate 154 has been closed by the logic "0" signal from the line 174), while the "E" note detection circuit means NT4 stores the logic "1" signal again (because the feedback gate 154 has been opened by the reading condition signal RDS having the logic "1" level from the "C" note detection circuit means NT12).

Thus, the storage in the "C" note detection circuit means NT12 is reset in the first period of the clock pulses $\phi_C$ and $\phi_D$, so that the level of the reading condition signal RDS to the priority gate 147 of the "E" note detection circuit means NT4 is lowered to the "0" level. As a result, the "1" output of the "E" note detection circuit means NT4 is read out through the output gate 170. Thus, the "E" note code "0 0 1 0" is read out of the reading circuit 148.

Thus, the key code signal "0 0 1 0 1 0 0" representing the fact that the key having the note "E" and belonging to the first block, i.e., the "E" key has been operated, is delivered to the output terminals NT1 through NT4 and TB1 through TB3.

When all the notes stored in the note detection circuit 12D are read out in this manner, the storage in the "E" note detection circuit NT4 is reset with the period of the clock pulses $\phi_C$ and $\phi_D$, and the any note signal AN has the logic "0". In this case, the step control circuit 12E provides the "2" state again under the condition that the memory block signal MB is provided by the block detection circuit 12B. That is, the step control circuit 12E applies the "2" state signal $2ST_1$ to the reading circuits 113 in the block detection circuit means BL0 through BL7. In this case, similarly as in the case of the above-described first block with the exception that the storage in the zeroth block which has not been read out yet is read out through the reading circuit 113, the 0-th block number is read, as a code signal "0 0 0", into the temporary memory circuit 12C, and the discharging transistor 137 is rendered conductive, so that the capacitor CB1 is discharged and the capacitors CN1 and CN2 in the "C" note detection circuit means NT12 are discharged through the key switches K1 and K2 of the "$C_1$" note, thereby to place the memory circuits 145 and 146 in the "C" note detection circuit means NT12 in storage state.

In this operation, the "3" state is provided again, and the data stored in the memory circuits 145 and 146 are immediately read out, and are delivered, as the "C" note code signal "0 1 1 1", out of the reading circuit 148. Thus, the key code signal "0 1 1 1 0 0 0" representing the fact that the key having the "C" note code belonging to the 0-th block, i.e., the key having note "C" has been operated is delivered to the outputer terminals TN1 through TN4 and TB1 through TB3.

When the above-described operation has been completed, in the memory circuit 145 of the "C" note detection circuit means NT12 the feedback gate 154 has been closed (because the reading condition signal RDS from the line 174 is at the logic "0" level). Therefore, no any-note signal AN is provided by the note detection circuit 12D, and no memory-block signal MB is provided by the block detection circuit 12B, and accordingly the "0" state, that is, the standby state is provided.

The operations of the various sections in the key coder 12 such as the start of the storage operations in the block detection circuit means BL0 through BL7 and the delivery of the signals from the block detection circuit means BL0 through BL7 to the note detection circuit means BT1 through NT12 are controlled by a step control signal which is provided in synchronization with a master clock in the step control circuit 12E.

The step control circuit 12E is started by a start pulse TC generated by a start pulse generating circuit 12F, and thereafter generates the above-described step control signals $0ST_1$, $1ST_1$, $2ST_1$, $2ST_2$, and $1.3St_1$ in synchronization with the data transferring clock pulses $\phi_C$ and $\phi_D$.

In this example, the start pulse generating circuit 12F comprises a low frequency clock oscillator 181 which is, for instance, a square wave generating circuit, and a delay flip-flop circuit 182 connected to the output of the oscillator 181. The output of the oscillator 181 is applied to one input of a 2-input AND circuit 183. The output of the flip-flop circuit 182 is applied through an inverter 184 to the other input of the AND circuit 183. Thus, the start pulse generating circuit 12F delivers the start pulse TC whose level is at the logic "1" for the period of from the time instant when the flip-flop circuit 182 writes a logic "1" signal therein with the aid of the clock pulse $\phi_C$ to the time instant when it is read out with the aid of the clock pulse $\phi_D$ after the output of the oscillator 181 has been raised to the logic "1" level in the AND circuit 183.

The oscillation frequency of the low frequency clock oscillator 181 is determined mainly from conditions required in detecting the operation of the keyboard. For instance, it is determined so as not to be affected by chattering. More specifically, it is selected so that its period is of the order of 200 μs to 1 ms.

In this connection, the period of the clock pulses $\phi_C$ and $\phi_D$ is sufficiently short so as to be convenient for making a one circulation transfer of the data of the tones included in the maximum number of simultaneously produced tones. The data transferring clock pulses are generated by a frequency signal generating circuit 13A in a channel processor 13 as shown in FIG. 7C.

Figure 5:
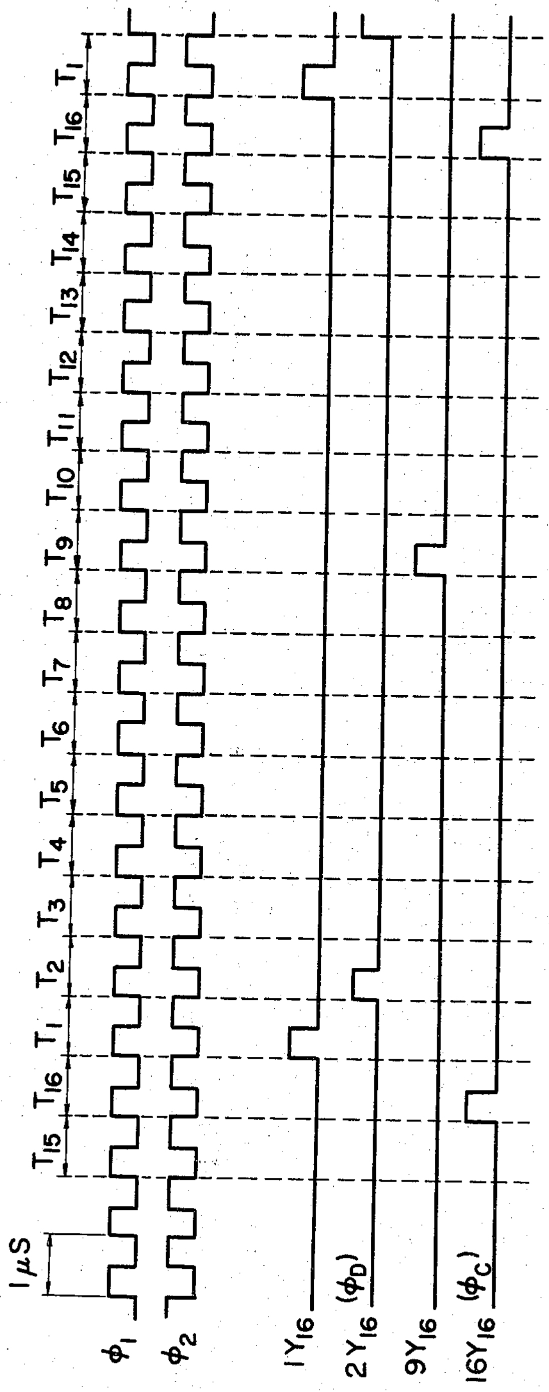
FIG. 5 is a signal waveform diagram illustrating master clock pulses and timing signals related to the master clock pulses.

The frequency signal generating circuit 13A comprises a 4-stage full-adder 185, and four delay flip-flop circuits 186 connected respectively to the stages of the full-adder. A master clock pulse $\phi_1$ having a period $\tau$ of 1 μs generated by a master clock oscillator (not shown) is applied, as a writing clock pulse, to each flip-flop circuit 186 (FIG. 5, $\phi_1$), while a master clock pulse $\phi_2$ delayed by a ½ period from the master clock pulse $\phi_1$ is applied, as a reading clock pulse, thereto (FIG. 5, $\phi_2$). Therefore, the full-adder 185 responds when the flip-flop circuits 186 operate every period $\tau$ of the master clock pulses $\phi_1$ and $\phi_2$, as a result of which binary coded hexadecimal code outputs (having "1", "2", "4" and "8" bits) which step with the period $\tau$ of the master clock pulses $\phi_1$ and $\phi_2$, are provided through the output terminals of the flip-flop circuits 186.

By suitably combining the binary coded hexadecimal code outputs a timing pulse having a period of 16 $\tau$ and a pulse width equal to one period of the clock pulse $\phi_1$ can be formed. In this embodiment, as indicated by $1Y_{16}$, $2Y_{16}$, $9Y_{16}$ and $16Y_{16}$ in FIG. 5, the first, second, ninth and sixteen timing pulses $1Y_{16}$, $2Y_{16}$, $9Y_{16}$ and $16Y_{16}$ are produced by AND circuit 188, 189, 190 and 191 in the signal generating circuit 13A. Out of these timing pulses, the 16th and 2nd timing pulses $16Y_{16}$ and $2Y_{16}$ are emplyed as the date transferring clock pulses $\phi_C$ and $\phi_D$ of the key coder 12.

The reason for generating the timing signal having a period of 16 $\tau$ resides in that the number of tones to be produced concurrently is selected to be sixteen. More specifically, the electronic musical instrument in this embodiment has a line of 88 keys as in a piano, and therefore keys corresponding to ten fingers of both hands may be operated simultaneously, and furthermore some of the keys which have been operated may have decaying waveforms. By taking these into account, it is made possible to simultaneously produce sixteen tones in total.

The master clock pulses $\phi_1$ and $\phi_2$ are divided for every 16 periods. With the periods in the 16 periods as time slots, data of tones to be simultaneously produced are assigned thereto respectively, and the corresponding data (which may be referred to as "the relevant data" when applicable) are transferred and processed in the respective time slot. Hereinafter, the first, second . . . sixteenth period intervals $T_1, T_2 \ldots T_{16}$ of the master clock pulse $\phi_1$ will be referred to as the first, second, . . . sixteen channels, respectively.

With such technical concept as described above, the channel processor 13 operates to process the data of each tone in synchronization with the master clock pulses $\phi_1$ and $\phi_2$. In this connection, in order to cause the key coder 12 to discriminate which key has been operated, the step control circuit 12E utilizes the timing signal $\phi_C$ and $\phi_D$ which are generated by the period signal generating circuit 13A in synchronization with the master clock pulses $\phi_1$ and $\phi_2$.

The synchronizing signals $16Y_{16}$ and $2Y_{16}$ thus generated are utilized as the writing and reading clock pulses $\phi_C$ and $\phi_D$ for the delay flip-flop circuits in the key coder 12. Thus, each of the delay flip-flop circuits repeats the writing and reading operation once every 16 periods of the master clock pulses $\phi_1$ and $\phi_2$ continuously.

The step control circuit 12E comprises a step counter 203 which is made up of two delay flip-flop circuits 201 and 202 receiving the writing clock pulse $\phi_C$ and the reading clock pulse $\phi_D$, and a gate circuit 204 which operates to control the stepping operation of the step counter and form state signals according to the stepping conditions thereof.

The gate circuit 204 is started by the start pulse TC applied thereto by the start pulse generating circuit 12F, and receives the any-block signal AB and memory-block signal MB provided by the block detection circuit 12B and also the any-note signal AN provided by the note detection circuit 12D, thereby to provide four states: that is, a "0" state (or standby state), a "1" state (in which a block to which an operated key belongs is detected), a "2" state (in which the note of a key belonging to the detected block, out of the operated keys is detected), and a "3" state (in which according to the block and note detection results, a key code is delivered).

These states, as indicated in Table 2 below, are established by the outputs Q of the flip-flop circuits 201 and 202, and by the inverted outputs $\overline{Q}$ thereof obtained through inverters 205 and 206.

TABLE 2

| | | States | | | |
|---|---|---|---|---|---|
| | | "0" | "1" | "2" | "3" |
| Outputs of Flip-flop | Q | 0 | 0 | 1 | 1 |
| 201 | $\overline{Q}$ | 1 | 1 | 0 | 0 |
| Outputs of Flip-flop | Q | 0 | 1 | 0 | 1 |
| 202 | $\overline{Q}$ | 1 | 0 | 1 | 0 |

When the start pulse TC is applied to the step control circuit 12E which is in the "0" state (which is the standby state, in which the outputs Q of the flip-flop circuits 201 and 202 are "0" and "0", respectively), the start pulse TC is applied to an AND gate 207 in a state control circuit 206 of the gate circuit 204. In this operation, as the outputs $\overline{Q}$, "1" and "1", of the flip-flop circuits 201 and 202 are applied as the other input conditions thereto, the AND gate 207 produces its output "1" which is applied to the first flip-flop circuit 202 through its input OR gate 212.

Thus, the data "0" and "1" are stored in the flip-flop circuits 201 and 202 with the aid of the writing and reading clock pulses $\phi_C$ and $\phi_D$, as a result of which the "1" state is provided. In this operation, the output $\overline{Q}$ of the circuit 201 and the output Q of the circuit 201 are applied to an AND gate 217 of the state signal output circuit 214, as a result of which the circuit 214 produces the "1" state signal $1ST_1$.

Thus, the block detection circuit 12B is operated by the "1" state signal $1ST_1$ thereby to detect and store the block to which the key switches operated in the key switch circuit 12A belong. In this connection, it should be noted that if a key in any one of the blocks is operated, the any-block signal AB is returned to the step control circuit 12E, and that if any one of the block detection circuit means BL0 through BL7 carries out the storage operation, the memory-block signal MB is returned to the step control circuit 12E.

The any-block signal AB is returned to the step control circuit 12E.

The any-block signal AB is applied to an AND gate 211 (to which the output $\overline{Q}$ of the circuit 211 and the output Q of the circuit 202 have been applied) of the step control circuit 12E, and the "1" output from the gate 211 is applied to an input OR gate 213 of the circuit 201. On the other hand, as the start pulse TC has not been applied to the AND gate 207 in the state control circuit 206, the "0" output is applied to the input OR gate in the circuit 202.

The "1" and "0" signals are stored in the circuit 201 and 202 with the aid of the clock pulses $\phi_C$ and $\phi_D$ of the next period, and the "2" state is obtained.

Therefore, the first "2" state signal $2ST_1$ is provided by the AND gate 216 of the state signal output circuit 214, and in this case under the condition that the memory-block signal MB is applied by the block detection circuit 12B the second "2" state signal $2ST_2$ is provided by the AND gate 218.

This first "2" state signal $2ST_1$ is applied to the reading circuit 113 in the block detection circuit 12B, and the number of a block which is highest in priority output of the blocks stored is coded and read into the temporary memory circuit 12C, while the signal of the note of the key operated is delivered to the note detection circuit 12D through the signal input-output circuit 114 and through the key switch circuit 12A. On the other hand, the second "2" state signal $2ST_2$ is applied to the first and second memory circuits 145 and 146 and is stored therein.

When the note is stored in the note detection circuit 12D at the time of the "2" state, the any-note signal AN is returned back to the step control circuit 12E and is applied to an AND gate 209 of the state control circuit 206. Therefore, the "1" and "1" signals are stored in the circuits 201 and 202 through the input OR gates 212 and 213 with the aid of the next period clock signals $\phi_C$ and $\phi_D$, as a result of the which the "3" state is obtained.

In this operation, in the note detection circuit 12D, the number of a note which is highest in priority out of the notes stored is coded through the reading circuit 148 and is delivered to the output terminals TN1 through TN4.

At the same time, the block number is read out to the output terminal of the temporary memory circuit 12C and is applied to the output terminals TB1 through TB3. Therefore, the key code signal KC is delivered to the terminals TB1 through TB3 and TN1 through TN4.

On the other hand, in the case of the "3" state, the output Q of the circuit 202 of the step control circuit 13E is produced as the "1""3" state signal $1.3ST_1$ again. This output is applied to the signal input-out circuit 149 in the note detection circuit 12D, as a result of which the note detection signal transferring state from the block detection circuit 12B to the note detection circuit 12D is reset. Simultaneously, the signal $1.3ST_1$ is applied to the temporary memory circuit 12C to renew the storage therein.

When the number of notes stored in the note detection circuit 12D is one, the storages in the first and second memory circuits 145 and 146 are reset at the time of the "3" state and therefore the arrival of any note signal AN is suspended. Accordingly, the output level of the gate 209 in the state control circuit 206 of the step control circuit 12E is lowered to the "0" level.

In the case where only one block has been stored in the block detection circuit 12B, the level of the memory-block signal MB has the "0" level at the time of the "3" state. Therefore, no "1" output is provided by the AND gate 210 of the state control circuit 206, and therefore the signal "0" is applied to the circuits 201 and 202.

On the other hand, the circuits 201 and 202 are placed in conditions where signals "0" and "0" are stored, with the aid of the writing and reading clock pulses $\phi_C$ and $\phi_D$ in the next period, as a result of which the "0" state, or standby state, is obtained again.

When two blocks or more have been stored in the block detection circuit 12B, even at the time of the "3" state concerning one block the arrival of the memory-block signal is continued, and therefore an output "1" is obtained at the gate 210 of the state control circuit 206 and is applied to the circuit 201.

Accordingly, the circuits 201 and 202 store signals "1" and "0" with the aid of the writing and reading clock pulses $\phi_C$ and $\phi_D$ in the next period, and the "2" state signal $2ST_1$ is delivered out of the gate 216 of the state signal output circuit 214. Thus, the "2" state is obtained, and thereafter similarly as in the above-described case, the "3" state is obtained with the aid of the next writing and reading clock pulses $\phi_C$ and $\phi_D$.

This repetitive operation is carried out until all of the blocks stored in the block detection circuit 12B are eliminated, whereupon the arrival of the memory-block signal MB from the block detection circuit 12B is suspended at the time of "3" state, and the "0" state is obtained with the aid of the clock pulses $\phi_C$ and $\phi_D$ in the next period.

The case where the number of blocks detected is plural has been described. In the case where the number of detected notes included in one block is plural, the "3" state is maintained until all of the detected notes are read out in the note detection circuit 12D.

More specifically, in the "3" state, the arrival of the any-note AN from the note detection circuit 12D are still continued, and therefore the output "1" is continuously obtained at the gate 209 of the state control circuit 206. Accordingly, the "3" state is maintained even when the clock pulses $\phi_C$ and $\phi_D$ of the next period arrive.

As is apparent from the above description, the step control circuit 12E carries out its stepping operation as follows:

(a) When one key is depressed, the following one circulation operation is carried out: "0"→"1"→"2"→"3"→"0" state.

(b) When a plurality of keys (notes) are operated with respect to the keys of one block, the "3" state is maintained until all the notes are read out as follows: "0"→"1"→"2"→"3" . . . "3"→"0".

(c) When with respect to each of a plurality of blocks one key is operated, the stepping operation, "2"→"3"→"2" state, is repeated until the reading concerning all the blocks are completed as follows: "0"→"1"→"2"→"3"→"2"→"3" . . . "2"→"3"→"0" state.

(d) When with respect to a plurality of blocks, a plurality of notes are stored respectively, the "3" state maintaining operation ("3"→"3" . . . "3"), and the ("2"→"3"→"2") state stepping operation repetition are combined as follows: "0"→"1"→"2"→("3"→"3" . . . "3")→"2"→("3"→"3" . . . "3")→"2" . . . "2"→("3"→"3" . . . "3")→"0".

Besides the above-described construction, the step control circuit 12E has a key-off detection timing signal output circuit 220. In order to determine whether or not a key release operation has been made with respect to the generation of the key code signal KC in the key coder 12, a key-off detection timing signal X is applied to the channel processor 13.

The key-off detection timing signal output circuit 220 has AND gates 221 and 222 which receive the start pulse TC from the start pulse generating circuit 12F. Receiving the output $\overline{Q}$ of the flip-flop circuits 201 and 202 and an output TMO supplied through the count finish output terminal of a timing counter 12G, the AND gate 222 outputs a pulsive "1" output upon arrival of the start pulse TC at the time of the "0" state. This output is delivered, as the signal X, to the output terminal TX, and is also delivered, as a count start pulse TMI, to the timing counter 12G through an OR circuit 223. In this case, the counter 12G carries out a "1" addition operation whenever the clock pulses $\phi_C$ and $\phi_D$ are applied thereto, and keeps the output TMO at the "0" level during this addition operation.

In the signal output circuit 220, this "0" output TMO is inverted by an inverter 224 and is then applied to the AND gate 221. Thus, the "1" addition operation is effected by applying the "1" output to the counter 12G through the OR gate 223 when the start pulse TC is delivered from the start pulse generating circuit 12F. This count operation is repeated whenever the start pulse generating circuit 12F generates the start pulse TC. Thus, when the period of time consisting of sixteen periods of the output of the low frequency oscillator 181 passes, all the bit outputs of the counter 12G have the "1" level and the output TMO has the "1" level also, and thereafter the count operation through the AND gate 221 is suspended and the arrival of the start pulse in the next "0" state is waited.

In the timing counter 12G, reference numeral 226 designates a 4-stage full-adder, 227 delay flip-flop circuits connected to the four stages of the full-adder 226 for carrying out storage operation with the aid of the writing and reading clock pulses $\phi_C$ and $\phi_D$, and 228 an output AND gate which receives the outputs of the flip-flip circuits 227 and provides the output TMO when all the inputs are at the "1" level.

Figure 6:
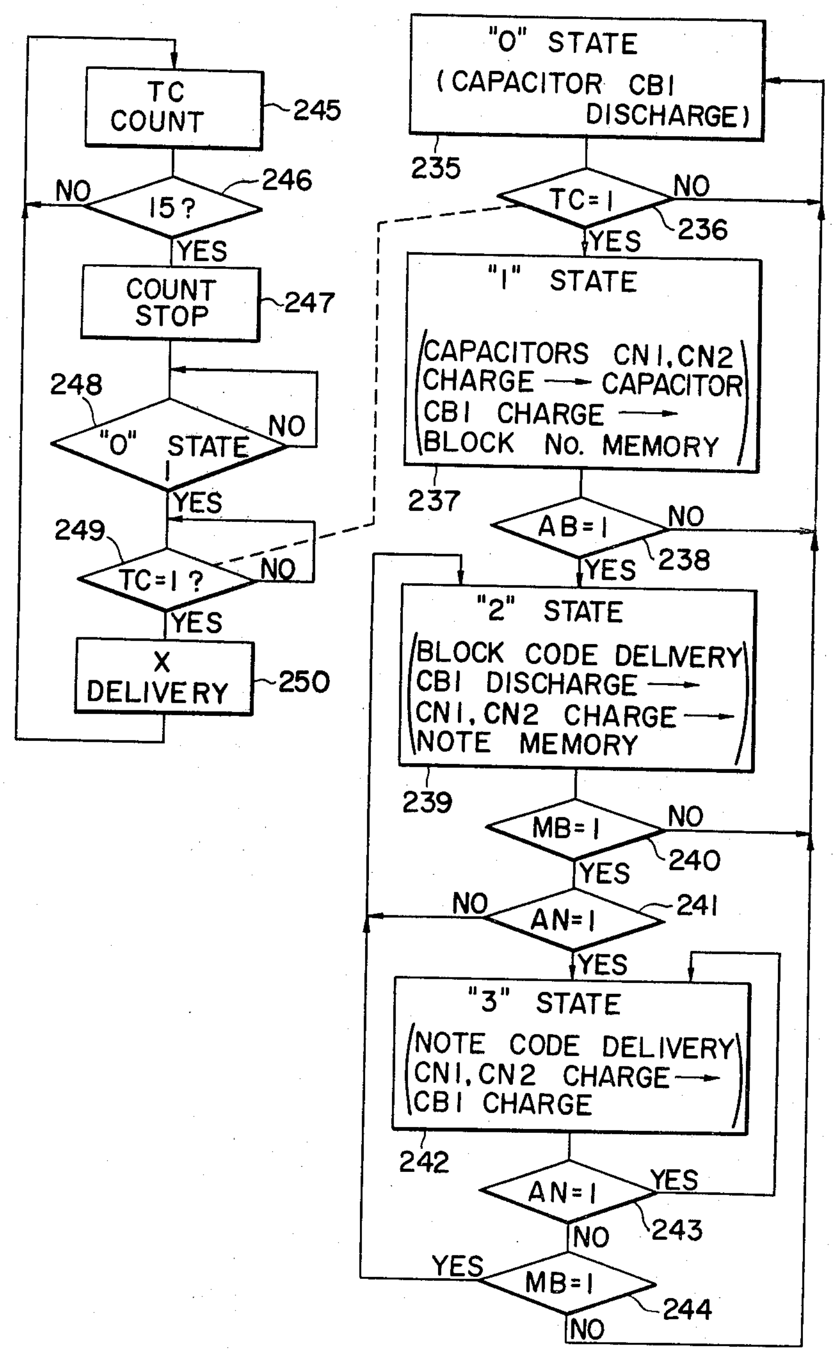
FIG. 6 is a flow chart for a description of the key coder shown in FIG. 2.

The operation of the key coder 13 can be summarized as indicated in FIG. 6 which is a flow chart.

Step 235 is a step to obtain the "0" state, in which the capacitors CB1 in the block detection circuit 12B are maintained discharged by the "0" state signal $OST_1$ from the step control circuit 12E, and the standby state is, as a whole, maintained.

In Step 236, it is confirmed whether TC=1 or not, than is, it is confirmed whether or not the start pulse TC is generated by the start pulse generating circuit 12F. If the start pulse TC is not generated, then the "0" state is maintained. However, upon confirmation of the generation of the start pulse, the operation is advanced to the next Step 237.

This Step 237 is to obtain the "1" state. The capacitors CN1 and CN2 of the note detection circuit 12D are charged by the "1""3" state signal $1.3ST_1$, as a result of which the capacitor CB1 of the block detection circuit 12B is charged through the key switches being operated. At the same time, the input gate 115 to the memory circuit 111 corresponding to the block to which the key switches K1 and K2 of the block detection circuit 12B belong is opened by the "1" state signal $1ST_1$, and the charge state of the capacitor CB1 is stored in the memory circuit 111. Thus, the key presently operated is stored in the block to which it belongs.

This result is obtained by confirming whether or not the any-block signal AB has been delivered (whether AB=1 or not) in Step 238. If AB=1 (which means that a key being operated is included in any one of the blocks), the operation is advanced to the next Step 239. If not, the operation is returned to Step 235, the standby state in the "0" state.

Step 239 is to obtain the "2" state. The reading circuit 113 of the block detection circuit 12B is operated by the "2" state signal $2ST_1$ of the step control circuit 12E. The reading circuit 113 operates to read out a block highest in priority out of the stored blocks, and delivers the block code signal $BC_1$ of the content of the block. At the same time, the capacitor CB1 connected to the block detection circuit means which has carried out its reading operation is discharged. In this operation, the capacitors CN1 and CN2 of the note detection circuit connected through the key switches K1 and K2 to that capacitor CB1 are also discharged through the connection loop. On the other hand, the discharge states of the capacitors CN1 and CN2 are written in the first and second memory circuits 145 and 146 of the note detection circuit 12D with the aid of the "2" state signal $2ST_2$ from the step control circuit 12E.

Then, in Step 240, it is confirmed that the memory-block detection signal MB is applied from the block detection circuit 12B to the step control circuit 12E (that is, any one of the blocks is stored). Furthermore, in Step 241, it is confirmed that the any-note detection signal AN from the note detection circuit 12D is applied to the step control circuit 12E (that is, any note is stored). Thereafter, the operation is advanced to Step 242. In this case, if (MB=1) is not obtained in Step 240, there are no memory data to be processed, the operation is returned to Step 235, the standby state.

Step 242 is to obtain the "3" state. In this case, the note detection circuit 12D reads out the notes stored therein, in the decreasing priority order. At the same time, the capacitors CN1 and CN2 of the note detection circuit 12D are charged by the "1""3" state signal $1.3ST_1$, thereby to block the application of the input to the note detection circuit 12D. With this timing, the memory circuits 145 and 146 of the note detection circuit 12D carry out the reading operation, and the notes are coded and outputted through the reading circuit 148 starting from a note highest in priority order.

This operation is repeatedly performed as long as the presence and absence of the any-note AN is confirmed in Step 243 (that is, the operation is returned to Step 242 from Step 243). On the other hand, if (AN=1) is not available, it means that the memory reading operations with respect to all the notes stored in the note detection circuit 12D has been completed. Therefore, the operation is advanced to the next Step 244.

This Step 244 is to confirm whether or not MB=1. If MB=1, it means that the block data to be processed are still present in the block detection circuit 12B. Therefore, the operation is returned to Step 239 again, where the block data are processed. On the other hand, if (MB=1) is not available, then the step control circuit outputs the "0" state signal $OST_1$. Thus, all the operations have been completed, and Step 235, or the standby state, is obtained.

The above-described operation is repeated whenever the start pulse TC is outputted by the start pulse generating circuit 12F.

In association with the start pulse TC, the key-off detection timing signal X is delivered out with the aid of the start pulse TC in accordance with the following Steps and in association with the delivery operation of the key code signal KC described above.

More specifically, first of all, in Step 245, the start pulse TC generated by the start pulse generating circuit 12F is counted by the counter 12G, and when an overflow output TMO is provided, it is detected in Step 246, and the operation is advanced to Step 247.

In this operation, the step control circuit 12E suspends the delivery of the "1" addition signal TMI to the counter 12G.

When, under this condition, the step control circuit 12E has a state where the "0" state signal $OST_1$ can be delivered, it is detected in Step 248, and the timing at which the start pulse TC has been delivered is confirmed in Step 249. After this confirmation, the step control circuit 12E delivers the key-off timing signal X in the next Step 250.

Upon completion of the delivery of the signal X, the operation is returned to Step 245 to start the counting of the start pulse TC again.

Thus, under the condition that the count number of the start pulses TC generated after the delivery of the key code signal KC reaches "15", the key-off timing signal X is delivered after the key code signal KC has been delivered.

(1-3) Channel Processor

The channel processor 13 operates to assign the date of tones to be produced simultaneously to the respective first through sixteen channels and to store one after another them therein, and to successively deliver the data thus stored in synchronization with the master clock pulses $\phi_1$ and $\phi_2$. The channel processor 13 is illustrated in FIGS. 7A through 7D in more detail. The number of memory channels (16 in this embodiment) is equal to the maximum number of simultaneously produced tones, and if there is a channel which has no memory data out of all the channels (hereinafter referred to as "an empty channel" when applicable), a new key code data from the key coder 12 is written in the empty channel and is set therein. The key code data thus stored is not reset as long as the corresponding key is being depressed in the keyboard. Furthermore, even after the key is released, if it is required to decay the tone, the key code data is not reset before the decay part's amplitude reaches a predetermined value.

The storage of the key code data in the channel processor 13 is dynamically performed by repeatedly circulating, in a series mode, the date of the first through sixteenth channels with the aid of the master clock pulses $\phi_1$ and $\phi_2$. The data of the first through sixteenth channels are monitored at one point in the circulation loop, and the data of the channels are read out successively whenever one circulation of the sixteen channels is completed. Therefore, the contents of the channels are read out and checked with a period equal to sixteen periods of the master clock pulses $\phi_1$ and $\phi_2$.

The channel processor 13 comprises a sample hold circuit 13B, a key code memory circuit 13C, a key code comparison control circuit 13D, a key operation discrimination circuit 13E, a timing control circuit 13F, and a truncation circuit 13.

The sample hold circuit 13B operates to receive and temporarily store the 7-bit key code signal KC from the key coder 12, the key-off timing signal X, and a second key switch operation signal $KA_2$. The key code memory circuit 13C operates to selectively assign the received key code signal KC to the sixteen channels. In the key code comparison control circuit 13D, the key code signal temporarily stored in the sample hold circuit 13B is compared with the contents of the channels in the key code memory circuit 13C, and a control condition signal is outputted according to the comparison result. The key operation discrimination circuit 13E operates to obtain data concerning the touch of key operation. The timing control circuit 13F operates to command and control the timing with which the reception, storage and comparison of the data should be effected by the above-described elements. When no empty channel is available and a new key code data is supplied, the truncation circuit 13G replaces the old key code data with the new key code data.

The sample hold circuit 13B operates to apply the key code signal KC (consisting of the bits N1 through N4 of the note code signal NC, and the bits B1 through B3 of the block code signal BC) from the key coder 12, the key-off detection timing signal X, and the second key switch operation detection signal KA2 through gates circuits 231 to memory elements 232 to store them therein, respectively.

In this embodiment, the gate circuits 231 are field effect transistors. When the gate circuits 231 are opened by the timing signal $1Y_{16}$ ($1Y_{16}$ in FIG. 5) of the first channel in a synchronization signal generating circuit 13A (FIG. 7C) simultaneously, the logic "1" or "0" levels applied thereto restored in the memory elements 232.

The data thus stored in the memory elements 232 are maintained until the arrival of the timing signal $1Y_{16}$ of the next cycle. In this case, if the contents of the data applied thereto are the same, the storages in the memory elements are maintained unchanged; but if the contents of the key code applied is changed, the memory states of the memory elements for the bits whose contents are changed are changed.

The contents of the memory elements 232 for the bits of the key code signal KC are applied, in a parallel mode, to input data temporary memory circuits 233 in a key code memory circuit 13C. The temporary memory circuits 233 are made up of delay flip-flop circuits which carry out the writing operations with the aid of the timing signal $9Y_{16}$ ($9Y_{16}$ in FIG. 5) of the 9th channel of the synchronization signal generating circuit 13A and the reading operations with the aid of the timing signal $1Y_{16}$ (FIG. 5) of the first channel applied thereafter.

As is apparent from the above description, after the holding state of the data written in the sampling hold circuit 13B being stabilized by the first timing signal $1Y_{16}$, the stabilized data are written in the temporary memory circuit 233 by the timing signal $9Y_{16}$ and are read out thereof by the timing signal $1Y_{16}$ of the second cycle. Therefore, even if the opposite logic level is stored in the sampling hold circuit 13B by the timing signal $1Y_{16}$ of the second cycle, the storage state is maintained unchanged for at least one period until the timing signal $1Y_{16}$ of the third cycle is obtained. The data stored in the temporary memory circuits 233 are applied through AND gates 235 and OR gates 236 in an input gate circuit 234 to empty channels out of the first through sixteenth channels, and stored therein for one period of the timing signal $1Y_{16}$, as required.

A memory circuit unit 237 is made up of seven 16-stage/1-bit shift registers RG1 through RG7 corresponding respectively to the bits of the key code KC. In each stage of the shift register, writing the content of the proceding stage is carried out with the aid of the first master clock pulse $\phi_1$, and the content written is read out with the aid of the second master clock pulse $\phi_2$. Accordingly, the contents of the seven registers RG1 through RG7 are simultaneously shifted as much as one stage by the master clock pulses $\phi_1$ and $\phi_2$. The output of the 16th stage is fed back to the input terminal of the 1st stage through the circulating AND gate 238 and the OR gate 236 in the input gate circuit 234, and accordingly the contents in the stages are dynamically stored. Thus, with respect to the registers RG1 through RG7, the contents of the particular stages (or the 1st through 16th stages) obtained at a given time instant represent the 7-bit key code for one channel. For instance, the contents of the first stages of the registers RG1 through RG7 represent the one-tone seven-bit key code KC. Accordingly, the memory circuit unit 237 stores the key code KC for the sixteen tones or the maximum number of simultaneously produced tones.

The outputs of the 16th stages of the shift registers RG1 through RG7 are applied to the output terminals WN1 through WN3, and therefore whenever the outputs pass through the 1st through 16th stages, they are read to the key code output terminals WN1 through WB3. The storage data thus introduced to the output terminals WN1 through WB3 are delivered out as simultaneous tone production key code signals obtained by coding in time division multiplex system the key codes KC of the tones to be produced simultaneously.

On the other hand, the outputs of the registers RG1 through RG4 adapted to store the note code NC out of the registers RG1 through RG7 are applied, as a first key switch key-on detection signal TK1, to the output terminal WTK1 through the OR gate 239. When an output "1" is obtained by the OR gate 239, it is used as a busy signal A1 (which represents that the channel passed through the 16th stage has the stored data, that is, it is not an empty channel).

Storage of the data of the temporary memory circuits 233 in the channels of the memory circuit means 237 by selectively assigning them thereto is carried out by controlling the AND gates 235 and the feedback AND gates 238 in the input gate circuit 23 with the aid of a set signal S and reset signal $\bar{R}$ from the timing control circuit 13F. The timing control circuit 13F operates to deliver or not to deliver the set signal S or the reset signal $\bar{R}$ according to the presence or absence of coincidence between the contents of the key code applied thereto from the key coder 12 and the contents of the key code KC stored in the channels in the memory circuit means 237.

The comparison between the data from the key coder 12 and the data stored in the memory circuit means 237 is carried out in a key code comparison control circuit 13D which comprises a key code comparison circuit 240 and a coincidence channel memory circuit 241.

The key code comparison circuit 240 comprises EXCLUSIVE OR circuits 242. The bits $N_1$–$B_3$ of the key code signal KC held in the sample hold circuit 13B are applied to one inputs of the EXCLUSIVE OR circuits 242, and the outputs of the respective registers RG1 through RG7 are applied to the other inputs thereof.

The outputs of these EXCLUSIVE OR circuits 242 are applied to a coincidence detection output NOR gate 243.

When all the bits of the key code signal KC coincide with the contents stored in any one of the registers RG1 through RG7 (both being at the logic "1" as described later), the circuit 242 delivers the logic "0" output. Therefore, the NOR gate 243 applies a coincidence detection output $EQ_1$ having the logic "1" to the coincidence channel memory circuit 241.

The coincidence channel memory circuit 241 is made up of a 16-stage shift register which is driven by the master clock pulses $\phi_1$ and $\phi_2$ similarly as in the case of the aforementioned registers RG1 through RG7. However, it is not provided with a loop for feeding back the output of the 16th stage to the first state, and therefore the data inputted thereinto is lost through overflowing in the time of sixteen periods of the master clock pulses $\phi_1$ and $\phi_2$ (which is equal to one period of the timing signals $1Y_{16}$ through $16Y_{16}$).

While the sampling hold circuit 13B continuously stores the output signal from the key coder 12 for one period of the timing signal $1Y_{16}$ with the aid of that timing signal $1Y_{16}$, the registers RG1 through RG7 operate to make one circulation of all the data of the sixteen channels for one period of the timing signal $1Y_{16}$. In consequence, if there is a channel which stores the same key code as that applied newly, the coincidence channel memory circuit 241 operates to store that channel while shifting it in synchronization with the shifting operation of the registers RG1 through RG7.

As is apparent from the above description, upon arrival of the key code KC the key code comparison circuit 240 is to detect whether or not the data having the same contents as those of the key code has been stored in the memory circuit means 237 already. In this case, if the key code signal KC is not applied yet, the delivery of the coincidence detection output $EQ_1$ is prohibited. More specifically, a key code detection output REQ whose level is lowered to "0" when the key code KC is not applied is obtained by a key code detection circuit 244, and this output REQ is applied through an inverter 246 to the coincidence detection output NOR gate 243. Thus, when no key code signal KC is applied, the output of the NOR gate 243 is maintained at "0" all the times.

The key code detection circuit 244 comprises an OR gate 245 which receives the note code bits $N_1$ through $N_4$ out of the outputs of the sample hold circuit 13B. In the circuit 244, when the key code signal KC is held by the sample hold circuit 13B, a confirmation output REQ having the logic "1" is outputted.

The coincidence detection output $EQ_1$ is applied to a writing inhibiting circuit 247 so as to provide a writing inhibiting signal REG employed for inhibiting the writing of data into the key code memory circuit means 237. The writing inhibiting circuit 247 comprises a coincidence memory circuit 248 and a writing finish signal circuit 249.

In the coincidence memory circuit 248, when the coincidence detection output $EQ_1$ at the level "1" is obtained during one period of the timing signal $1Y_{16}$, the output is stored, and writing the data from the temporary memory circuit 233 into the memory circuit means 237 is inhibited with the aid of the stored output, because if the contents of a new key code data applied are stored in any one of the channels in the memory circuit means 237, it is unnecessary to write the new key code.

The coincidence memory circuit 248 has a memory element 253 comprising a delay flip-flop circuit to the output of which an output holding circuit 252 consisting of a switching transistor 250 and a capacitor 251 is connected. The coincidence memory circuit 248 receives the coincidence detection output $EQ_1$ through an input with the aid of the master clock pulses $\phi_1$ and $\phi_2$. The output "1" read out to the output terminal is fed back to the input terminal through a feedback AND gate 255 and the OR gate 255, thus being dynamically stored.

The switching transistor 250 is opened by the timing signal $1Y_{16}$ corresponding to the first channel, for only the period of the pulse width of the timing signal $1Y_{16}$, and the logic level "1" or "0" is held in the capacitor 251 according to the memory state of the memory element 253 in this operation. On the other hand, the feedback gate 256 is closed by the same timing signal $1Y_{16}$ applied through an inverter 257, as a result of which the storage in the memory element 253 is reset.

If, during the period of from the time instant when the memory element 253 is thus reset by the first timing signal $1Y_{16}$ to the time instant when the second timing signal $1Y_{16}$ is applied, the coincidence detection output EQ1 is obtained in any one of the first through sixteenth channels as a result of comparison made with respect to these channels of the memory circuit means 237, the memory element 253 is set, as a result of which the capacitor 251 is charged to the logic "1" level by the second timing signal $1Y_{16}$. This state is maintained until the arrival of the third timing signal $1Y_{16}$.

This hold level signal is applied, as a writing inhibition signal REG, to a timing control circuit 13F through an output OR gate 258.

A key-off detection signal D1 from a key-off memory circuit 293 described later is applied through an inverter 259 to the input gate 254 of the coincidence memory circuit 248. When the key-off memory circuit 293 stores a channel subjected to key-off, the channel is read out, and when its output D1 is raised to "1", the input gate 254 is closed.

The writing finish signal circuit 249 is provided so that after writing data from the temporary memory circuit 233 into the memory circuit 237 is completed, the input gate circuit 235 is closed immediately, and that thereafter no erroneous operation is caused. The writing finish signal circuit 249 has a memory element 260 made up of a delay flip-flop circuit. When the set signal S is provided by the timing control circuit 13F, the circuit 249 receives it through an input AND gate 261 and an OR gate 262 and writes and reads it with the aid of the master clock pulses $\phi_1$ and $\phi_2$. The output "1" read out to the output terminal is fed back to the memory element 260 through the OR gate 262, thus being dynamically stored. This storage state is cleared when the timing signal $16Y_{16}$ (which is the last timing signal corresponding to the 16th channel) is applied through AND gates 261 and 263 and an inverter 264.

The output "1" thus stored in the memory element 260 is applied, as the writing inhibition signal REG, to the timing control circuit 13F through the OR gate 258.

The above-described key code data inputting operation or memory data rewriting operation from the sample hold circuit 13B to the key code memory circuit means 237 is carried out with the aid of the set signal S and reset signal $\bar{R}$ of the timing control circuit 13F.

The timing control circuit 13F has three control modes. In the first control mode, when, under the condition that an empty channel is available in the key code memory circuit 13C, a new key code data is applied thereto, the key code data is assigned to the empty channel. Hereinafter, this control mode will be referred to as "a new key-on control mode" when applicable.

In the second control mode, when, under the condition that the key code memory circuit 13C is fulfilled (that is, no empty channel is available therein), a new key code data is applied thereto, and the tone generated according to the memory data of the channel in which the key code data of the key which has been released already is stored is going to fade away, the memory data of the channel is replaced by the newly applied key code data. This control mode will be referred to as "a truncation control mode" when applicable.

The contents of the third control mode is as follows. With respect to the channel which stores the key code data of the tone which is being decayed due to key release, when the decay waveform amplitude becomes less than a predetermined value, the memory state of the channel is reset. This control mode will be referred to as "a reset control mode" when applicable.

In order to obtain a control signal in the new key-on control mode, the timing control circuit 13F has a new key-on control mode AND circuit 271. This AND circuit 271 receives as a first input condition signal through an inverter 272 the busy signal A1 outputted by the output OR gate 239 of the key code memory circuit 13C, and receives as a second input condition signal through an inverter 273 the writing inhibition signal REG of the writing inhibition circuit 247, and furthermore receives as a third input condition signal the key code arrival confirmation output DEQ of the key code detection circuit 244.

Thus, the new key-on control mode AND circuit 271 outputs the signal "1" with the timing where no busy signal A1 is provided by the output gate 239 of the key code memory circuit 13C (the empty channel is shifted to the last stage of the memory circuit means 237) when a new key code signal KC is held in the sample hold circuit 13B (the output of the OR circuit 245 is raised to "1") and under the condition that no writing inhibition signal REG is delivered out of the writing inhibition circuit 247 (no coincidence is obtained during one circulation of the code data stored in the key code memory circuit 13C). This output "1" is applied, as an open control signal, to the input AND gate 235 of the key code memory circuit 13C through the set signal output OR gate 274, and is applied, as a close control signal, to the feedback AND gate 238 through the reset signal output OR gate 275 and the inverter 276.

As a result, the input AND gate 235 is opened and the feedback AND gate 238 is closed. Therefore, with the aid of the next master clock pulse $\phi_1$, the contents of the channel positioned at the last stage of the memory circuit means 237 are blocked by the feedback AND gate 238, while the contents of the temporary memory circuits 233 are simultaneously written in the first stage of the memory circuit means 237.

When the set signal S has been outputted by the set signal output gate 274 once so that a new data is written in the first stage of the memory circuit means 237, with the aid of the clock pulses $\phi_1$ and $\phi_2$ of this writing operation the writing finish signal circuit 249 carries out the setting operation. Therefore, when writing the data into the memory circuit means 237 is completed, the writing inhibition signal REG is produced, whereby the output of the new key-on control AND gate 271 is lowered to "0". As a result, the input AND gate 235 of the key code memory circuit 13C is closed, while the feedback AND gate 238 is opened, so as to be ready for the arrival of the next channel. Thus, the memory circuit means 237 has assigned the newly applied key code data to the empty channel and stored it therein.

The timing control circuit 13F has a truncation control mode AND gate 277 to obtain a timing signal in the truncation control mode. This AND gate 277 receives, as a first input condition signal, a truncation signal MTCH outputted by a truncation circuit 13G, and receives as a second input condition signal, the writing inhibition signal REG from the writing inhibition circuit 247 through an inverter 273, and furthermore receives, as a third input condition signal, the key code arrival confirmation output DEQ from the key code detection circuit 244.

The truncation circuit 13G is provided so that when key code signals KC whose number is more than the memory capacity (or the number of channels) of the key code memory circuit 13C are applied, the newly applied key code signals KC are stored in the channels where the key code data of tones which are about to disappear are stored, thereby to positively store the newly applied key code data.

The truncation circuit 13G has a minimum value memory comparison circuit 280 which stores a minimum value Q out of the envelope signals of produced tones which are applied, in time division manner, in synchronization with the master clock pulses $\phi_1$ and $\phi_2$ by an envelope generator described later, and compares the minimum value Q with the value E of an envelope signal ΣKA successively applied thereto. When an envelope signal ΣKA having a value E smaller than the stored minimum value Q is applied, or when $E<Q$, a minimum value detection signal Z at the logic "1" is outputted through an output AND gate 281.

The key-off detection signal D1 provided by the key operation discrimination circuit 13E is applied, as an open control signal, to the AND gate 281. Thus, when the envelope value E is smaller than the minimum value Q, the minimum value detection signal Z is outputted at the timing when the data of the channel to which the key code of a key released has been assigned is read out of the memory circuit means 237 of the key code memory circuit 13C.

This minimum value detection signal Z is applied to the fetch command terminal FETCH of the minimum value memory comparison circuit 280. In this operation, the circuit 280 newly stores, as a comparison reference signal Q, the contents of the envelope signal ΣKA which is applied at present instead of the previous one. That is, the circuit 280 stores the minimum envelope value out of the tones corresponding to the key codes stored in the first through sixteen-th channels.

The minimum value detection signal Z at "1" is stored in a minimum envelope value channel memory circuit 282 which is made up of a 16-stage shift register which, similarly as in the shift registers RG1 through RG7 in the above-described memory circuit means 237, carries out the writing and reading operations with the aid of the master clock pulses $\phi_1$ and $\phi_2$ and outputs the output "1" of the last stage, as a truncation signal MTCH, through an output AND gate 283.

. The output of a NOR gate 284 receiving the outputs of the 1st through 15th stages as open control signals is applied to the output AND gate 283. Thus, when the contents of the 1st through 15th stages are "0" (which means that the envelope of the tone corresponding to the key code of the channel stored in the 1st through 15th stages is not of the minimum value); that is, when only the storage in the 16th stage is at "1", the truncation signal MTCH is applied through the output AND gate 283 to a truncation control mode AND circuit 277.

Therefore, when a new key code data is held by the sample hold circuit 13B, under the condition that no writing inhibition signal REG is outputted by the writing inhibition circuit 247 the circuit 277 delivers the output "1" at the timing when the truncation signal MTCH is applied. This output "1" is applied through a set OR gate 274 to the input AND gates 235 of the key code memory circuit 237 to open the latter, and is further applied through the reset OR gate 275 and the inverter 276 to the feedback AND gates 238 to close the latter.

As a result, the contents (stored in the 16th stage at present) of the channel for which the truncation signal MTCH has been provided are changed from the key code data of the envelope minimum which has been stored to the new key code data stored in the temporary memory circuit 233 and are stored in the first stage.

The key-off detection signal D1 employed as the output condition of the minimum value memory comparison circuit 280 is produced by the key operation discrimination circuit 13E.

This circuit 13E has first and second key switch key-on memory circuits 291 and 293, and a key-off memory circuit 293. These memory circuits 291 through 293 are made up of 16-stage shift registers which carry out shifting operations with the aid of the master clock pulses $\phi_1$ and $\phi_2$ similarly as in the above-described memory circuit means 237. In the memory circuits, the memory contents of the channels are circulated through feedback AND gates 294, 295 and 296, so as to be dynamically maintained stored.

The first key switch key-on memory circuit 291 is to hold the memory of the channel to which the key code applied to the sample hold circuit 13B is assigned, for the period of key depression.

With respect to the response operation of the key code memory circuit 13C in key depression, there are a first case in which a channel in which contents coincident with the contents of a new key code data have been stored already is available, and a second case in which such a channel is not available. In the first case, the renewal of the memory contents in the channel having the coincident contents is not carried out, while in the second case the new data is stored in an empty channel (or when no empty channel is available, the data in the channel of the minimum envelope is replaced thereby in the truncation control mode).

In any case, as the key operation has been done, it is necessary to store the signal "1" representing that the key is being depressed in the corresponding channel.

For this purpose, the first key switch key-on memory circuit 291 operates to store the key-on data in the relevant channel in synchronization with the data's channel assignment operation of the timing control circuit 13F concerning the key code memory circuit 13C.

That is, firstly the memory circuit 291 receives the data through the set signal output OR gate 297 of the timing control circuit 13F. The data thus newly applied is stored in an empty channel. In this case the logic "1" signal is stored in that empty channel, or in the case where the old data is replaced by the new data in the truncation mode, the logic "1" signal is stored in that channel.

Secondly, the memory circuit 291 receives the output of the first key switch "on" memory AND circuit 298 of the timing control circuit 13F through the input OR gate 297. The AND circuit 298 receives the output DEQ of the OR gate in the key code detection circuit 244, and the coincidence memory output EQ of the coincidence channel memory circuit 241, and when the channel having memory contents coincident with the new key code data is fed back to the first stage of the memory circuit means 237, the AND circuit 298 operates to write and store the logic "1" signal in the memory circuit 291.

The output of the clear AND circuit 299 in the timing control circuit 13F is applied through an inverter 300 to the feedback AND gate 294 of the first key switch key-on memory circuit 291. The key-off detection timing signal X is applied to the clear AND circuit 299, whereby the storage in all the channels of the memory circuit 291 are cleared when the signal X is raised to "1".

Thus, whenever the signal X is applied to the memory circuit 291, it is intermittently checked whether or not the key of the key code assigned to the first through sixteenth channels is still being depressed.

When the key code data is stored in the 1st through 16th channels of the key code memory circuit 13C, the second key switch key-on memory circuit 292 operates to store the "on" operation state of the second key switch K2 (FIGS. 3A and 3C) corresponding to that key code. On the other hand, the memory contents of the 1st through 16th channels of the memory circuit 292 are caused to make one circulation in the sixteen periods of the master clock pulses $\Phi_1$ and $\phi_2$, and in this case the data read through the output terminal is delivered as a second key switch "on" operation signal TK2 through the output terminal WTK2 of the circuit 292.

Application of the memory signal to the memory circuit 292 is effected by applying the output of the second key switch key-on memory AND circuit 301 of the timing control circuit 13F thereto through an input OR gate 303.

With the second key switch operation detection signal KA2 from the key coder 12 and the output EQ of te the coincidence channel memory circuit 241 as the input conditions, the aforementioned AND circuit 301 delivers the output "1" upon arrival of the second key switch operation detection signal KA2 in the case when the key code data applied to the sample hold circuit 13B coincides with the memory data of any one of the channels in the key code memory circuit means 237.

Therefore, when a channel storing the same data as the applied data out of the 1st through 16th channels of the key code memory circuit 13C is fed back to the first stage of the memory circuit means 237, the memory circuit 292 operates to store the signal "1". Thus, for the period of time of from the "on" operation of the second key switch K2 to the "off" operation of the same, the memory circuit 292 dynamically stores the signal "1" as to this key operation. The reset signal R of the timing control circuit 13F is applied to the feedback AND gate 295 of the memory circuit 292.

While the key code data applied to the sample hold circuit 13B is formed by the operation of the first key switch K1, the detection signal KA2 is formed by the second key switch K2. Accordingly, in the case when a new key code data is stored in the key code memory circuit 13C, the delivery of the output "1" to the output terminal WTK1 with respect to this memory channel represents the time instant when the first key switch K1 is turned on, while the delivery of the output "1" to the output terminal WTK2 represents the time instant when the second key switch K2 is turned on. Thus, the period of time of from the time instant when the signal TK1 is applied to the output terminal WTK1 to the time instant when the signal TK1 is applied to the output terminal corresponds to the corresponding key depression speed. Thus, the data of key operation speed are delivered, in the form of signals TK1 and TK2, out of the channel processor 13.

When operation of a key corresponding to the key code data applied to the sample hold circuit 13B is suspended (that is, when the key-off state is obtained) the key-off memory circuit 293 stores that channel.

The key-off memory circuit 293 carries out it memory operation with the aid of the control signal which is formed by the timing control circuit 13F according to the output of the first key switch memory circuit 291 described above. That is, the timing control circuit 13F has a key-off memory control AND circuit 305 which receives, as a first input signal, the output TA1 of the first key switch key-on memory circuit 291 through an inverter 306, as a second input signal the busy signal A1 of the key code memory circuit 13C, and as a third input signal the key-off detection timing signal X of the step control circuit 12E.

Therefore, in the case where the key-off detection timing signal X is applied to the key-off memory control AND circuit 305, when the channel in which the signal "1" is not stored is fed back to the input terminal of the first key switch key-on memory circuit 291 (in this case the memory output TA1 is lowered to "0"), the AND circuit 305 outputs the signal "1" which is applied through an input AND gate 307 and an input OR gate 308 to the key-off memory circuit 293 and is stored therein.

Thus, whenever the timing signal X is applied to the key-off memory circuit 293, the circuit 293 checks whether or not the key corresponding to the relevant key code with respect to the channel, which is not an empty channel, of the memory circuit means 237 is released, and stores the check result.

Whenever the reset signal R is delivered out of the timing control circuit 13F, it is applied through an inverter 276 to the input AND gate 307 and feedback AND gate 296, as a result of which the memory of the key-off memory circuit is cleared.

The storages of the channels of the key code memory circuit 13C are cleared by the output of a clear AND circuit 309 of the timing control circuit 13F when the decay waveform part is completely decayed after the key release operation of the tones of the key codes representing the contents of the storages.

The clear AND circuit 309 receives, as a first input signal, a decay finish signal 2DF produced by the musical tone signal forming sections 7A and 7B, and receives, as a second input signal, the key-off detection signal D1 of the key-off memory circuit 293. The logic "1" output of the circuit 309 is applied through a reset gate 275 and an inverter 275 to the feedback AND gates 238 of the key code memory circuit 13C to close the latter 238.

On the other hand, the decay finish signal 2DF has detected the decay completion of the tone of the key code stored in the channel which is provided in the 16th stage of the key code memory circuit 13C, and therefore the feedback of the data concerning this channel cannot be effected, as a result of which the data concerning this channel is cleared. Thus, the channel becomes an empty channel to be ready for the next data assignment.

As is apparent from the above description, the channel processor 13 operates to assign a plurality of key code data successively applied thereto by the key coder 12 to the first through sixteenth channels according to the requirement of simultaneous tone production thereby to store them, and furthermore operates to output, as information signals multiplexed in time division system, the contents of the channels (that is, the key codes of plural tones to be produced simultaneously) through the output terminals WN1 through WB3.

The contents of the output information signal are key information IFK concerning a key code, as indicated in FIG. 2. The first information thereof is key code information KC consisting of a note code NOTE and a block code OCT which are obtained from the memory circuit means 237 in the key code memory circuit 13C. The second information is key switch operation information which consists of a key-on detection signal TK1 concerning the first key switch K1 obtained from the output OR gate of the key code memory circuit 13C and a key-on detection signal TK2 concerning the second key switch K2 obtained from the second key switch key-on memory circuit 292. The third information is key-off information representing a key-off state, which consists of a key-off detection signal TD0 obtained from the key-off memory circuit 293.

These pieces of key information are applied, as parameter generation signals, to the first and second perameter generating circuits 5A and 5B, as shown in FIG. 1, and are applied to the initial control circuit 14 and the after touch control circuit 15 (FIG. 2) for forming information concerning key depression, or touch information IFT.

(1-4) Initial Control Circuit

The initial control circuit operates to discriminate a key depression speed thereby to generate a condition signal which is used to generate control constants of variables $T_{ni}(t)$ and $T_{na}(t)$ concerning amplitude in Equation (2) described before. The initial control circuit comprises a time measurement logic circuit 14A and a variable circuit 14B (FIG. 2).

Figure 8:
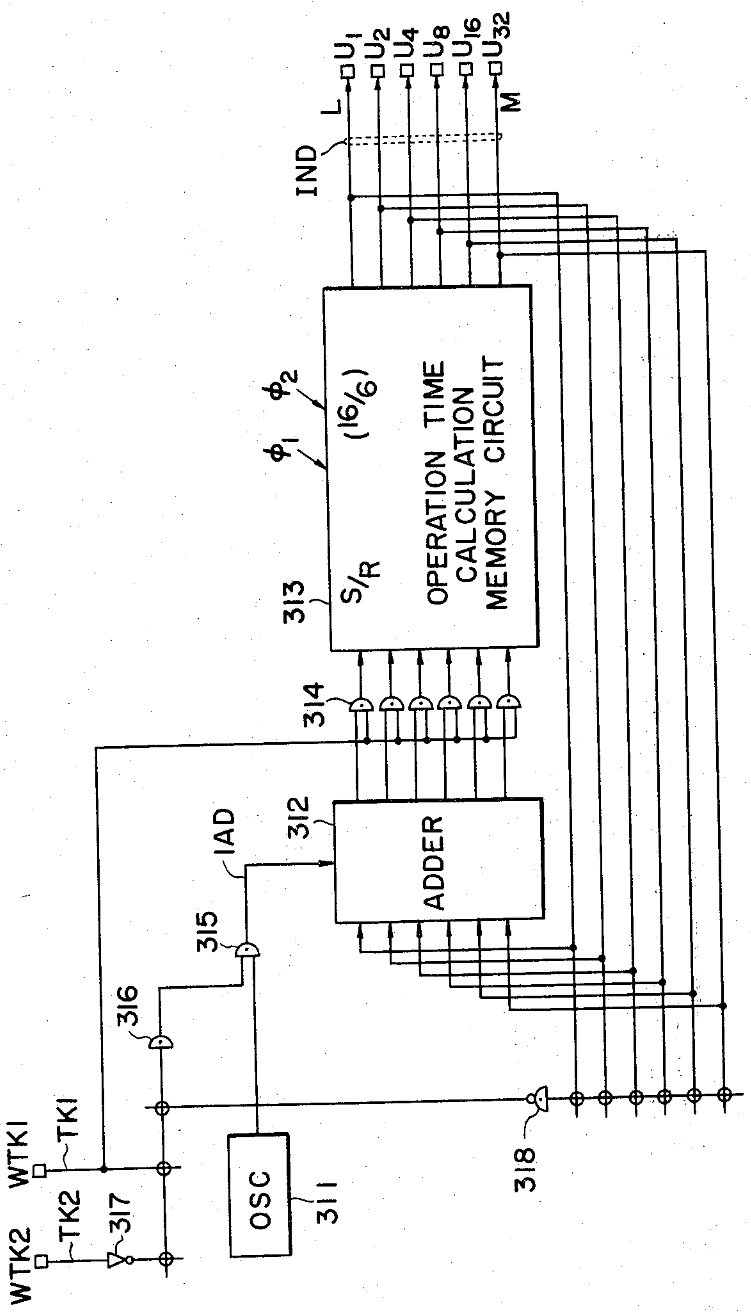
FIG. 8 is a connection diagram showing an initial touch control circuit shown in FIG. 2.

The time measurement logic circuit 14A operates to measure and store a period of time of from the "on" operation of the first key switch K1 to the "on" operation of the second key switch K1 in correspondence to the channel for simultaneously produced tones stored in the channel processor 13. The logic circuit 14A comprises, as shown in FIG. 8, a time measurement clock pulse generator 311, an adder 312, and an operation time calculation memory circuit 313.

The operation time calculation memory circuit 313 is made up of a 16-stage/6-bit shift register assembly having six lines of 16-stage shift registers. All the shift registers carry out their shifting operations simultaneously by the master clock pulses $\phi_1$ and $\phi_2$. The number of stages in the register is sixteen (16), which is determined in correspondence to the 1st through 16th channels in the above-described channel processor 13. Thus, the operation time calculation memory circuit 313 is so designed that in synchronization with the delivery of the key information as to the 1st through 16th channel by the channel processor 13 the circuit 313 can calculate and store the key depression speed of a relevant channel.

The 6-bit adder 312 is provided at the input side of the operation time calculation memory circuit 313. The outputs of the bits of the adder 312 are applied through input AND gates 314 to the bit registers of the memory circuit 313. The adder 312 has half-adders as the addition elements of the bits. In the adder 312, addition of a "1" addition input 1AD supplied by the time measurement clock pulse oscillator 311 and the output of the 16th stage of the memory circuit 313 is carried out, and the addition result is written in the 1st stage of the memory circuit 313.

An input AND gate 315 is provided on the path of the "1" addition input 1AD, and is controlled by the output of a calculation start AND circuit 316. The AND circuit 316 receives, as a first condition signal, the first key switch key-on detection signal TK1 concerning the 1st through 16th channels which is applied in the form of a time division multiplex signal by the channel processor 13, and receives, as a second condition signal, the second key switch key-on detection signal TK2 through an inverter 317 similarly as in the case of the signal TK1. Therefore, when the first key switch K1 is turned on and the key-on detection signal TK1 is raised to "1" for every information of each channel (in this operation, the second key switch K2 is not turned on yet, and therefore the second key-on detection signal TK2 is still at "0"), the calculation start AMD circuit 316 applies its logic "1" output to the AND gate 315 to open the latter, and thereafter until the second key switch K2 is turned on to raise the key-on detection signal to "1" the AND circuit 316 maintains the AND gate 315 open.

Accordingly, the "1" addition signal 1AD of the time measurement clock pulse oscillator 311 is applied to the adder 312.

In this operation, the key-on detection signal TK1 is applied to AND gates 314 provided between the adder 312 and the operation time calculation memory circuit 313. Therefore, whenever the key information of the 1st through 16th channels is transferred from the channel processor 13, the adder 312 adds "1" to the contents of the memory circuit 313 so that the addition result is stored in the memory circuit 313. As a result, the period of time of from the "on" operation of the first key switch K1 to the "on" operation of the second key switch K2 is calculated and stored, as the number of times of circulation operation cycle of the 1st through 16th channels of the memory circuit 313, in the latter 313.

The calculation result (the result at the time of arrival of the key-on signal TK2 being the time measurement result) is delivered, as a binary code signal IND, through the 16th stages of the bit registers of the memory circuit 313 to the output terminals U1 through U32.

When the second key switch K2 is turned on, the level of the key-on detection signal TK2 is changed from 37 0" to "1" to close the AND gate 316, as a result of which application of the "1" addition signal 1AD to the adder 313 is suspended. Therefore, the adder 312 adds nothing to the data applied by the memory circuit 313 and delivers the data to its output side. Thus, the data of the memory circuit 313 is dynamically stored through the adder 313 and the AND gates 314, and the data thus stored is successively delivered to the output terminals U1 through U32.

This operation is continued until the levels of the key-on detection signals are returned to "0" from "1" by key release effected thereafter. When the signal TK1 is lowered to "0", the gates 314 are closed, as a result of which the storages for all the bits in the memory circuit 313 are lowered to "0". Accordingly, the outputs at the output terminals U1 through U32 are lowered. Thus, the operation is completed.

In this embodiment, the output of the memory circuit 313 is applied to the NAND circuit 318, and when the contents of all the bits in the memory circuit 313 are raised to "1", the output "0" is obtained. This output "0" is applied, as an open signal, to the AND gate 316. Thus, when a key is operated very slowly exceeding the range in which the memory circuit 313 can measure time, the maximum time measurement output is obtained, and thereafter it is held.

The time measurement output delivered out of the operation time memory circuit 313 is applied to the code conversion ROM 14B, whereby it is converted into a code signal which can be readily processed in the rear stage, that is, it is delivered as an initial touch data ITD.

(1-5) After Touch Control Circuit

The after touch control circuit 15 operates to determine a key depression strength thereby to provide condition signals adapted to form control constants for the variables $T_{ni}(t)$ and $T_{na}(t)$ concerning amplitude in the above-described Equation (2). The after touch control circuit 15 comprises a multiplexer 15A and an A/D converter 15B receiving the output of the multiplexer 15A, (FIG. 2).

Figure 9:
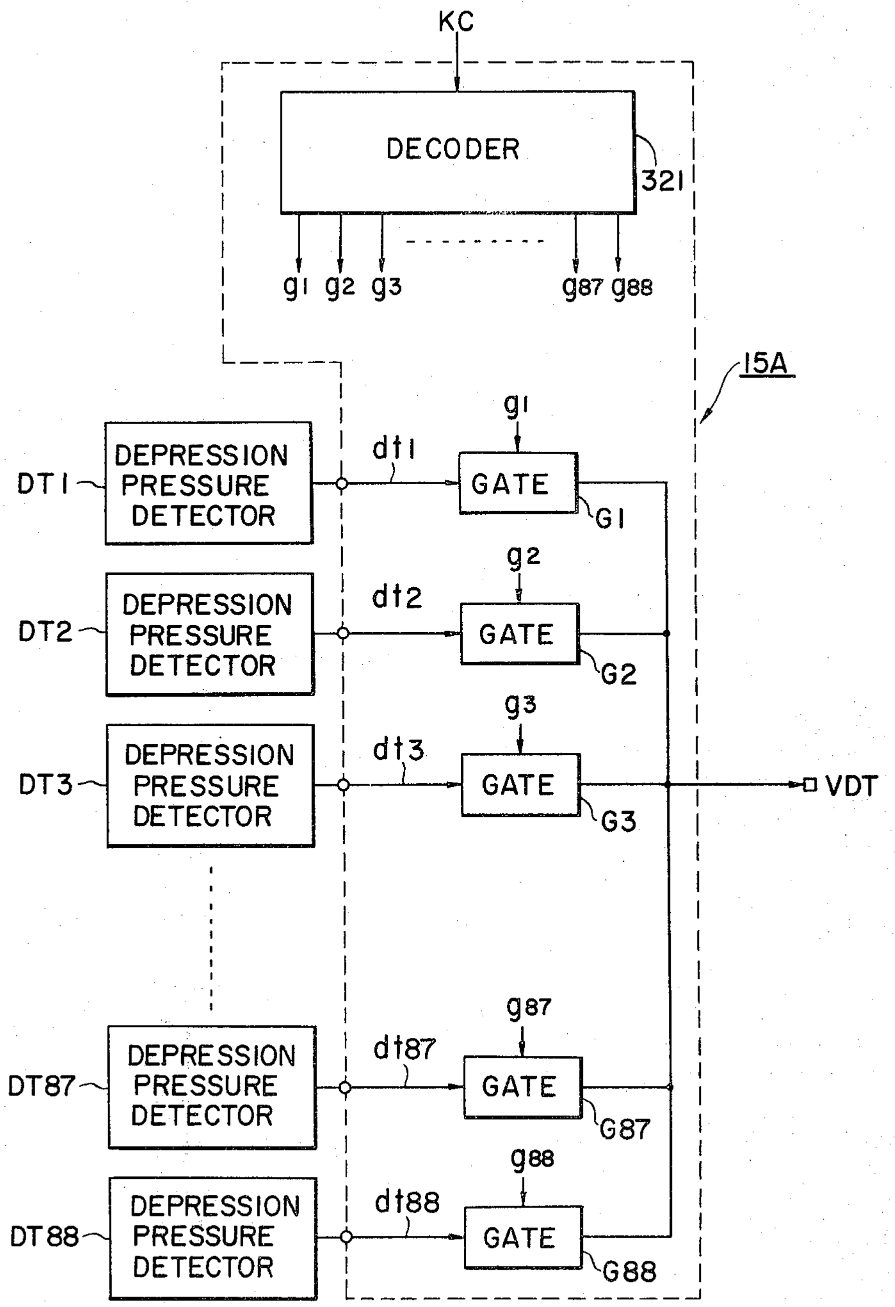
FIG. 9 is a connection diagram illustrating an after touch control circuit shown in FIG. 2.

The multiplexer 15A as shown in FIG. 9 comprises a decoder 321 which receives the key code KC (consisting of the note code NOTE and the block code OCT) of the channel processor 13 and converts the key code KC thus received into line outputs g1 through g88 which are to be applied to relevant ones out of 88 output lines provided for all the keys. The line outputs g1 through g88 are applied, as open control signals, to gates G1 through G88 which receive the output dt1 through dt88 of depression pressure detectors DT1 through DT88 (FIG. 9) which are provided for the keys in the key operation detection circuit 11.

As was described before, the key code KC has the contents obtained by multiplexing, in time division manner, the data for the sixteen channels. Therefore, when the channel data of the key code KC are successively applied to the decoder 321, the decoder 321 operates to successively open the gates for the relevant keys out of the gates G1 through G88. Thus, as the channel data are applied, the key depression pressure detection outputs dt1 through dt88 are successively sampled and delivered to the output terminal VDT of the circuit 15A.

This output signal is an analog value, which is converted into a digital signal by the A/D converter 15B and is outputted as an after touch data ATD.

The after touch control data ATD thus formed by the after touch control circuit 15B and the initial control data ITD formed by the above-described initial control circuit 14 are delivered out as a touch information output IFT of the keyboard information generating section 1.

(2) First and Second System Parameter Generating Circuits

Figure 10:
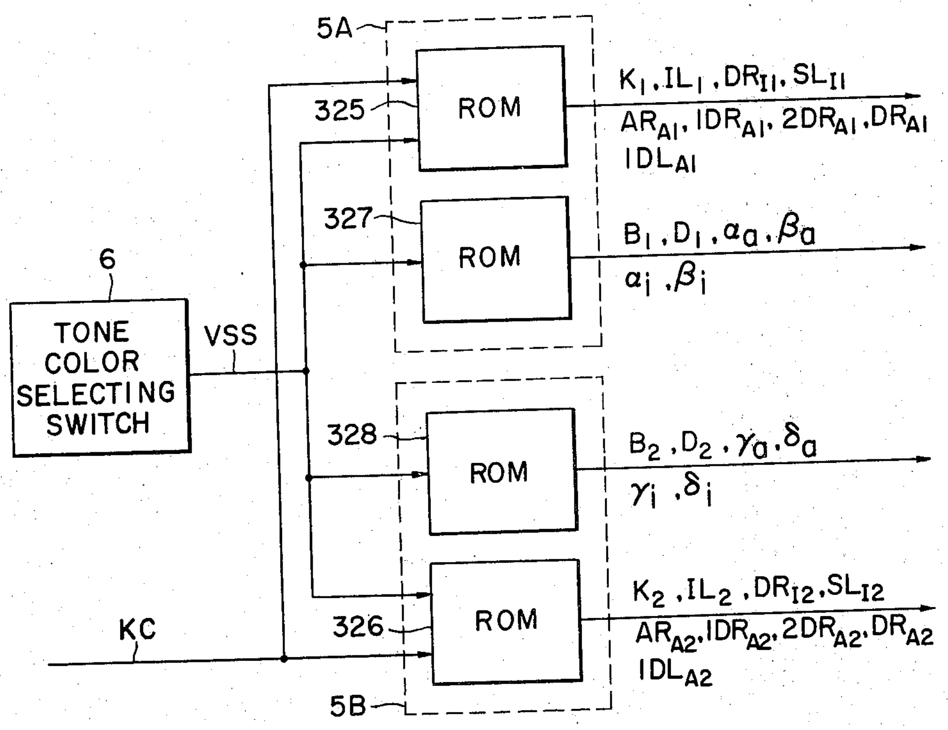
FIG. 10 is a block diagram showing a parameter generating circuit shown in FIG. 1.

The first and second system parameter generating circuits 5A and 5B operate to successively generate constant signals necessary for carrying out the calculation of Equation (3) described before, whenever the key code KC of the 1st through 16th channels generated in time division multiplex system by the keyboard information generating section 1. The first and second system parameter generating circuits 5A and 5B, as shown in FIG. 10, comprise first constant generating circuits 325 and 326 controlled by the key code KC and a tone color selection signal VSS of the tone color selecting switch 6, and second constant generating circuits 327 and 328 controlled by the tone color selection signal VSS of the tone color selecting switch 6. Each of the constant generating circuits 325 through 328 is made up of a read only memory (ROM).

The first constant generating circuit 325 (or 326) of the first system (or second system) parameter generating circuit 5A (or 5B) carries out the following operations: (1) The circuit 325 (or 326) operates to generate a total tone volume constant $K_1$ (or $K_2$) for determining the total tone volume of the first (or second) system.

(2) The circuit 325 (or 326) operates to generate a constant required for calculating a tone color variable $I_1(t)$ (or $I_2(t)$) employed for determining the variation in time of tone color in Equation (3), that is, an initial tone color constant $IL_1$ (or $IL_2$) for determining the initial tone color of a tone, a tone color variation constant $DR_1$ (or $DR_2$) for determining the variation in time of tone color, and a tone color variation stop level constant $SL_1$ (or $SL_2$) for determining the finish level of decay.

(3) The circuit 325 (or 326) operates to generate a constant required for calculating an amplitude level or an envelope variable $A_1(t)$ (or $A_2(t)$) employed for determining the envelope of Equation (3), that is, an attack speed constant $AR_{A1}$ (or $AR_{A2}$) for determining attack speed, a first decay speed constant $1DR_{A1}$ (or $1DR_{A2}$) for determining a first decay speed, a second decay speed constant $2DR_{A1}$ (or $2DR_{A2}$) for determining a second decay speed, a decay speed constant $DR_{A1}$ (or $DR_{A2}$) for determining decay speed after key release, and a decay transition level constant $1DL_{A1}$ (or $1DL_{A2}$) for determining a level in transition from the first decay speed to the second decay speed.

The second constant generating circuit 327 (or 328) of the first (or second) system parameter generating circuit 5A (or 5B) carries out the following operations:

(1) The circuit 327 (or 328) operates to generate a tone pitch constant $B_1$ (or $B_2$) for determining the frequency of a tone produced.

(2) The circuit 327 (or 328) operates to generate a partial tone constant $D_1$ (or $D_2$) for determining the contents of a partial tone (including harmonic tones and non-harmonic tones) component.

(3) The circuit 327 (or 328) operates to generate a constant required for calculating a tone volume selecting constant $T_{1a}(t)$ (or $T_{2a}(t)$) employed for determining a tone volume according to a key touch operation, that is, an initial constant $\beta_i$ (or $\delta_i$) responding to the initial touch, and an after constant $\beta_a$ (or $\delta_a$) responding to the after touch.

(4) The circuit 327 (or 328) operates to generate a constant required for calculating a tone color selecting constant $T_{1i}(t)$ (or $T_{2i}(t)$) employed for determining a tone color according to a key touch operation, that is, an initial constant $\alpha_1$ (or $\gamma_i$) responding to the initial touch, and an after constant $\alpha_a$ (or $\gamma_a$) responding to the after touch.

(3) Tone Color Selecting Switch Circuit

Figure 11:
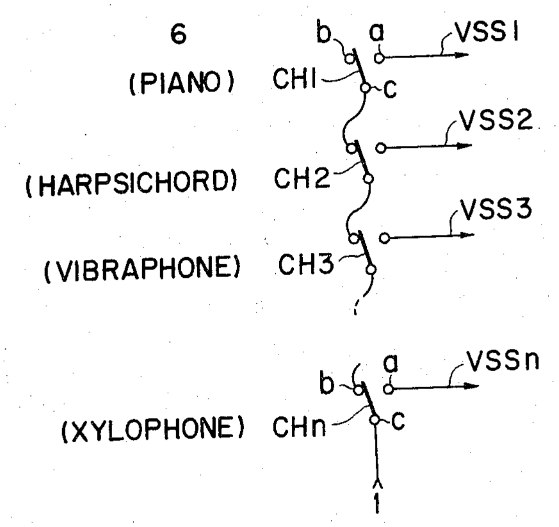
FIG. 11 is a connection diagram illustrating a tone color selection switch shown in FIG. 1.

This circuit 6 operates to generate the tone color selection signal VSS for a tone color to be given to a musical tone, the signal VSS being applied to the first and second system parameter generating circuits 5A and 5B. The detailed arrangement of the circuit 6 is as shown in FIG. 11.

The tone color selecting switch circuit 6 comprises tone color selecting switches $CH_1$, $CH_2$, $CH_3$ . . . and $CH_n$ provided respectively for tone colors of piano, harpsichord, vibraphone, . . . and xylophone. Each of the switches has a normally open contact a, a normally closed contact b, and a movable contact c. The movable contacts c and the normally closed contacts b of the switches $CH_1$ through $CH_n$ are connected in series, and this series circuit is connected to a power source at the level "1", so that tone color selection outputs VSS1, VSS2, VSS3 . . . VSSn are provided at the normally open contacts a, respectively.

Thus, the selection outputs VSS1, VSS2, VSS3 . . . VSSn of the switches CH1, CH2, CH3 . . . CHn have a priority order opposite to the stated order, and when a plurality of switches are selectively operated, only one tone color section output highest in the priority order is delivered.

(4) First and Second System Musical Tone Signal Forming Sections

The first and second system musical tone signal forming sections 7A and 7B respectively carry out the calculations of the first and second terms in Equation (3) on the basis of the key information 1FK and touch information IFT of the keyboard information generating section 1, the constant outputs of the first and second system parameter generating circuits 5A and 5B, and the output of a damper pedal 9 (FIG. 1).

The first system musical tone signal forming section 7A is completely equal in arrangement to the second system musical tone signal forming section 7B. Therefore, only the section 7A will be described in detail.

Figure 12A:
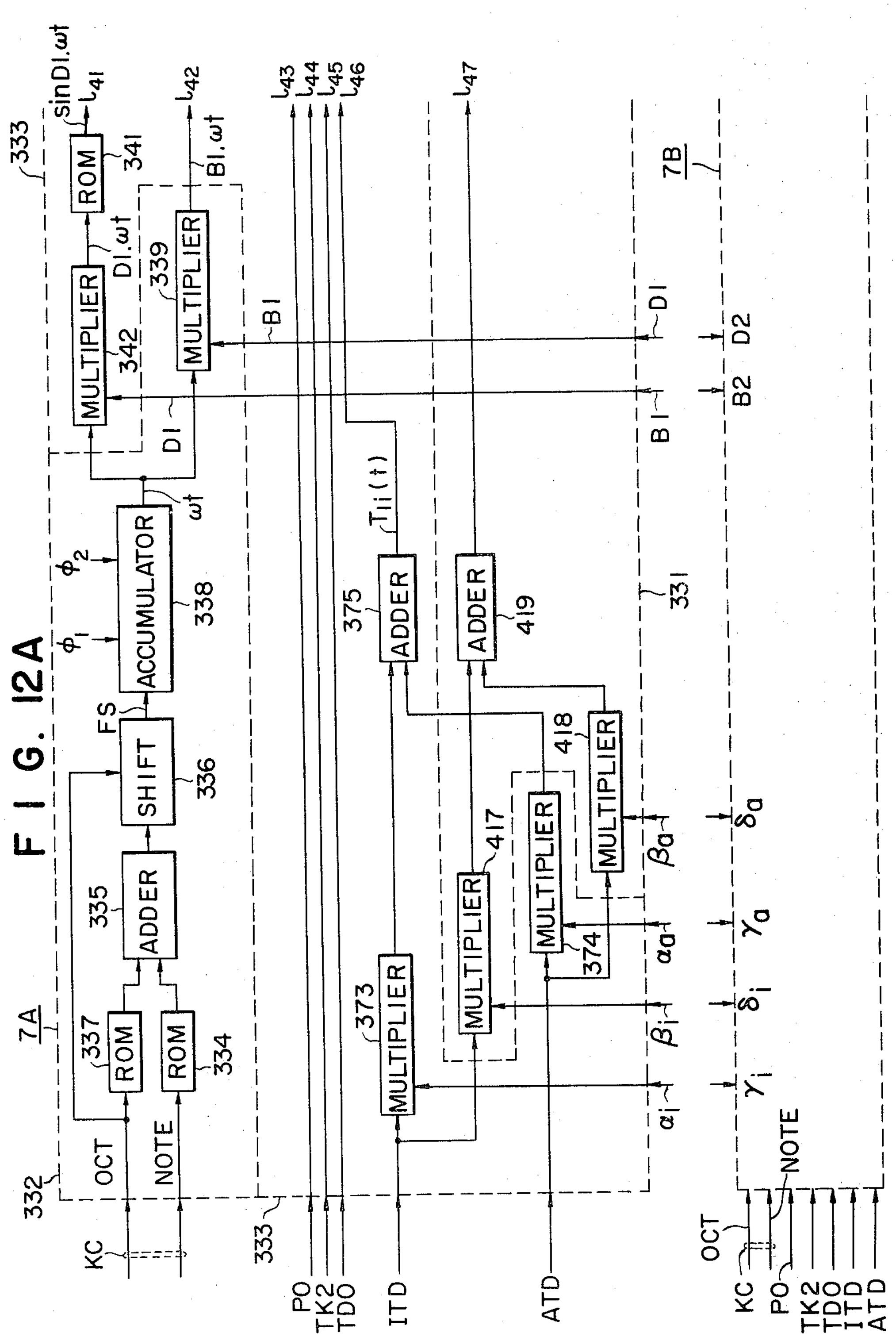
FIGS. 12A and 12B are two parts of a connection diagram showing a musical tone signal forming section shown in FIG. 1.
Figure 12B:
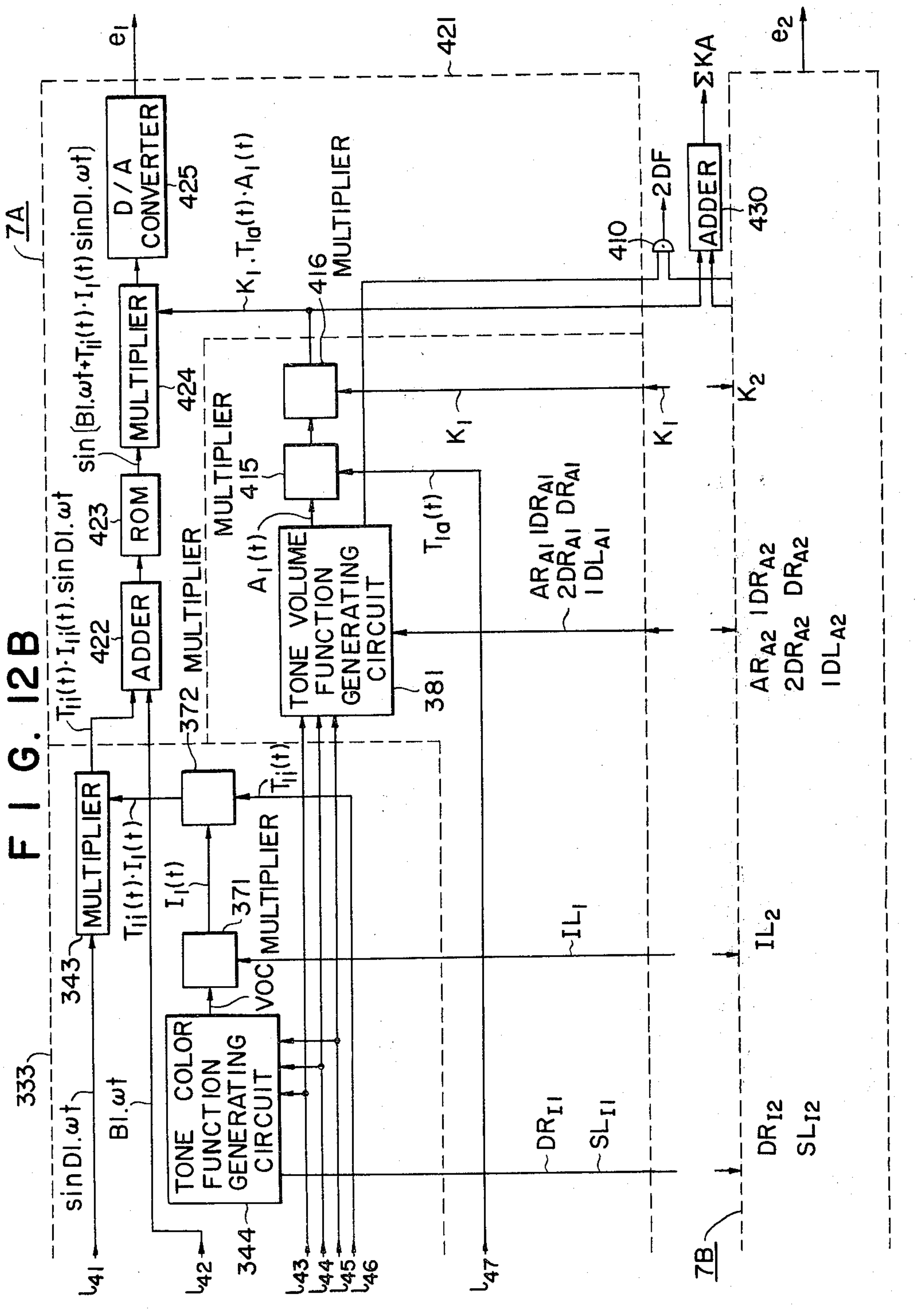

The first system musical tone signal forming section 7A, as shown in FIGS. 12A and 12B, comprises an amplitude term calculation circuit 331 for calculating the amplitude term in Equation (3), a carrier wave term calculation circuit 332 for calculating the carrier wave term in Equation (3), and a modulation wave term calculation circuit 333 for calculating the modulation wave term in Equation (3).

(4-1) Carrier Wave Term Calculation Circuit

In the carrier wave term calculation circuit 332, the note code NOTE of the key code KC applied by the key code memory circuit 13C in the channel processor 13 is received by a frequency converter 334 made up of a read only memory (ROM) where it is converted into a binary number corresponding to the frequency of a reference note tone (or the note tone of a reference octave). This output is applied through an adder 335 to a shifter 336. This shifter 336 operates to shift the value corresponding to the reference note tone applied thereto by the converter 334 upward or downward as much as a quantity corresponding to an octave number assigned to the block code OCT included in the key code KC, thereby to output a frequency output FS consisting of a binary number proportional to the tone pitch frequency of a key operated.

On the other hand, the output of a tuning curve simulating constant generating circuit 337 which receives the block code OCT is applied to the adder 335. The reason why the constant generating circuit 337 is provided resides in that even if note tones are that same, it is necessary to tune the note tone which is higher in octave to a slightly higher frequency than the note tone which is lower in octave. The circuit 337 delivers out a tuning output corresponding to the octave number assigned to the applied block code OCT, in the form of a binary value. This output is added to the frequency output of the converter 334 in the adder, to obtain a tuning effect.

The output of the shifter 336 is applied to an accumulator 338. In this accumulator 338, whenever the master clock pulses $\phi_1$ and $\phi_2$ are applied thereto, the output of the shifter 336 is subjected to addition, and an output pulse is produced when overflow occurs in the addition contents. As the output of the shifter 336 is proportional to the tone pitch frequency of an operated key, as was described, the addition content of the accumulator 338 is increased as the tone pitch frequency increases. Thus, a pulse output $\omega t$ having a frequency proportional to the tone pitch frequency is delivered to the output terminal of the accumulator 338.

This frequency pulse output $\omega t$ of the accumulator 338 is applied to a multiplication circuit 339 (FIG. 2) where it is multiplied by the tone pitch constant B1 outputted by the second constant generating circuit 327 in the first system parameter generating circuit 52. The output B1$\cdot\omega t$ of the multiplication circuit 339 is delivered as the calculation output of the carrier wave term of Equation (3).

This calculation output B1$\cdot\omega t$ has the tone pitch frequency of a key depressed.

(4-2) Modulating Wave Term Calculation Circuit

The modulating wave term calculation circuit 333 has a sine function generating circuit 341 made up of a read only memory (ROM) for obtaining the modulating term. The output $\omega t$ of the carrier wave term calculation circuit 332 is multiplied by the partial tone constant D1 from the second constant generating circuit 327 of the first system parameter generating circuit 5A in a multiplication circuit 342, and the multiplication result is applied to the sine function generating circuit 341. The sine function generating circuit 341 therefore outputs a sine wave output sin D1$\cdot\omega t$, which is applied to a multiplication circuit 343 where it is multiplied by the constant $T_{1f}(t)\cdot I_1(t)$. Thus, the multiplication result $T_{1f}(t)\cdot I_1(t)\cdot\sin$ D1$\cdot\omega t$ is outputted by the modulating wave term calculation circuit 333.

Figure 13:
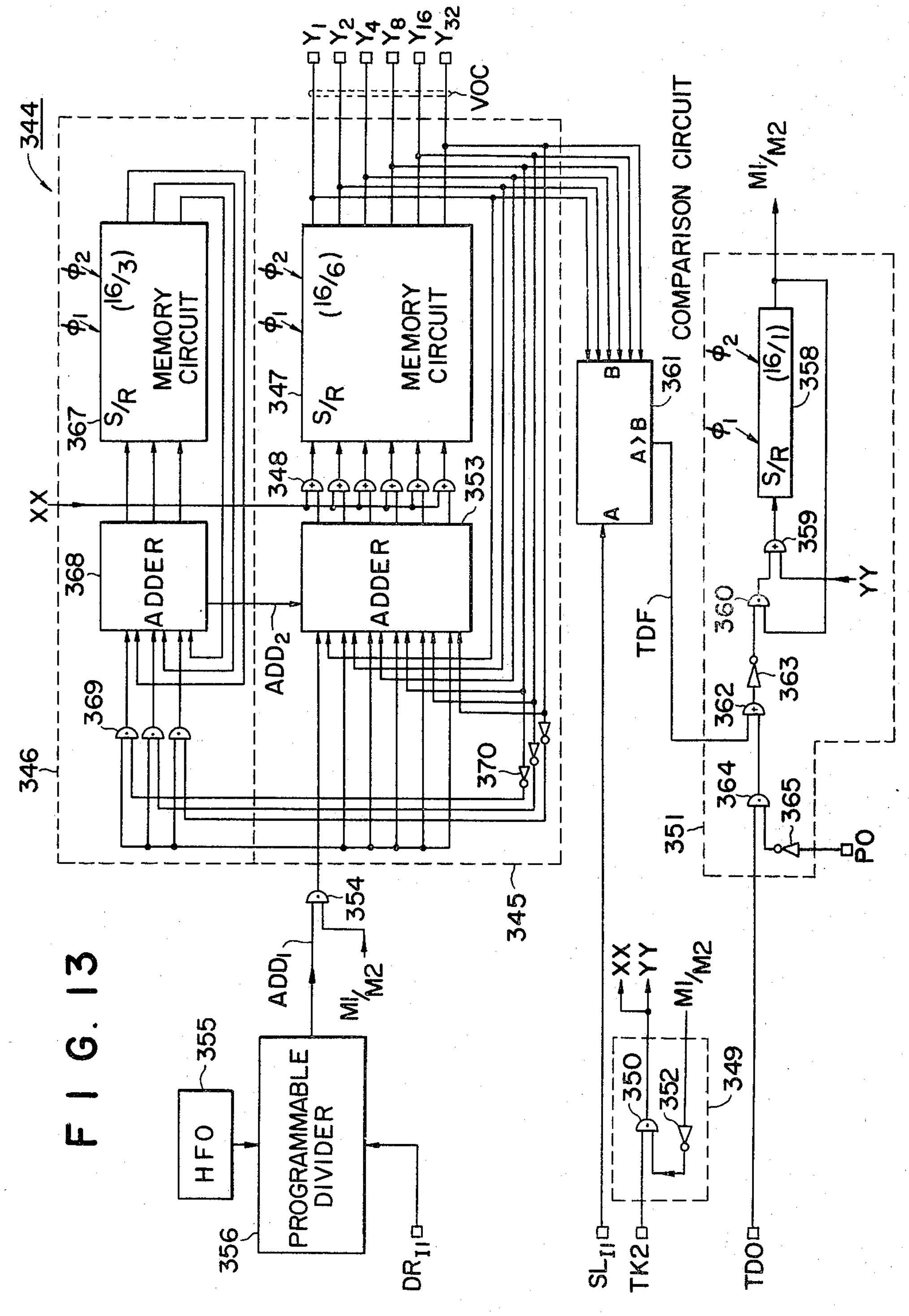
FIG. 13 is a connection diagram showing a tone color function generating circuit in the musical tone signal forming section.

The constant $T_{1f}(t)\ I_1(t)$ applied to the multiplication circuit 343 is formed according to the output of a tone color function generating circuit 344 as shown in FIG. 13.

Figure 14:
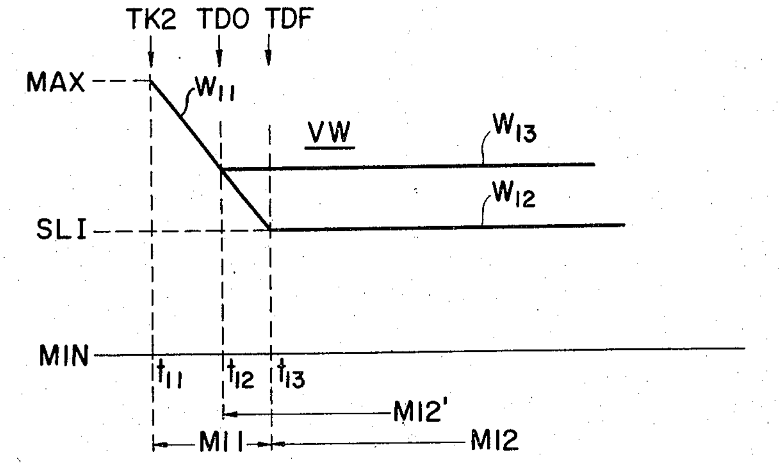
FIG. 14 is a waveform diagram illustrating a reference tone color waveform.

The tone color function generating circuit 334 is to generate a tone color waveform for determining variation in time of a fundamental tone color, and generates the output of a fundamental tone color waveform as shown in FIG. 14 in this example. More specifically, the waveform output VW reaches its maximum value MAX upon arrival of the second key switch operation detection signal TK2 (at the time instant $t_{11}$), and thereafter decays straightly or curvedly (exponentially for instance), and when it reaches a level $SL_1$, it maintains that value. On the other hand, when the key is released before the decay part $W_{11}$ of the output waveform VW is completed, that is, when the key released at the time instant $t_{12}$, the value at that time instant $t_{12}$ is maintained by the waveform output VW. With respect to such a waveform output VW, the decay section will be designated by reference character M11, while the constant section will be designated by reference character M12.

Such a waveform as described above is formed by the circuit shown in FIG. 13. The tone color function generating circuit 344 comprises a straight-line calculation circuit 345 for forming a straight decay waveform, and a curved-line calculation circuit 346 for forming a curved decay waveform. The fundamental operation of the straight line calculation circuit 345 is a subtraction operation, while the fundamental operation of the curved line calculation circuit 346 is an addition operation.

The straight-line calculation circuit 345 has a memory circuit 347 obtained by providing 16-stage shift registers for 6 bits in parallel in correspondence to the 16 channels of the key code KC which is applied by the channel processor 13. By allowing the stages of the six shift registers to carry out the writing and reading operations with the aid of the master clock pulses $\phi_1$ and $\phi_2$, the contents of the memory circuit 347 are shifted in synchronization with the shifting operations of the 1st through 16th channel of the key code KC, as a result of which the outputs of the 16th stages are outputted as a tone color reference signal VOC to the output terminals Y1 through Y32 of the memory circuit 347.

In the memory circuit 347, input OR gates 348 are provided for all the bits thereof, respectively. By applying a set signal XX at the logical level "1" to all the bits through the input OR gates 348, the data "1" is written in all the bits of the channel provided in the first stages of the memory circuit 347. When this channel which has stored the signal "1" in all the bits is read out of the 16th stages, this is delivered, as the maximum value MAX of the tone color reference signal VOC at the time instant $t_{11}$ in FIG. 14, to the output terminals Y1 through $Y_{32}$.

The set signal XX is formed with the aid of the second key switch key-on detection signal TK2 from the channel processor 13. More specifically, the detection signal TK2 is applied, as one condition signal, to a 2-input AND circuit 350, while the subtraction signal M1/M2 of a subtraction signal control circuit 351 described later is applied, as the other condition signal, thereto through an inverter 352. In this connection, the subtraction signal M1/M2 is raised to the logic "1" when the waveform output VW is in the decay section M11 (FIG. 14), while it is lowered to "0" when the waveform output is in the section M12 other than the decay section M1 (the section M12 being a section where the waveform output is maintained constant), as described later.

Therefore, the subtraction signal M1/M2 is at "0" before arrival of the second key switch key-on detection signal TK2. Accordingly, when the channel with the detection signal TK2 at "1" is applied to the AND circuit 350, the output of the AND circuit 350 is raised to "1", which is outputted as the set signals XX and YY.

Thus, the signals "1" are set for all the bits of the memory circuits 347. When the signal "1" is outputted by the AND circuit 350, the subtraction signal M1/M2 is raised to "1", and therefore the output "1" cannot be outputted by the AND circuit 350.

Connected to the input side of the memory circuit 347 is an addition circuit 353 made up of a full-adder having six stages. The outputs of the bits of the memory circuit 347 are applied, as first addition inputs of the stages of the addition circuit 353, thereto, and an input "1" $ADD_1$ having a controlled period is applied, as second addition inputs the stages of the addition circuit 353, thereto by the AND gate 353. Thus, the value "1" is subtracted from the contents of the channels of the memory circuit 347 in the addition circuit 353. The subtraction outputs are written in the first stages of the memory circuit 347 through the OR circuits 348.

The rising width of the input "1" $ADD_1$ applied by the AND circuit 354 is predetermined to the length of 16 periods of the master clock pulses $\phi_1$ and $\phi_2$ employed for the shifting operation of the memory circuit 347. Therefore, now matter what channel out of the 1st through 16th channel is readed out to the addition circuit 353, the subtraction operation is uniformed carried out.

Thus, whenever the calculation content of the memory circuit 347 is read out through the 16th stages thereof, the calculation content of the memory circuit 374 is subtracted by the value "1" under condition that the input "1" $ADD_1$ is applied thereto; however, if the input "1" $ADD_1$ is not applied thereto, the calculation content is not subtracted at all and it is written, as it is, in the memory circuit 347. Therefore, the subtraction speed of the content of the memory circuit 347 is determined by the application frequency of the input "1" $ADD_1$ applied thereto by the AND gate 354, that is, the period of the input.

The output of the AND gate 354 is generated by a square wave oscillator 355, and is delivered out through the AND gate 354 after its repetitive period being changed by a programmable divider 356.

A tone color variation constant $DR_{11}$ generated by the first constant generating circuit 325 of the first system parameter generating circuit 5A is applied to the programmable divider 356, and the period of the output of the oscillator 335 is changed to a value corresponding to the value of the constant. Since the tone color variation constant $DR_{11}$ is selected according to the tone color by selected by the tone color selection switch 6, the subtraction speed of the straight-line calculation circuit 345, that is, the decay inclination of the reference tone color waveform VW is determined by the selected tone color.

On the other hand, the output M1/M2 of the subtraction signal control circuit 351 is applied, as an open control signal, to the AND gate 354. This subtraction signal control circuit 351 has a 16-stage shift register 358 similar to that in the aforementioned memory circuit 347. Upon application of the subtraction channel designating set signal YY having the logic "1" through an input OR gate 359 from the set signal forming circuit 349, the shift register 358 operates to store it in the first stages. When the channel storing this signal "1" is shifted to the 16th stages, it is applied, as the subtraction instruction signal M1/M2, to the AND gate 354. Accordingly, for only the section (corresponding to one period of the master clock pulse) of the channel read out of the register 358 output of the time (corresponding to 16 periods of the master clock pulse) during which the output of the divider 356 is produced, the AND gate 354 is opened at which time the content of the channel read out to the 16th stages of the memory circuit 347 is subtracted by the value "1".

The storage of the signal "1" in the shift register 358 in the subtraction signal control circuit 351 is circulated through a feed-back AND gate 360 and an OR gate 359. Therefore, the subtraction instruction signal M1/M2 is produced every circulation of this storage, and subtraction operation of the data of the channel having stored that signal "1" is repeated. As a result, at the output terminal of the straight-line calculation circuit 345 the straightly decaying waveform output VOC can be obtained from the relevant channel (which is the channel to which the tone of a key depressed is assigned).

The signal "1" stored in the subtraction signal control circuit 351 is cleared by closing the feedback AND gate 360; however, this includes the following two cases:

One of the two cases is such that the decay waveform part $W_{11}$ of the tone color reference waveform VW (FIG. 14) decays to the predetermined level $SL_1$, as a result of which the output of the straight-line calculation circuit 345 is applied, as one comparison input B, to a comparison circuit 361. In addition, a tone color variation stop level constant $SL_{I1}$ from the first constant generating circuit 325 of the first system parameter generating circuit 5A is applied, as the other comparison input A, to the comparison circuit. When the condition $A > B$ is satisfied, or when the decay waveform part $W_{11}$ decays below the level $SL_{I1}$ determined by the tone color selected, a clear signal TDF is outputted by the comparison circuit 361. This clear signal TDF is applied, as an open control signal, to the AND gate 360 through an input OR gate 362 and an inverter 363, as a result of which the contents of the channel provided in the first stages of the register 358 are cleared to "0".

Thereafter, no subtraction signal M1/M2 is provided for the channel. Accordingly, the "1" subtraction input AND gate 354 is closed, and therefore no subtraction operation with respect to the content of the memory circuit 347 is effected. As a result, the output developed at the terminals Y1 through Y32 of the straight line calculation circuit 345 is maintained unchanged (which corresponds to the constant waveform part $W_{12}$ in FIG. 14).

The other case is such that with respect to the tone color reference waveform VW key release is effected at the time instant $t_{12}$ before the decay waveform part $W_{11}$ is completed. In this case, the key-off detection signal TDO read out of the key-off memory circuit 293 in the channel processor 13 is applied, as an open control signal, to the AND gate 360 through the OR gate 362 and through the inverter 363, as a result of which the contents of the channel provided in the first stages of the register 358 are cleared to "0".

In this case also, the output developed at the terminals Y1 through Y32 of the straight line calculation circuit 345 is maintained constant (which corresponds to the constant waveform part $W_{13}$) similarly as in the above-described case.

On the other hand, the damper pedal signal PO (which is lowered to "0" in operation) from the damper pedal 9 is applied, as an open control signal, to the AND gate 364 provided in the path of the key-off detection signal TDO through the inverter 365. Thus, in the case where, when the key-off detection signal TDO is applied, the damper pedal 9 is depressed, the storage of the relevant channel in the subtraction signal control circuit 351 is immediately cleared as was described above. Therefore, immediately the straight line calculation circuit 345 suspends its subtraction operation, and forms the constant waveform part $W_{13}$ (FIG. 14) of the output waveform VW.

Since the effect of the damper pedal 9 is eliminated when depression of the damper pedal 9 is suspended, the output waveform VW of the straight line calculation circuit 345 is extended to the waveform part $W_{12}$ at the time instant when the damper pedal 9 is released.

When a musical tone is produced according to the reference tone color waveform VW which, as shown in FIG. 14, is formed by the straight line calculation circuit 345, auditors may feel it unpleasant. In order to eliminate this drawback, the curved line calculation circuit 346 is provided.

In the case where the reference tone color waveform VW is formed by the straight line calculation circuit 345 only, as is apparent from the waveform shown in FIG. 14, the linear decay part $W_{11}$ follows the constant waveform part $W_{12}$ of $W_{13}$. That is, the output waveform is abruptly changed from the linear decay part to the constant waveform part forming a certain angle with the former part, which is one of the factors which may cause auditors to feel unpleasant. Accordingly, the output waveform is modified so as to generally exponentially change to eliminate the drawback.

For this purpose, the curved line calculation circuit 346 is made up of a memory circuit 367, and an addition circuit 368. The memory circuit 367 is similar to the above-described memory circuit 347 in the straight line calculation circuit 345 except that the number of bits is three. The addition circuit 368 is also similar to the addition circuit 353 in the straight line calculation circuit 345 except that the number of stages is three and the carry is delivered out of the highest bit.

The bit outputs of the 16th stages of the memory circuit 367 are added to the "1" addition input $AND_1$ applied to the addition circuit 368 through input AND gates 368 which are provided respectively for the stages of the addition circuit 368, and the addition result is directly fed back to the first stages of the memory circuit 367.

The higher three bit outputs, or the 4th through 6th bit outputs, out of the output of the memory circuit 347 in the straight line calculation circuit 345 are applied, as open control signals, to the input AND gates 369 provided from the 1st through 3rd stages of the addition circuit 368 through inverters 370.

Accordingly in the process that the contents of the memory circuit 347 in the straight line calculation circuit 345 are successively subjected to "1" subtraction starting from the state that the signals "1" are stored in all the bits with the aid of the set signal XX, when the contents of the fourth bit from the bottom have "0" (the contents having alternately "1" and "0" every eight subtraction operations), the "1" addition input $ADD_1$ is applied to the first bit of the addition circuit 388. Thus, the contents of the memory circuit 367 are successively increased by "0 0 1".

When the contents of the fifth bit of the memory circuit 347 become "0" (the contents having alternately "1" and "0" every sixteen subtraction operations), the "1" addition input is applied to the second bit of the addition circuit 368. Thus, the contents of the memory circuit 367 are successively increased by "0 1 0".

Furthermore, when the contents of the sixth bit of the memory circuit 347 become "0" (the contents having alternately "1" and "0" every thirty-two subtraction operations), the "1" addition input is applied to the third bit of the addition circuit 368. Thus, the contents of the memory circuit 367 are successively increased by "1 0 0".

When, as a result of the above-described addition operation, a carry occurs with the third bit of the addition circuit 368, it is applied, as the "1" addition input $ADD_2$, to the straight line calculation circuit 345.

In addition, the logic "1" input applied through the AND circuit 354 to the straight line calculation circuit 345 can be employed as the "1" addition input applied through the AND gates 369.

The above-described curved line calculation circuit 346 operates in association with the straight line calculation circuit 345 as follows:

During the period of eight subtraction operations that elapses from the time instant that the memory circuit 347 of the straight line calculation circuit 346 is set to "1 1 1 1 1 1 1 1" till it becomes "1 1 1 0 0 0", the contents of the 4th–6th bits which are the output of the memory circuit 347 are "1 1 1", and therefore it can be said that the straight line calculation circuit 345 carries out its original linear subtraction operation.

During the period that elapses from the eighth subtraction operation till the sixteenth subtraction operation, the 4th–6th bits which are the output of the memory circuit 347 are "1 1 0". Accordingly, the addition circuit 368 in the curved line calculation circuit 346 operates to successively add "0 0 1" (one in decimal notation) to the contents of the memory circuit 367, and to output the carry $ADD_2$ with a period corresponding to the increasing speed of the addition result. Since the timing of the output of the carry $ADD_2$ is coincident with the timing of the "1" subtraction operation of the addition circuit 353 of the straight line calculation circuit 345, the addition circuit 353 receives this subtraction input and the carry $ADD_2$ (or the addition input) applied by the addition circuit 368 in the curved line calculation circuit 346 at the same time. Accordingly, whenever the carry $ADD_2$ is delivered out, the straight line calculation circuit 345 suspends the subtraction operation.

For the period which elapses from the 16th subtraction operation till the 24th operation, the 4th–6th bits of the output of the memory circuit 347 is "1 0 1", and therefore the addition circuit 368 of the curved line calculation circuit 346 successively adds "0 1 0" (two in decimal notation) to the contents of the memory circuit 367, and outputs the carry $ADD_2$ with the period corresponding to the increasing speed of the addition result. That is, in this case, the carry $ADD_2$ is outputted at a speed twice as fast as that in the case of the 8th–16th subtraction operation. Accordingly, the subtraction operation is suspended at this frequency in the straight line calculation circuit 345, and in correspondence to this the decreasing speed of the output VOC of the straight line calculation circuit is reduced.

Similarly as in the above-described case, as the 4th–6th bits of the output of the memory circuit 347 in the straight line calculation circuit 345 changes to "1 0 0", "0 1 1", and so forth, the addition value to the addition circuit 368 in the curved line calculation circuit 346 is increased as "0 1 1", "1 0 0" and so forth (being three, four and so forth in decimal notation), and accordingly the frequency of outputting the carry $ADD_2$ is increased exponentially as 2 times, 22 times, and so forth. In response to this, the frequency of intermittently suspending the subtraction operation of the straight line calculation circuit 345 is also increased exponentially, and accordingly the subtraction speed of the memory circuit 347, that is, the decaying speed of the output waveform VW is decreased exponentially.

As is apparent from the above description, the provision of the curved line calculation circuit 346 serves to round the abrupt change part of the decay waveform part VW where the latter is abruptly changed into the constant waveform part $W_{12}$ or $W_{13}$. Accordingly, the drawback that the auditor feels the produced musical tone unpleasant otherwise can eliminated by the provision of the circuit 346.

The fundamental tone color signal VOC thus formed by the straight line calculation circuit 345 in the tone color function generating circuit 344 is applied to a multiplication circuit 371 (FIG. 12B), where it is multiplied by the constant $IL_1$ applied thereto by the first constant generating circuit 325 in the first system parameter generating circuit 5A, whereby the output of the variable $I_1(t)$ in Equation (3) is obtained. This output $I_1(t)$ is multiplied by the variable output $T_{1i}(t)$ in the following multiplication circuit 372, whereby the variable $T_{1i}(t) \cdot I_1(t)$ is obtained.

This variable output $T_{ii}(t)$ is formed with the aid of the initial touch signal ITD and the after touch signal ATD applied respectively by the initial touch control circuit 14 and the after touch control circuit 15 in the keyboard information generating section 1. More specifically, the initial touch signal ITD is multiplied by the initial constant $\alpha i$ applied by the first system parameter generating circuit 5A in a multiplication circuit 373 (FIG. 12A), and is multiplied by the after constant $\alpha a$ applied by the first system parameter generating circuit 5A in a multiplication circuit 374, and these multiplication results are added by an adder 375. The addition result, or the output of the adder 375 is applied, as the variable $T_{1i}(t)$, to the multiplication circuit 372.

The variable $T_{1i}(t)$ thus obtained becomes a time variable when the after touch signal ATD is changed in response to the variation in depression of a key effected by the performer during the performance.

The output $T_{1i}(t) \cdot I_1(t)$ of the multiplication circuit 372 is multiplied by the output $\sin \cdot D_1\ \omega t$ of the sine function generating circuit 341, and the multiplication result is delivered as the output of the modulation wave term calculation circuit 333 representing the modulation wave term $T_{1i}(t) \cdot I_1(t) \cdot \sin D1 \cdot \omega t$ in the Equation (3).

(4-3) Amplitude Term Calculation Circuit

Figure 15:
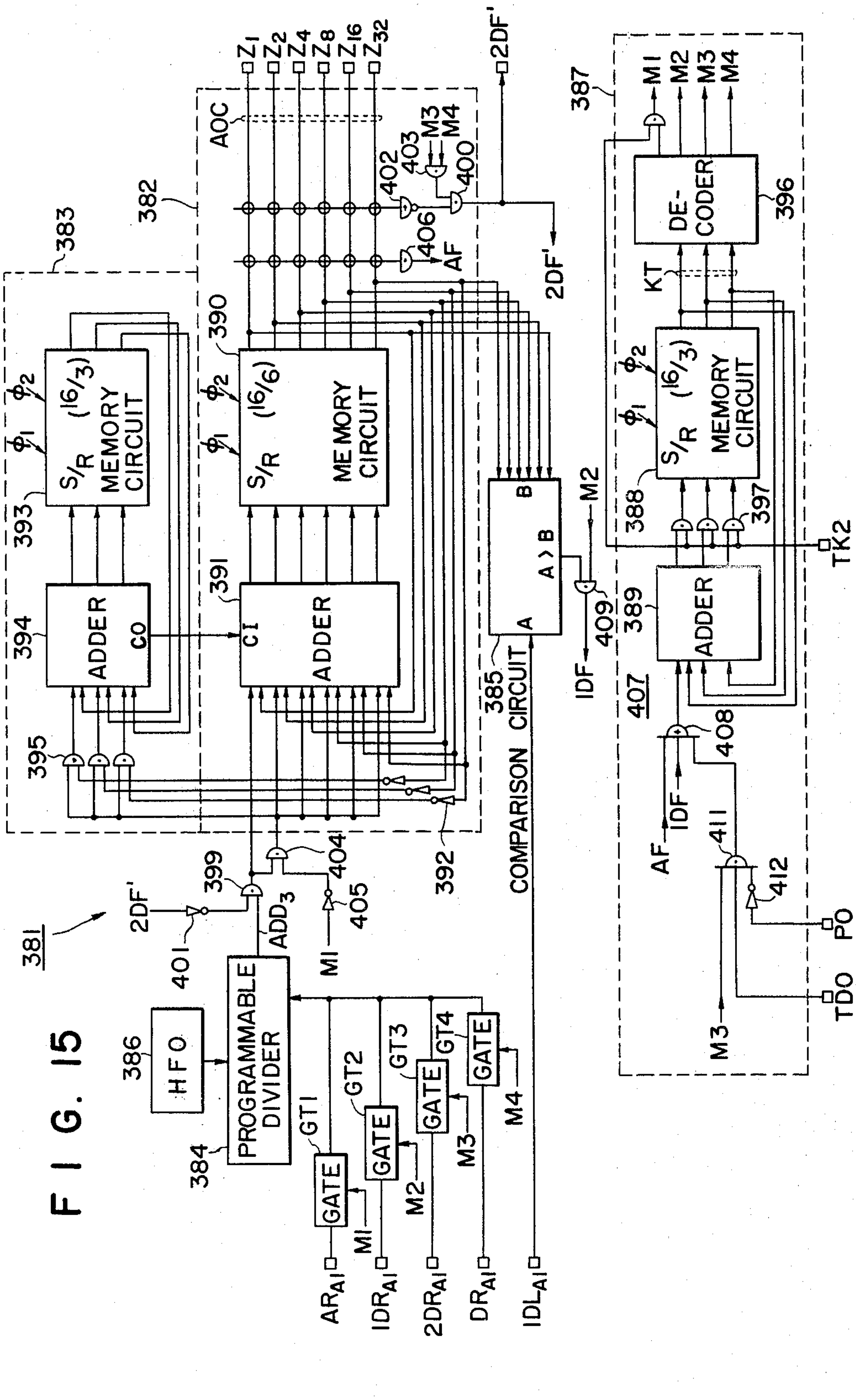
FIG. 15 is a connection diagram illustrating a tone volume function generating circuit in FIG. 12.

The amplitude term calculation circuit 331 is to obtain the amplitude term $K_1 \cdot T_{1a}(t) \cdot A_1(t)$ in Equation (3), having a tone volume function generating circuit 381, as shown in FIG. 15.

The tone volume function generating circuit 381 operates to provide an output AOC for determining a fundamental amplitude variation in time including the volume and envelope of a produced tone. The output AOC has an envelope waveform ENV as shown in FIG. 16.

The envelope waveform output ENV has an attack waveform part $ENV_1$ which rises at a steep inclination from the minimum value MIN to the maximum value MAX at the time instant $t_{21}$ when the second key switch key-on detection signal TK2 is applied by the channel processor 13 in response to the closure of the second key switch effected by the normal key depression, a first decay waveform part $ENV_2$ which decays at a relatively steep inclination from the top of the attack waveform part $ENV_1$, and a second decay waveform part $ENV_3$ which decays to the minimum value from the lower end of the first decay waveform part at a relatively moderate inclination.

When the damper pedal 9 is depressed before the second decay waveform part $ENV_3$ reaches the minimum value MIN, or at the time instant $t_{24}$ in FIG. 16, a damp inclination part $ENV_4$ which decays at a steep inclination to the minimum value MIN is formed.

In order to provide the envelope waveform output AOC, the tone volume function generating circuit 381 comprises a straight line calculation circuit, 382, a curved line calculation circuit 383, a programmable divider 384, and a comparison circuit 385 which are substantially similar, respectively, to the straight line calculation circuit 345, the curve line calculation circuit 346, the programmable divider 356 and the comparison circuit in the tone color function generating circuit 344 described with reference to FIG. 13. The tone volume function generating circuit 381 is similar to the above-described tone color function generating circuit 344 in a fundamental design that the period of subtraction operation in the straight line calculation circuit 382 is changed by changing the period of the output pulse of the programmable divider 384 receiving the output of the oscillator 386 thereby to form a decay form part.

The period of the output pulse $ADD_3$ of the divider 384 is set up by applying the constant signals from the first system parameter generating circuit 5A, as period setting signals, to the divider 384 with the aid of gate signals M1 through M4 which are provided by an inclination variation control circuit 387 in correspondence respectively to the waveform parts $ENV_1$ through $ENV_4$.

In order to generate the attack waveform part $ENV_1$, the attack speed constant $AR_{A1}$ from the first system parameter generating circuit 5A is applied to the divider 384 through a gate GT1 which is opened by the first gate signal M1, so that the period of the output pulse $ADD_3$ of the divider 384 is controlled to a value corresponding to the constant $AR_{A1}$ and the addition operation frequency of the straight line calculation circuit 383, that is, the rising inclination of the output waveform ENV is selectively set in accordance with the kinds of tone colors (such as piano, and harpsichord).

In order to generate the first decay waveform part $ENV_2$, the first decay speed constant $1DR_{A1}$ from the first system parameter generating circuit 5A is applied to the divider 384 through the gate TG2 opened by the second gate signal M2. Thus, similarly as in the above-described case, the decay inclination of the first decay waveform part $ENV_2$ of the output waveform ENV is set according to the kind of tone color selected.

Furthermore, in order to generate the second decay waveform part $ENV_3$, the second decay speed constant $2DR_{A1}$ is applied to the divider 384 through the gate GT3 opened by the third gate signal M3. Thus, the inclination of the second decay waveform part $ENV_3$ is set to a value greater than the inclination of the first decay waveform part $ENV_2$, according to the tone color selected.

On the other hand, in generating the damp waveform part $ENV_4$, the gate GT4 is opened by the fourth gate signal M4, and the decay speed constant $DR_{A1}$ is applied to the divider through the gate GT4 thus opened, so that the damp waveform part $ENV_4$ having an inclination greater than that of the second decay waveform part $ENV_3$ is set.

The gate signals M1 through M4 for the gates GT1 through GT4 are successively provided by the inclination change control circuit 387 after arrival of the second key switch key-on detection signal TK2.

The inclination change control circuit 387 comprises a memory circuit 388 having 16-stage shift registers for three bits, and an addition circuit 389 operating to add "1" to the output of the memory circuit 388 and to allow the memory circuit to store the addition result again. The memory circuit 388, similarly as in the memory circuit 390 in the above-described straight line calculation circuit 382 and in the memory circuit 393 in the curved line calculation circuit 383, carries out the shifting operation to dynamically store the stepping data for each of the 1st through 16th channels.

Thus, the output KT, a 3-bit binary signal, of the memory circuit 388 is delivered out, and is converted into four line output M1 through M4 by a decoder 396. However, it should be noted that the decoder 396 outputs the gates signals M1, M2, M3 and M4 respectively when the output KT of the memory circuit 388 is "0 0 0", "0 0 1", "0 1 0" and "0 1 1". That is, as the contents of the memory circuit 388 is increased from "0 0 0" to "0 1 1" being added with 37 1", the inclination change control circuit 387 outputs the gates signals M1, M2, M3 and M4 in the stated order.

AND gates 397 opened by the second key switch key-on detection signal TK2 are provided between the addition circuit 389 and the memory circuit 388. Accordingly, when the detection signal TK2 is at "0", all the bits of the contents of the memory circuit 388 are changed to "0", and when the detection signal TK2 is raised to "1", the addition operation of the addition circuit for the memory circuit 388 is started at "0 0 0".

On the other hand, an AND gate 398 opened by the second key switch key-on detection signal TK2 is provided in the path of the gate signal M1 of the decoder 396, so that the gate signal M1 is first delivered out upon arrival of the detection signal TK2.

This gate signal M1 is applied to the gate GT1, and accordingly the divider 384 outputs the "1" signal ADD having a period corresponding to the constant $AR_{A1}$ through the AND gate 399. In this operation, the AND gate 399 receives through an inverter 401 an inhibit signal 2DF' from a minimum value detecting AND gate 400 provided at the output terminal of the memory circuit 390 in the straight line calculation circuit 382. On the other hand, the output of a NOR circuit 402 receiving all the bit outputs of the output of the memory circuit 390 is applied, as a first condition signal, to the AND circuit 400, and furthermore the output of an OR circuit 403 receiving the third and fourth gate signals M3 and M4 is applied, as a second condition signal, to the AND circuit 400. Accordingly, in the case where the memory circuit 390 has no storage, the AND gate 400 operates when the gate signal M3 or M4 is provided (that is, when the second decay waveform part $ENV_3$ or the damp waveform part $ENV_4$ is generated). As the AND gate 399 is not inhibited at the time of generating the gate signal M1, the output $ADD_3$ of the divider 384 passed through the AND gate 399 is inputted into the least significant bit of the addition circuit 391.

On the other hand, an AND gate 404 is provided for the input terminals of the bits other than the least significant bit of the addition circuit 391. This AND gate 404 is inhibited through an inverter 405 by the gate signal M1. Accordingly, at the time of generation of the gate signal M1, the addition circuit 391 operates to add the "1" signal applied to the least significant bit. As a result, the waveform ENV of the output AOC of the memory circuit 390 rises at an inclination corresponding to the constant $AR_{A1}$, thus forming the attack waveform part $ENV_1$.

This state is maintained until the contents of the memory circuit 390 have the logic "1" for all the bits thereof. When all the bits have the logic "1", it is detected by the maximum value detecting AND circuit 406, the logic "1" output of which is applied, as a stepping input signal AF, to the stepping circuit 407 of the inclination change control circuit 387.

The stepping circuit 407 applies the input signal AF to the addition circuit 389 through its input OR gate 408 therebh to add "0 0 1" to the contents of the memory circuit 388, as a result of which the second gate signal M2 is provided by the decoder 396.

The second gate signal M2 thus provided is applied to the gate GT2, and therefore the divider 384 outputs the "1" signal $ADD_3$ having a period corresponding to the constant $1DR_{A1}$ through the gate 399. In this operation, the inhibition operation of the straight line calculation circuit 382 for the input gate 404 of the addition circuit 391 has been released. Accordingly, as the "1" signal $ADD_3$ is applied to all the bits of the addition circuit 391, the addition circuit 391 successively subtracts "1" from the contents of the memory circuit 390. As a result, the output waveform ENV of the memory circuit 390 decays at an inclination corresponding to the constant $1DR_{A1}$, thus forming the first decay waveform part $ENV_2$.

In this case, the output AOC of the memory circuit 390 is compared with the decay transition level constant $1DL_{A1}$ provided by the first system parameter generating circuit 5A in the comparison circuit 385, and when the output AOC becomes lower than the constant $1DL_{A1}$, the detection output 1DF is delivered through the AND gate 409 (opened by the gate signal M2). This detection output 1DF is applied, as a stepping signal, to the addition circuit 389 through the input gate 408 of the stepping circuit 407. As a result, the addition circuit 389 operates to add "0 0 1" to the contents of the memory circuit 388, thus causing the decoder 396 to generate the third gate signal M3.

This third gate signal M3 is applied to the gate GT3. Therefore, the divider 384 outputs the "1" signal $ADD_3$ having a period corresponding to the constant $2DR_{A1}$ through the gate 399. In this operation, the "1" signal is applied to all the bits of the addition circuit 391 in the straight line calculation circuit 382, and therefore the addition circuit 391 successively subtracts "1" from the contents of the memory circuit 390. As a result, the output waveform ENV of the memory circuit 390 decays at an inclination corresponding to the constant $2DR_{A1}$ (being smaller than the inclination corresponding to the constant $1DR_{A1}$, normally), thus forming the second decay waveform $ENV_3$.

Thus, the inclination of the output waveform ENV of the straight line calculation circuit 382 becomes moderate with the decay transition level constant $1DL_{A1}$ as a border.

In principle (when the damper pedal 9 is not operated), this state is maintained until the contents of the straight line calculation circuit 382 become "0" and the value of the output waveform ENV becomes therefore the minimum value MIN (FIG. 16).

When the contents of the memory circuit 390 becomes "0", the logic "1" detection output 2DF' is produced in the minimum value detecting AND circuit 400, and is applied to a decay finish signal generating AND circuit 410 (FIG. 12B).

Under this condition, upon key release the second key switch key-on detection signal TK2 is lowered to "0". Therefore, the AND gates 397 connected between the addition circuit 389 and the memory circuit 388 in the inclination change control circuit 387 are closed, and the contents of the memory circuit 388 are cleared. On the other hand, the output gate 398 of the gate signal M1 is closed, and the control circuit 387 is placed in the standby state.

The above-described operation is effected in the case when the damper pedal 9 is not operated. However, when the damper pedal 9 is operated during the formation of the second decay waveform part $ENV_3$ (at the time instant $t_{24}$ in FIG. 16), the damp waveform part $ENV_4$ is formed as follows:

In the input side of the addition circuit 389, a damp waveform part forming AND circuit 411 is provided for the stepping circuit 407. The first condition signal, or the third gate signal M3, the second condition signal, or the damper pedal signal PO, and the third condition signal, or the key-off detection signal TDO are applied to the AND circuit 411. When the key release is effected and the damper pedal 9 is operated during the formation of the second decay waveform part $ENV_3$, the logic "1" output is provided by the AND gate 411, and is applied, as a stepping signal, through the input OR gate 408 to the addition circuit 389.

As a result, the addition circuit 389 operates to add "1" to the content of the memory circuit 388, thus generating the fourth gate signal M4 from the decoder 396.

This fourth gate signal M4 is applied to the gate GT4, and therefore the "1" signal $ADD_3$ having a period corresponding to the constant $DR_{A1}$ is outputted through the gate 399. In this case, the "1" signal is applied to all the bits of the addition circuit 391 in the straight line calculation circuit 382, as a result of which the subtraction of "1" from the contents of the memory circuit 390 is successively carried out by the addition circuit 391. Therefore, the output waveform ENV of the memory circuit 390 decays quickly at an inclination corresponding to the constant $DR_{A1}$ (greater than the inclination of the second decay waveform part $ENV_3$, normally) to the minimum level MIN, thus forming the damp waveform part $ENV_4$.

Thus, the waveform output AOC of the straight line calculation circuit 382 is outputted as the amplitude level of the tone volume function generating circuit 381 or the envelope variable output $A_1(t)$ through the output terminals Z1 through Z32 to the multiplication circuit 415 (FIG. 12B) where it is multiplied by the tone volume selecting variable $T_{1a}(t)$. The multiplication result is applied to the multiplication circuit 416 where it is multiplied by the total tone volume constant K1 applied thereto by the first system parameter generating circuit 5A, thus obtaining the amplitude term $K1 \cdot T_{1a}(t) \cdot A_1(t)$ of Equation (3).

In this connection, the tone volume selecting signal $T_{1a}(t)$ is formed with the aid of the initial touch control ITD and the after touch control ATD applied by the initial touch control circuit 14 and the after touch control circuit 15 in the keyboard information generating circuit 1 (FIG. 12A). In other words, the initial touch signal ITD is multiplied by the initial constant $\beta i$ from the first system parameter generating circuit 5A in the multiplication circuit 417, while in the multiplication circuit 418 the after touch signal ATD is multiplied by the after constant $\beta a$ from the first system parameter generating circuit 5A. These multiplication results are subjected to addition in the addition circuit 419, which applied the addition result, as the variable $T_{1a}(t)$, to the multiplication circuit 415 described above.

The variable $T_{1a}(t)$ thus obtained becomes a time variable as the after touch signal ATD changes with the change in strength of key depression effected by the performer.

(4-4) Output Circuit

The output circuit 421 (FIG. 12B) operates to form the output of the first term in Equation (3) on the basis of the output $T_{1f}(t) \cdot I_1(t) \cdot \sin D_1 \omega t$ of the above-described modulation wave term calculation circuit 333, the output $B1\omega t$ of the carrier wave term calculation circuit 332, and the output $K1 \cdot T_{1a}(t) \cdot A_1(t)$ of the amplitude term calculation circuit 331. After the output of the carrier wave term calculation circuit 332 is added to the output of the modulation wave term calculation circuit 332 by an addition circuit 422, a sine function generator 423 comprising a read only memory provides its output $\sin \{B1 \cdot \omega t + T_{1f}(t) \cdot I_1(t) \sin D_1 \cdot \omega t)\}$ realizing the first term of Equation (3).

In correspondence to the fact that the key information IFK and the touch information IFT applied to the first system musical tone signal forming section 7A are digital signal in time division multiplex system, the aforementioned first term output is obtained as a result of processing it as a digital signal, similarly, in time division multiplex system. This digital signal is converted into an analog signal by a digital-to-analog (D/A) converter 425, and finally it is delivered as an analog signal in time division multiplex system, or the musical tone signal $e_1$ of the first term, to the musical tone generating section 8.

Similarly as in the above-described first system musical tone forming section 7A, in the second system musical tone forming section 7B an analog signal in time division multiplex system is delivered, as the musical tone signal $e_2$ of the second term, to the musical tone generating system 8.

On the other hand, the minimum value detection output 2DF' formed by the amplitude term calculation circuit 331 in the section 7A, and the minimum value detection output 2DF' formed similarly by the amplitude term calculation circuit in the section 7B are applied to the decay finish signal generating AND circuit 410. When the envelope waveform output ENV reaches the minimum value MIN in each of the two systems, the AND circuit 410 outputs a decay finish signal 2DF. This signal 2DF is applied, as a clear signal generating condition signal, to the timing control circuit 13F in the channel processor 13.

As a result, the timing control circuit 13F applies the clear signal $\bar{R}$ to the key code memory circuit 13C, so as to clear the storage of the channel which exists presently in the first stages in the memory circuit 237. Accordingly, thereafter, production of the tone corresponding to the key code stored in that channel is suspended, and the channel becomes an empty channel.

Furthermore, the output $K1 \cdot T_{1a}(t) \cdot A_1(t)$ of the amplitude term calculation circuit 331 in the first system musical tone forming section 7A, and the similar output $K2 \cdot t_{2a}(t) \cdot A_2(t)$ of the second system musical tone forming section 7B are subjected to addition by an addition circuit 430. The addition result is applied, as an envelope signal ΣKA, to the minimum value memory comparison circuit 280 in the channel processor 13 described before.

This envelope signal ΣKA represents the envelope of a musical tone which is presently produced with respect to 1st to 16th channels to be simultaneously produced. Accordingly, when with respect to each channel the envelope becomes smaller than the minimum value stored in the minimum value memory comparison circuit 280, it is stored, as the minimum value, in the minimum value memory comparison circuit 280.

(5) Musical Tone Generating Section

The musical tone generating section 8 comprises a sound system made up of amplifiers, loudspeakers, etc. to successively produce as musical tones the musical tone signals of the 1st through 16th channels included in the time division analog signals $e_1$ and $e_2$ applied thereto by the first and second system musical tone signal forming sections 7A and 7B.

The musical tones of the 1st through16th channels are successively produced in synchronization with the master clock pulses; however, as its period is short, the auditor will hear it as if the tones of all the channels were produced simultaneously.

One example of the arrangement of the electronic musical instrument according to this invention has been described. The operation of the electronic musical instrument thus organized will be described with reference to the case where, for instance, the "$C_1$" key in the 0-th block and the "$C_2$" and "$E_2$" keys in the 1st block are depressed with respect to the key coder 12 (FIGS. 4A through 4C). Upon key operation, the first key switch K1 is closed, and then the second key switch K2 is closed in a period of time corresponding to the key depression speed.

Upon closure of the first key switch K1, the key coder 12 causes the delay flip-flops to simultaneously operate in synchronization with the master clock pulses $\phi_1$ and $\phi_2$ (having a period of one microsecond) and with the aid of the clock pulses $\phi_C$ and $\phi_D$ having a period equal to sixteen periods of the former clock pulses. As a result, the first and second blocks are stored in the block detection circuit 12B, and are delivered out in the order of decreasing priority (the 8th, the 7th . . . the 1st, in this example). The notes included in the blocks thus delivered out are detected by the note detection circuit 12D, and are successively delivered out starting from the note highest in priority (in the order of notes C, B . . . C#, in this example). That is, the key code signals KC (comprising the block code signals BC and the note code signal NC in combination) concerning all the keys presently depressed are successively outputted by the key coder 12.

The key code signals KC thus successively applied to the channel processor 13 (FIGS. 7A through 7D) are held in the sample hold circuit 13B for sixteen periods of the master clock pulses $\phi_1$ and $\phi_2$. During the sixteen periods, the key code memory circuit 13 makes one circulation of comparison between the storage data with respect to the sixteen channels of the memory circuit means 237 and the data subjected to the sample-hold operation, whereby the applied key code signals KC are stored in three empty channels.

The data whose contents are the key codes KC stored in the separate channels of the memory circuit means 237 are maintained even after the keys are released, but are cleared by the output of the clear AND gate 309 in the timing control circuit 13F (FIG. 7A) when the decay finish signal 2DF is produced by the first and second musical tone signal forming sections 7A and 7B (FIGS. 12A and 12B) (that is, when the tone dies away). Accordingly, it should be noted that both the key code KC of the key presently depressed and the key code KC of the key which was released before but is producing the tone of the decay waveform part are, normally, stored in the key code memory circuit 12C.

Figure 7A:
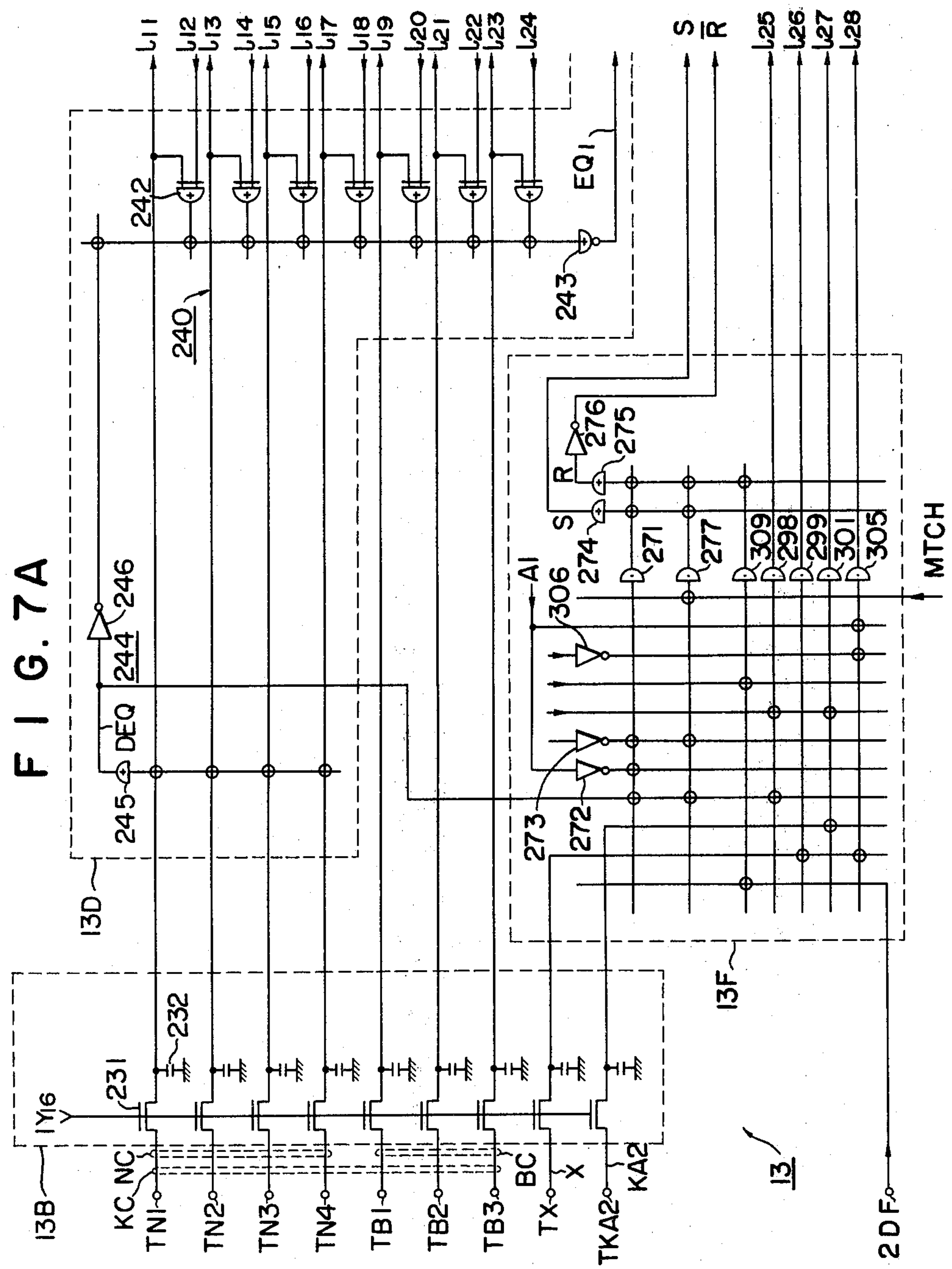
FIGS. 7A through 7D are four parts of a connection diagram showing a channel processor shown in FIG. 2.
Figure 7B:
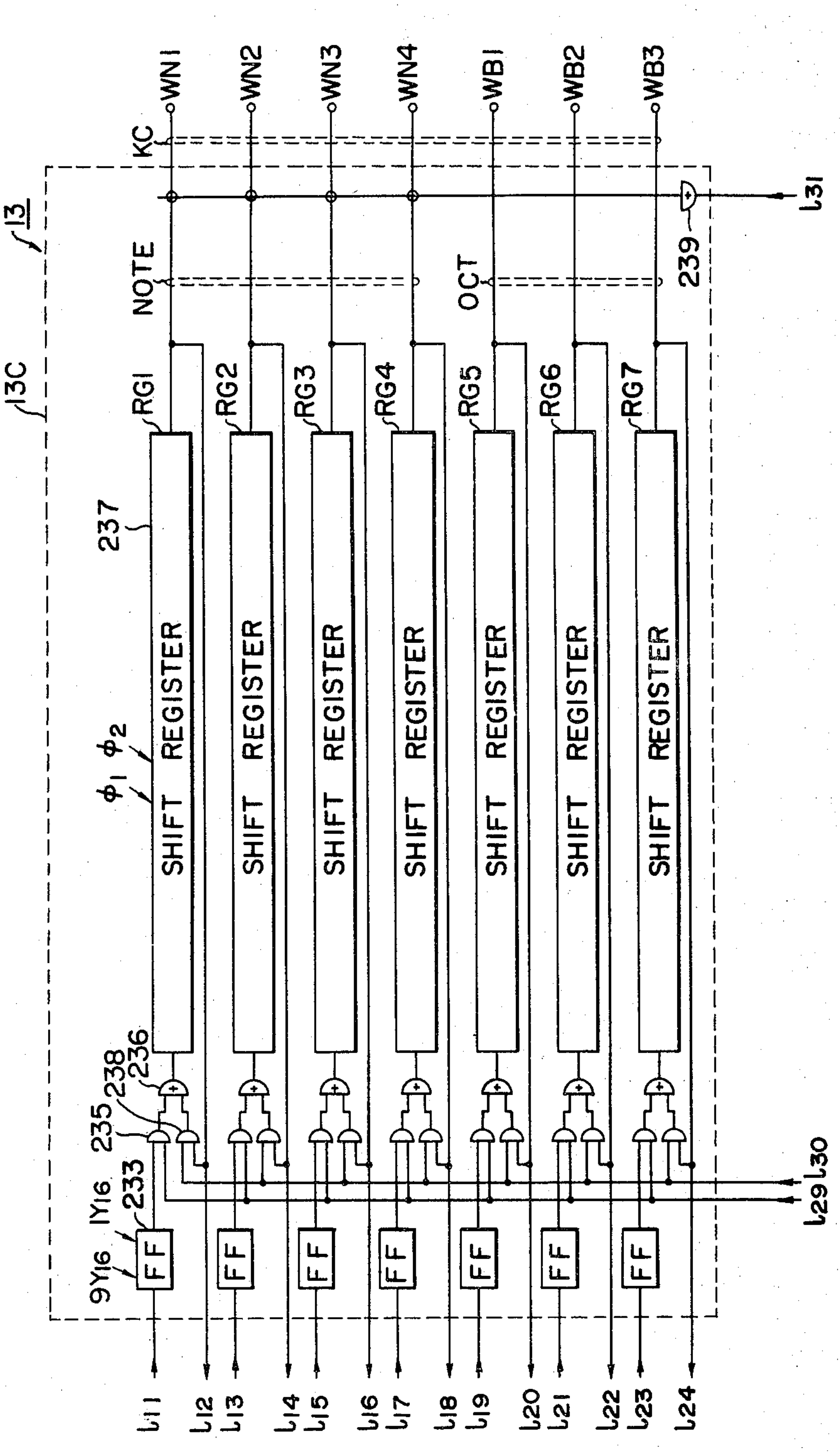
Figure 7C:
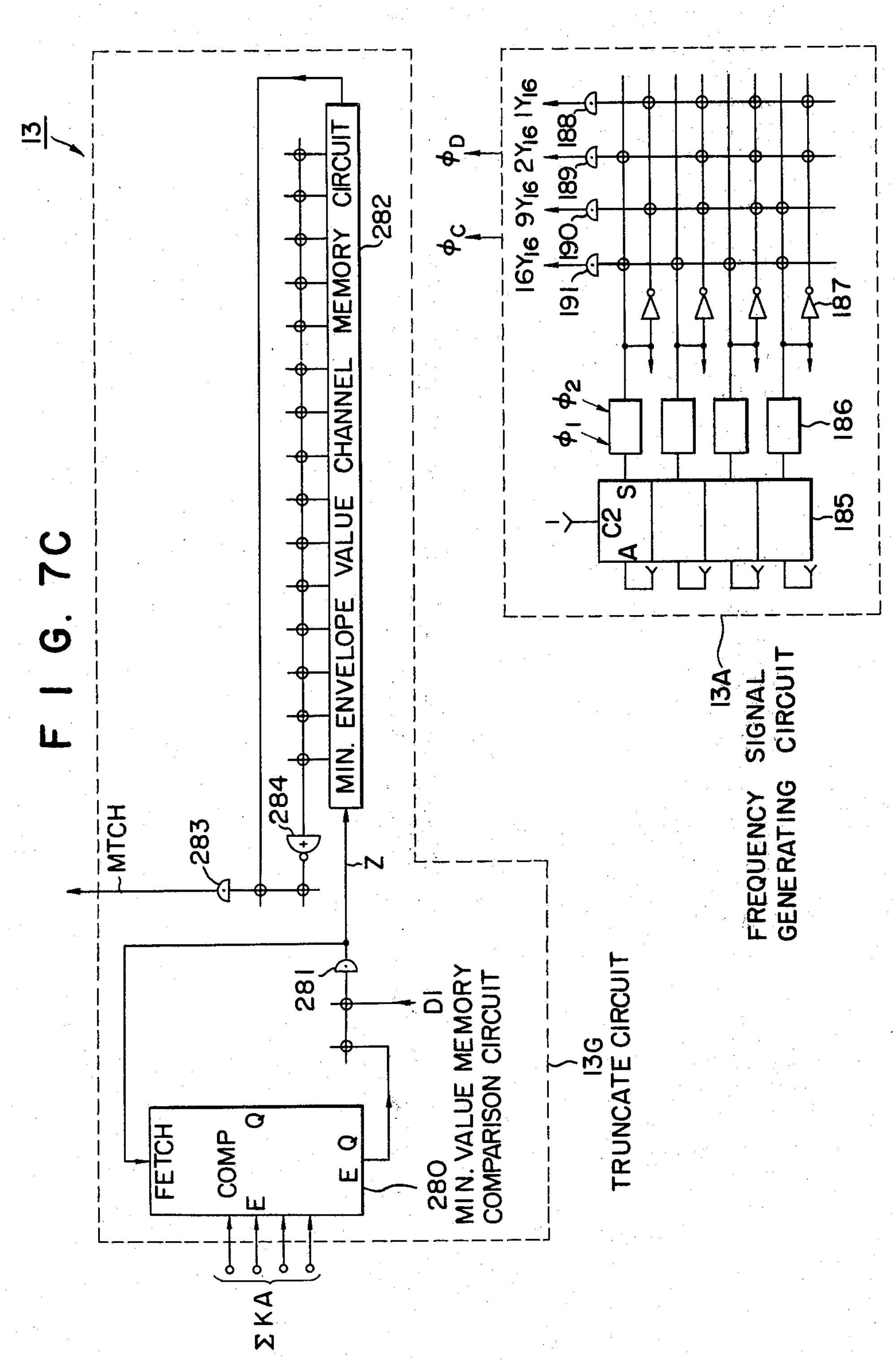
Figure 7D:
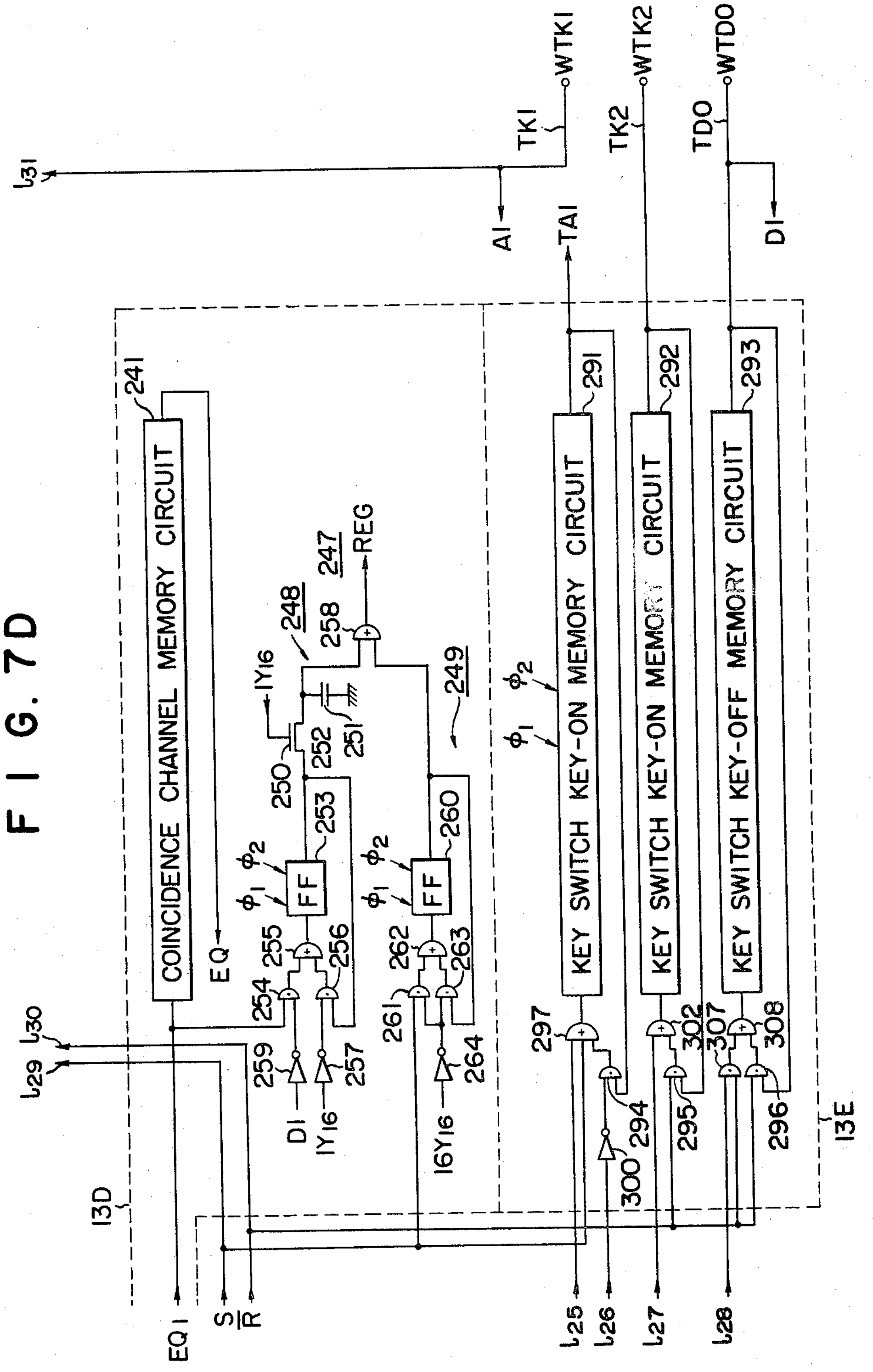

On the other hand, when the key code data are stored in the memory circuit means 237, they are stored, as the first key switch on information, in the corresponding channels of the first key switch key-on memory circuit 291 (FIG. 7B).

The above-described operation from the key operation till the storage in the key code memory circuit means and the first key switch key-on memory circuit 291 is repeated whenever the start pulse TC is provided by the start pulse generating circuit 12F in the key coder 12. If the contents of the key code signal KC applied to the channel processor 13 coincides with any one of the data stored in the key code memory circuit means 237, the signal KC is allowed to fade away without storing it again.

Soon the second key switch is closed. In this case, the same operation as that described with reference to the first key switch K1 is carried out in the key coder 12, so that the keys whose second key switches K2 are presently closed are successively detected starting from the key having the block number highest in priority and the note number highest in priority, and the detection results are successively read out of the second memory circuits 146 in the note detection circuit 12D.

The detection signal KA2 is applied through the timing control circuit 13F (FIG. 7A) of the channel processor 13 and through the second key switch on memory control AND circuit thereof to the second key switch key-on memory circuit 292 where it is stored in the corresponding channel. In this connection, it is necessary to determine in what channel the second key switch on detection signal KA2 applied to the channel processor 13 should be stored. This determination is carried out as follows: The contents of the data applied are compared with the contents of the channels in the memory circuit means 237, and a channel whose contents coincide with the contents of the applied data is selected by the coincidence channel memory circuit 241.

When keys are depressed against the piezo-electric elements DT1 through DT88 provided below them after closure of the second key switches K2, detection outputs dt1 through dt88 obtained in correspondence to the depression pressure variations are applied to the after touch control circuit 15 (FIG. 2). As a result, after touch data ATD corresponding to the after touch operations are produced for the key codes KC of the keys depressed.

The touch information that is the initial touch data ITD and after touch data ATD thus produced and the key codes KC employed as the key information are applied to the first and second system musical tone forming sections 7A and 7B. In these sections 7A and 7B, with respect to the data of the 1st through 16th channels assigned by the channel processor 13 (that is, the data in time division multiplex system) the outputs of a waveform determined by both the contents of the key information IFK and the touch information IFT and the parameters produced by the first and second system parameter generating circuits 5A and 5B on the basis of the selection operation in the tone color selection switch 6 are successively delivered out at the period equal to sixteen periods of the master clock pulses $\phi_1$ and $\phi_2$.

Thus, a musical tone is produced by the musical tone generating section 8, which has the same effect as that obtained when a plurality of tones obtained from Equation (3) are simultaneously produced. This musical tone is a composed tone having a tone pitch corresponding to the key information and having a tone color variation and tone volume variation corresponding to the touch information with respect to the keys of the channels.

The calculation operations of the musical tone signal forming sections 7A and 7B are carried out under the condition that the second key switch key-on detection signals TK2 are applied for the channels, accordingly, no unnecessary musical tones are produced for the data applied before that.

When the depression of the key corresponding to the musical tone being produced is suspended, that is, when the key is released, the musical tone decays. Accordingly, the storage of the first key switch key-on memory circuit 291 (FIG. 7D ) with respect to the relevant channel in the channel processor 13 is cleared by the key-off detection timing signal X, and therefore the key-off detection is stored in the key-off memory circuit 293 with the aid of the next timing signal X. In this connection, if the damper pedal 9 is not operated, the musical tone signal is moderately decayed until the production of the decay finish signal 2DF.

Therefore, upon operation of the damper pedal 9, the first and second system musical tone signal forming sections 7A and 7B decay the musical tone signal abruptly.

The above-described assignment and storage operation of the key code data KC for the key code memory circuit 13C (FIG. 7B) is effected in the case where empty channels are available in the key code memory circuit 13C. However, if such empty channels are not available, the data of the channel which is stored in the truncation circuit 13G (FIG. 7C) and is presently producing the musical tone signal having the minimum amplitude is replaced by the key code data which is presently applied. Accordingly, new key information is effectively used while satisfying the conditions most suitable for every situation.

As is apparent from the above description, an electronic musical instrument can be obtained according to this invention, which is capable of simultaneously producing a plurality of musical tones, with after control, in correspondence to keys depressed. Especially, a plurality of (two in the above-described example) musical tone signal forming sections adapted to calculate the fundamental equation are provided, and different parameters are independently applied to the musical tone signal forming sections. Therefore, even if the frequency component exclusion occurs in one of the musical tone signal forming sections, it is complemented by the remaining musical tone signal forming sections. Accordingly, as for the entire musical tone produced in tone-mixed state, a musical tone less in frequency component exclusion can be produced.

Furthermore, according to another aspect of this invention, a plurality of musical tone signal forming sections are provided, and parameter groups independent of one another are applied thereto similarly as in the above-described case, but one of the parameters included in at least one of the parameter groups (both of the first and second systems, in the above-described example) can be selectively varied as required in accordance with the key information (the key code signal provided by the channel processor in the case of the above-described example), and therefore the variations in tone color and envelope of musical tones over the entire tone ranges (or the key positions or the key ranges) can be obtained in conformance to those of musical tones produced by natural musical instruments.

In the case where it is intended to obtain the variations in tone color and envelope of musical tones by only one system, if the high tone range is characterized, then it is impossible to characterize the low tone range. However, in this invention a plurality of systems are provided as was described above, and therefore the parts which cannot be characterized by a sole system can be complemented mutually by the plurality of systems.

What is claimed is:

1. An electronic musical instrument, comprising:

tone color selecting means for selecting a tone color and for generating an output signal representative of the selected tone color;

keyboard information generating means for generating key information signals respectively indicating depressed keys and designating musical notes to be produced;

a plurality of independent parameter signal generating means each responsive to the key information signals for generating a set of parameter signals representative of a multiplicity of parameters, the parameters represented by the parameter signals from one parameter signal generating means being independent of and different from the parameters represented by the parameter signals from another parameter signal generating means;

a plurality of musical tone signal generating means each corresponding to a respective parameter signal generating means and each responsive to the parameter signals from its corresponding parameter signal generating means and the key information signals for generating a musical tone signal according to the fundamental equation $$e = KT_a(t)A(t)\sin\{B\omega t + T_f(t)I(t)\sin(D\omega t)\},$$

wherein;

$\omega t$ is an independent variable of the equation determined in accordance with the key information, and representing a reference tone pitch of a depressed key and timewisely progressing in value at a rate corresponding to the key information signal, K is a tone volume constant determined in accordance with the tone color selected by said tone color selecting means, and determinative of a relative volume among different musical tone signals, $T_a(t)$ is a tone volume selecting variable determined in accordance with the manner of depression of the depressed keys, and determinative of volume, A(t) is a variable determined in accordance with the tone color selected by said tone color selecting means, and determinative of a tone waveform envelope, B is a tone pitch constant determined in accordance with the tone color selected by said tone color selecting means, and determinative of an amount of variation from a reference tone pitch, $T_i(t)$ is a tone color selecting variable determined in accordance with the manner of depression of the depressed key, and determinative of a tone color, I(t) is a tone color variable determined in accordance with the tone color selected by said tone color selecting means, and determinative of a timewise variation of a tone color, D is a partial tone constant determined in accordance with the tone color selected by said tone color selecting means, and determinative of a distribution of partial tone components with respect to said reference tone pitch, and at least K,A(t) I(t) and D have significant values other than unity; and musical tone generating means for combining the musical tone signals to generate musical tones according to the combination of musical tone signals.

2. An electronic musical instrument according to claim 1, wherein said key information generating means is effective for generating key information signals representative of pressure and speed of key operation.

* * * * *